(12) United States Patent
Cortez et al.

(10) Patent No.: US 10,806,215 B2
(45) Date of Patent: Oct. 20, 2020

(54) ARTICLE OF FOOTWEAR WITH A MIDSOLE ASSEMBLY HAVING A PERIMETER BLADDER ELEMENT, A METHOD OF MANUFACTURING AND A MOLD ASSEMBLY FOR SAME

(71) Applicant: NIKE, Inc., Beaverton, OR (US)

(72) Inventors: Margarita L. Cortez, Portland, OR (US); Zachary M. Elder, Portland, OR (US); Lee D. Peyton, Tigard, OR (US); Hector R. Quinonez, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 99 days.

(21) Appl. No.: 16/053,368

(22) Filed: Aug. 2, 2018

(65) Prior Publication Data

US 2018/0338579 A1 Nov. 29, 2018

Related U.S. Application Data

(62) Division of application No. 14/832,347, filed on Aug. 21, 2015, now Pat. No. 10,070,690.

(60) Provisional application No. 62/073,260, filed on Oct. 31, 2014.

(51) Int. Cl.
| | |
|---|---|
| *A43B 3/00* | (2006.01) |
| *A43B 13/12* | (2006.01) |
| *A43B 13/20* | (2006.01) |
| *B29D 35/12* | (2010.01) |

(52) U.S. Cl.
CPC ............ *A43B 13/20* (2013.01); *A43B 3/0063* (2013.01); *A43B 13/12* (2013.01); *A43B 13/127* (2013.01); *A43B 13/206* (2013.01); *B29D 35/122* (2013.01)

(58) Field of Classification Search
CPC ..... A43B 3/0063; A43B 13/12; A43B 13/122; A43B 13/127; A43B 13/20; A43B 13/206
USPC .................................................... 36/29, 30 R
See application file for complete search history.

(56) References Cited

U.S. PATENT DOCUMENTS

| | | | |
|---|---|---|---|
| 4,897,936 A * | 2/1990 | Fuerst .................... | A43B 13/12 36/114 |
| 5,595,004 A * | 1/1997 | Lyden .................... | A43B 13/20 36/153 |
| 6,127,026 A * | 10/2000 | Bonk ..................... | A43B 13/20 428/213 |
| 7,565,754 B1 | 7/2009 | Acheson et al. | |
| 8,166,673 B2 * | 5/2012 | Sills ........................ | A43B 13/20 36/29 |
| 8,241,450 B2 * | 8/2012 | Hensley ................. | A43B 13/20 156/145 |

(Continued)

FOREIGN PATENT DOCUMENTS

CN 101896087 A 11/2010

*Primary Examiner* — Sharon M Prange
(74) *Attorney, Agent, or Firm* — Quinn IP Law

(57) ABSTRACT

An article of footwear has a midsole assembly that includes a fluid-filled bladder element having a substantially arc-shaped heel portion and having a lateral arm portion and a medial arm portion spaced from the lateral arm portion. Each of the arm portions extend from the heel portion. The bladder element is configured to be positioned with the heel portion in the heel region of midsole assembly, and the arm portions extending from the heel region to a forefoot region along a peripheral region. A method of manufacturing and a mold assembly for such an article of footwear are provided.

20 Claims, 30 Drawing Sheets

(56) References Cited

U.S. PATENT DOCUMENTS

2010/0325914 A1* 12/2010 Peyton .................. A43B 7/144
36/29
2012/0102783 A1* 5/2012 Swigart ................ A43B 13/206
36/83

* cited by examiner

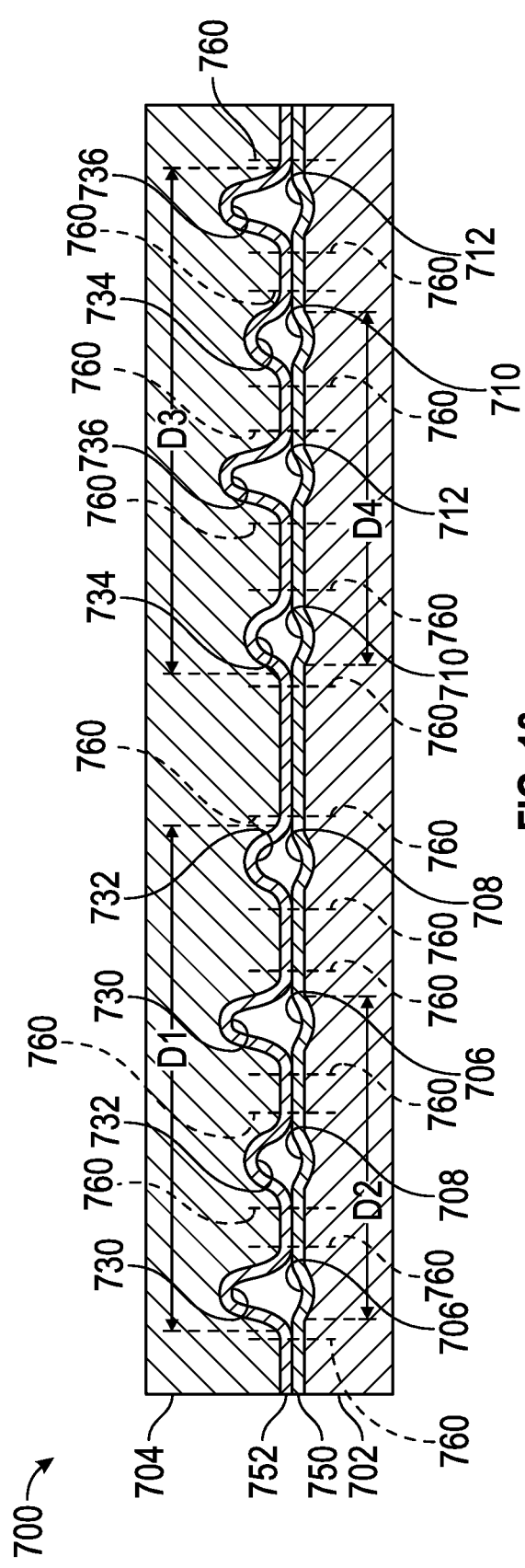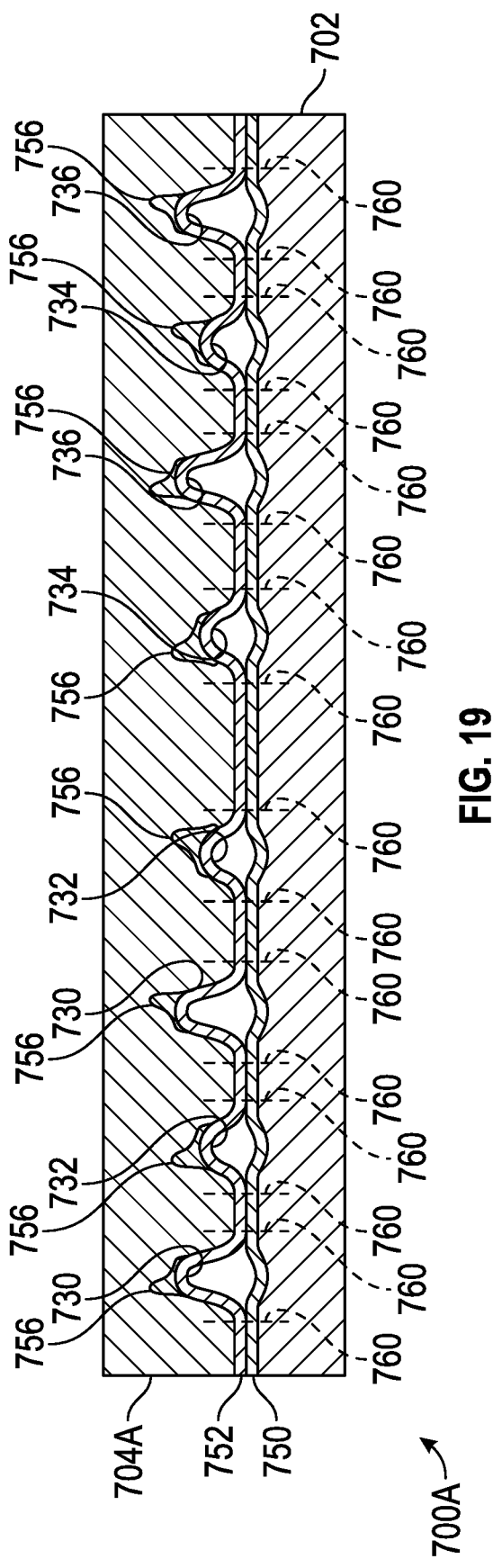

ARTICLE OF FOOTWEAR WITH A MIDSOLE ASSEMBLY HAVING A PERIMETER BLADDER ELEMENT, A METHOD OF MANUFACTURING AND A MOLD ASSEMBLY FOR SAME

CROSS-REFERENCE TO RELATED APPLICATIONS

This is a divisional application of U.S. application Ser. No. 14/832,347, filed on Aug. 21, 2015 and claims the benefit of priority thereto. U.S. application Ser. No. 14/832,347 claims the benefit of priority to U.S. Provisional Application No. 62/073,260 filed on Oct. 31, 2014. Both applications are hereby incorporated by reference in their entirety.

TECHNICAL FIELD

The present disclosure relates to an article of footwear having a bladder element and to a method of manufacturing and a mold assembly for an article of footwear.

BACKGROUND

Footwear typically includes a sole configured to be located under a wearer's foot to space the foot away from the ground or floor surface. Soles can be designed to provide a desired level of cushioning. Athletic footwear in particular sometimes utilizes polyurethane foam or other resilient materials in the sole to provide cushioning. Fluid-filled bladders are sometimes included in the sole to provide desired impact force absorption, motion control, and resiliency. The incorporation of fluid-filled bladders requires additional materials and adds processing steps to the manufacturing of footwear.

BRIEF DESCRIPTION OF THE DRAWINGS

FIG. 18 is a cross-sectional illustration of the mold assembly of FIG. 17 taken at lines 18-18 in FIG. 17 and with sheets of material for the bladder elements between the mold portions.

FIG. 19 is a cross-sectional illustration of another embodiment of a mold assembly with sheets of material for the bladder elements and a co-molded rim between the mold portions.

DETAILED DESCRIPTION

Figure 1:
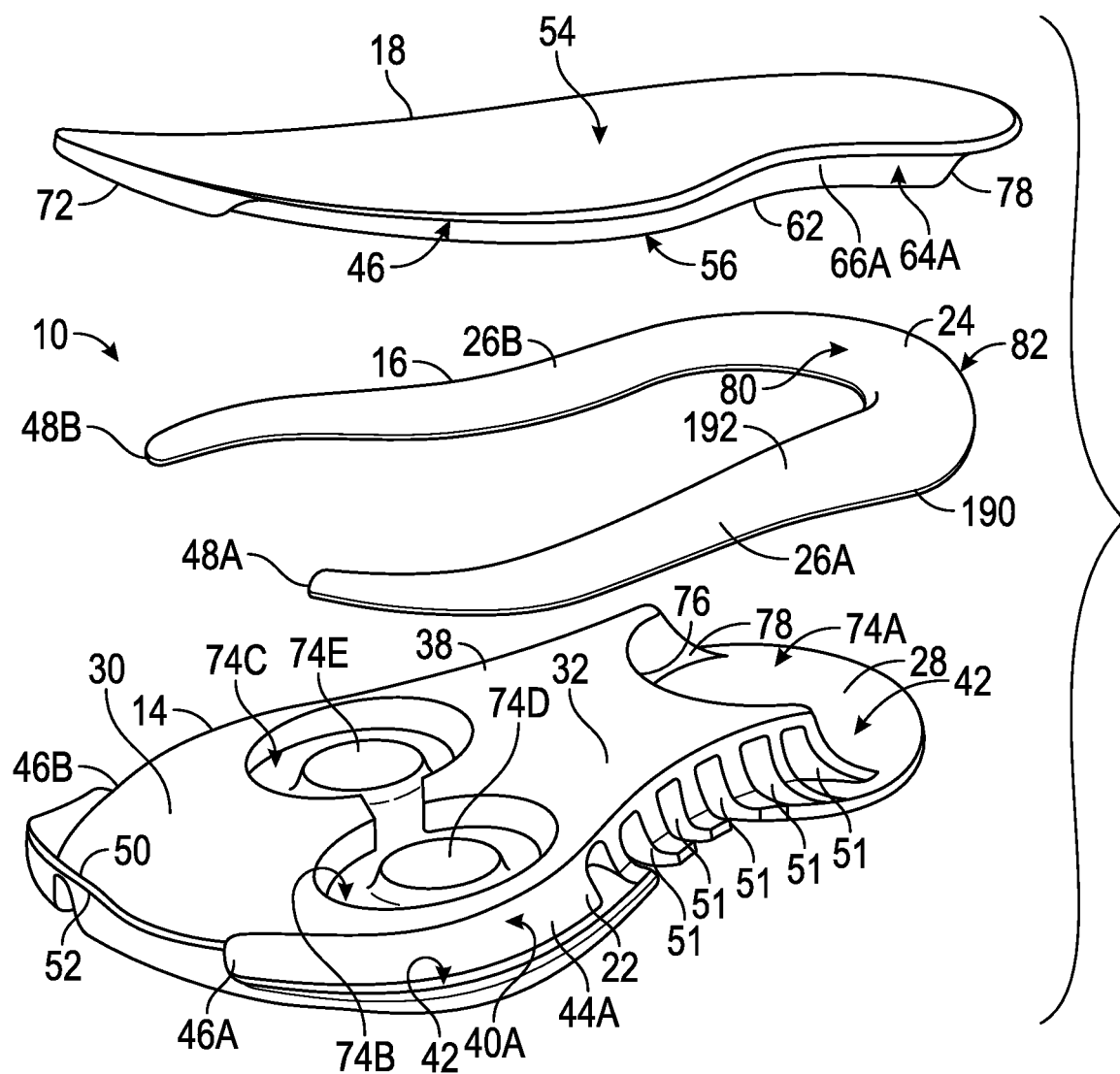
FIG. 1 is a schematic illustration in exploded perspective view of an embodiment of a midsole assembly including a peripheral fluid-filled bladder element for an embodiment of an article of footwear.

An article of footwear has a midsole assembly that includes a fluid-filled bladder element having a substantially arc-shaped heel portion, a lateral arm portion, and a medial arm portion spaced from the lateral arm portion. Each of the arm portions extend from the heel portion. The bladder element is configured to be positioned with the heel portion in a heel region of the article of footwear and the arm portions extending from the heel region to a forefoot region of the article of footwear along a peripheral region of the article of footwear. The arm portions may have terminal ends positioned in the forefoot region. The bladder element may be substantially transparent. The bladder element arranged at the peripheral region of the article of footwear as described provides a desired level of cushioning while minimizing material requirements.

In some embodiments, a sole layer with at least one protrusion is secured to the bladder element so that the at least one protrusion descends into a cavity between the arm portions. The sole layer may be a resilient midsole layer secured to and resting on the bladder element. The at least one protrusion may be configured so that a lowest extent of the at least one protrusion terminates above a base surface of the bladder element, ensuring that the at least one protrusion is excluded from a ground contact surface of the article of footwear in the absence of at least a threshold loading force. In embodiments in which there are multiple protrusions, the resilient midsole layer may form a flex groove extending generally lengthwise and positioned between at least some of the multiple protrusions. The resilient midsole layer may also form laterally extending grooves between at least some of the multiple protrusions.

In some embodiments, an additional sole layer is secured to the bladder element so that the bladder element rests on the additional sole layer. The at least one protrusion may be configured to descend only partially into the cavity between the arm portions in the absence of a predetermined threshold loading force, so that the at least one protrusion in the heel region terminates above a base surface of the additional sole layer, only the additional sole layer thus forming the ground contact surface in the heel region in the absence of the predetermined loading force, while both the midsole layer and the additional sole layer form the ground contact surface in the forefoot region, even in the absence of the predetermined threshold loading force. An additional sole layer may be secured to the bladder element so that the bladder element rests on the additional sole layer. The additional sole layer may have a substantially arc-shaped heel portion, a lateral arm portion, and a medial arm portion corresponding with the arc-shaped heel portion, the lateral arm portion and the medial arm portion of the bladder element, respectively. Each of the arm portions may extend from the heel portion to the forefoot region along the peripheral region.

The sole layer may be a resilient midsole layer that has a first portion adjacent an inward-facing surface of the bladder element and secured to the bladder element. In some embodiments, a second portion of the resilient midsole layer adjacent the inward-facing surface of the bladder element is spaced from the bladder element in the absence of at least a threshold loading force, and is configured to be moved into contact with the inward-facing surface of the bladder element under compression by the threshold loading force to attenuate the threshold loading force. The second portion is configured to have a surface profile substantially identical to a surface profile of the inward-facing surface of the bladder element.

The resilient midsole layer can be configured so that the at least one protrusion moves into operative contact with the underlying ground (also referred to as the ground plane) only after the second portion of the resilient midsole layer moves into contact with the inward-facing surface of the bladder element. The midsole assembly will provide a first stage of attenuation of the loading force when the second portion of the resilient midsole layer moves into contact with the inward-facing surface of the bladder element, and will provide a second stage of attenuation of the loading force when the at least one protrusion moves into operative contact with the ground plane. A lowest extent of the at least one protrusion of the midsole layer in the heel region may terminate above a base surface of the additional sole layer so that the at least one protrusion is excluded from a ground contact surface of the article of footwear in the absence of at least the threshold loading force, and is configured to move into operative contact with a ground plane under the threshold loading force. At least one outsole element may be secured to the at least one protrusion such that the at least one outsole element is excluded from the ground contact surface of the article of footwear in the absence of at least the threshold loading force, and contacts the ground plane only under the threshold loading force.

In some embodiments, the bladder element includes only the heel portion and arm portions. In other embodiments, the bladder element forms a web connecting the arm portions. The bladder element may be formed from an upper sheet and a lower sheet, such as polymeric sheets. The sheets of the bladder element may form fluid-filled pods in the web that may be downwardly-extending protrusions. The pods may be at ambient pressure or may be pressurized. An additional sole layer may be secured to the bladder element, and may have apertures configured to receive and support the fluid-filled pods of the web. In order to provide the fluid-filled pods as part of the web, the bladder element can have an inner flange at which the sheets are joined at an inward-facing surface of the bladder element. The inner flange may form a seam that may be referred to as a roll seam, and that progresses upward along the arm portions from the heel portion toward the terminal ends. In another embodiment, the bladder element has an inner flange forming an inner seam at which the sheets are joined at an inward-facing surface of the bladder element, and an outer flange forming an outer seam where the sheets are joined at an outward-facing surface of the bladder element. The inner flange and the outer flange are generally at an upper portion of the bladder element from the heel portion to the terminal ends, and the outer flange is tapered and extends generally upward. The outer seam may be referred to as a swept pinch seam, and enables an upper of the article of footwear to be secured to the bladder element at the outer flange. At least a portion of the outer flange may have a thickness in cross-section greater than a sum of the thicknesses of the upper and lower sheets away from the outer flange. A footwear upper may be secured to and cupped by the outer flange.

In some embodiments, the midsole assembly may include a first resilient midsole layer having a heel region, a forefoot region, and a peripheral region corresponding with the heel region, the forefoot region, and the peripheral region of the article of footwear, respectively. The fluid-filled bladder element may be supported on the first resilient midsole layer and positioned substantially at the peripheral region of the first resilient midsole layer. In some embodiments, an overlaying component is supported on the bladder element above the first resilient midsole layer such that an internal chamber at least partially defined by the first resilient midsole layer is sealed by the first resilient midsole layer, the overlaying component, and the bladder element. The internal chamber may include one or more recesses in the first resilient midsole layer. The first resilient midsole layer may have a recess in the heel region of the first resilient midsole layer. The recess may at least partially define the internal chamber. The first resilient midsole layer may have a recess in the forefoot region that at least partially defines the internal chamber. The recesses may contain air at ambient pressure. The recesses affect flexibility and cushioning of the first resilient midsole layer. In some embodiments, the recesses are closed by the overlaying component so that the internal chamber functions similarly to a bladder element. An outsole element may be secured to at least a portion of a bottom surface of the first resilient midsole layer. At least a portion of a bottom surface of the first resilient midsole layer may have laterally-extending grooves.

The bladder element may have a base surface supported on the first resilient midsole layer. The bladder element may taper from the base surface to a peak extending along the bladder element opposite the base surface and the first resilient midsole layer. The bladder element may have a generally outward-facing side surface between the base surface and the peak, and a generally inward-facing side surface between the base surface and the peak. The overlaying component may be supported on the inward-facing side surface so that at least a portion of the outward-facing side surface of the bladder element is exposed.

In some embodiments, the overlaying component is part of the midsole assembly. For example, the overlaying component may be a second resilient midsole layer secured to the bladder element. The first resilient midsole layer may have a first hardness, and the second resilient midsole layer may have a second hardness greater than the first hardness. In such an embodiment, a footwear upper may be double-lasted to the second resilient midsole layer such that the footwear upper covers the side surfaces and the bottom surface of the second resilient midsole layer and is in contact with the bladder element. The second resilient midsole layer may have a lower surface with a peripheral cavity configured to receive the bladder element.

In some embodiments, the overlaying component is a footwear upper, and a rim is secured to and rims the bladder element. The footwear upper is secured to the rim so that the rim separates the upper and the bladder element. The rim may be co-molded with the bladder element. The rim may have a flange with a generally exterior-facing surface and a generally interior-facing surface. The footwear upper may be secured to the interior-facing surface of the flange so that the exterior-facing surface of the flange is exposed on the article of footwear. The rim may be substantially transparent.

In some embodiments, the midsole assembly includes a resilient midsole layer secured to and resting on the bladder element and having at least one protrusion that extends only partially into a cavity formed between the arm portions in the heel regions in the absence of at least a threshold loading force. An additional sole layer is secured to the bladder element and the bladder element rests on the additional sole layer. The additional sole layer has a substantially arc-shaped heel portion to which the heel portion of the bladder element is secured, a lateral arm portion to which the lateral arm portion of the bladder element is secured, and a medial arm portion to which the medial arm portion of the bladder element is secured. The additional sole layer thereby extends with the bladder element from the heel region to the forefoot region along the peripheral region and around the cavity. In such an embodiment, the midsole layer may have a first hardness, and the additional sole layer may have a second hardness greater than the first hardness.

A first portion of the resilient midsole layer adjacent an inward-facing surface of the bladder element may be secured to the bladder element. A second portion of the resilient midsole layer adjacent the inward-facing surface of the bladder element may be spaced from the bladder element in the absence of at least a threshold loading force and is configured to be moved into contact with the inward-facing surface of the bladder element under compression by the threshold loading force to attenuate the threshold loading force. The second portion may have a surface profile substantially identical to a surface profile of the inward-facing surface of the bladder element. A lowest extent of the at least one protrusion of the midsole layer in the heel region may terminate above a base surface of the additional sole layer so that the at least one protrusion is excluded from a ground contact surface of the article of footwear in the absence of at least the threshold loading force, and is configured to move into operative contact with a ground plane under the threshold loading force. A lowest extent of at least one protrusion of the midsole layer in the forefoot region may be included in the ground contact surface of the article of footwear even in the absence of the threshold loading force. The midsole assembly may provide a first stage of attenuation of at least the threshold loading force prior to the at least one protrusion of the midsole layer in the heel region moving into operative contact with the ground plane, and may provide a second stage of attenuation of at least the threshold loading force when the at least one protrusion of the midsole layer in the heel region moves into operative contact with the ground plane.

In some embodiments, only the additional sole layer forms a ground contact surface in the heel region in the absence of a predetermined threshold loading force, and both the midsole layer and the additional sole layer form the ground contact surface in the forefoot region even in the absence of the predetermined threshold loading force. In some embodiments, the at least one protrusion may include only a single protrusion in the heel region that tapers laterally inward, away from the arm portions of the bladder element, to the lowest extent. The midsole layer may have at least one cavity defining or supporting at least one ambient air pod. The midsole assembly may further include a plate molded to the bladder element and extending between the lateral arm portion and the medial arm portion in the forefoot region.

A method of manufacturing an article of footwear includes providing a bladder element formed from first and second polymeric sheets so that the bladder element has a substantially arc-shaped heel portion, a lateral arm portion, and a medial arm portion laterally-spaced from the lateral arm portion, and with the lateral arm portion and the medial arm portion each extending from the heel portion. The method may include securing a sole layer to at least a portion of the bladder element, and positioning the sole layer so that at least one protrusion of the sole layer descends into a lateral space between the arm portions. An additional sole layer may also be secured to at least one of the bladder element and the at least one protrusion under the method. In embodiments in which the at least one protrusion includes multiple protrusions, the method may include providing at least one groove between at least some of the multiple protrusions.

In embodiments in which the bladder element has ambient pods formed between the arm portions, and the sole layer has apertures through which the ambient pods partially extend so that the sole layer cups the ambient pods, the method may include securing outsole elements on portions of the ambient pods that extend through the apertures.

The method may include forming the bladder element. In embodiments in which the first and second polymeric sheets extend between the arm portions to form a web, forming the bladder element includes molding the polymeric sheets to form sealed fluid-filled pods in the web. In some embodiments, forming the bladder element may further include joining the polymeric sheets at an inner flange by a roll seam that progresses upward toward terminal ends of the arm portions. In still further embodiments, forming the bladder element may include joining the polymeric sheets at an outer seam at an outward-facing surface of the bladder element, and at an inner flange at an inward-facing surface of the bladder element. In such embodiments, the inner flange and the outer flange are generally at an upper portion of the bladder element from the heel portion to terminal ends of the arm portions, and the outer flange extends generally upward. The method may further include securing a footwear upper to the outer flange such that the outer flange is exposed on the article of footwear.

In some embodiments, the bladder element may be supported substantially on a peripheral region of the sole layer, and the method may include supporting an overlaying component on the bladder element so that the overlaying component extends above the sole layer and so that an internal chamber at least partially defined by the sole layer is sealed between the sole layer, the overlaying component, and the bladder element. The method may include co-molding a rim to the bladder element, and securing the overlaying component to the rim. The method may include securing the overlaying component to the bladder element. Still further, the method may include securing a footwear upper to the overlaying component.

In some embodiments, the bladder element is a first bladder element and the article of footwear is a first article of footwear. In such embodiments, the method may include simultaneously forming the first bladder element and a second bladder element for a second article of footwear in a single mold assembly. The second bladder element may have a substantially arc-shaped heel portion, a lateral arm portion, and a medial arm portion with the lateral arm portion and the medial arm portion each extending from the heel portion. The medial arm portion of the first bladder element may be between the lateral and medial arm portions of the second bladder element during the forming. The first bladder element may have one of a right foot orientation and a left foot orientation, and the second bladder element may have the same said one of a right foot orientation and a left foot orientation as the first bladder element. The forming may be thermoforming first and second polymeric sheets, and may further include trimming a bonded flange at a perimeter of each of the first bladder element and the second bladder element.

Simultaneously forming in the single mold assembly may further include forming a third bladder element and a fourth bladder element. Each of the third bladder element and the fourth bladder element may have a substantially arc-shaped heel portion, a lateral arm portion, and a medial arm portion with the lateral arm portion and the medial arm portion each extending from the heel portion. The medial arm portion of the third bladder element may be between the lateral and medial arm portions of the fourth bladder element during the forming. In one embodiment, the first bladder element has one of a right foot orientation and a left foot orientation, and the second bladder element has the same said one of a right foot orientation and a left foot orientation as the first bladder element, and the third bladder element and the fourth bladder element are both of the other of said right foot orientation and said left foot orientation. In such an embodiment, the lateral arm portion of the second bladder element may be adjacent to the lateral arm portion of the third bladder element during said forming. A respective rim may be co-molded to each of the first bladder element and the second bladder element in the single mold assembly under the method.

A method of manufacturing an article of footwear may include simultaneously forming a first bladder element for a first article of footwear and a second bladder element for a second article of footwear in a single mold assembly. Each of the first bladder element and the second bladder element may have a substantially arc-shaped heel portion, a lateral arm portion, and a medial arm portion, with the lateral arm portion and the medial arm portion each extending from the heel portion. The medial arm portion of the first bladder element may be between the lateral and medial arm portions of the second bladder element during the forming. The first bladder element may have one of a right foot orientation and a left foot orientation, and the second bladder element may have the same said one of a right foot orientation and a left foot orientation as the first bladder element. Simultaneously forming in the single mold assembly may further include forming a third bladder element and a fourth bladder element. Each of the third bladder element and the fourth bladder element may have a substantially arc-shaped heel portion, a lateral arm portion, and a medial arm portion with the lateral arm portion and the medial arm portion each extending from the heel portion. The medial arm portion of the third bladder element may be between the lateral and medial arm portions of the fourth bladder element during said forming. The third bladder element and the fourth bladder element may both of the other of said right foot orientation and said left foot orientation than the first and the second bladder element. The lateral arm portion of the second bladder element may be adjacent to the lateral arm portion of the third bladder element during said forming. A respective rim may be co-molded to each of the first bladder element and the second bladder element in the single mold assembly under the method. Forming may be thermoforming first and second polymeric sheets, and may further include trimming a bonded flange at a perimeter of each of the first bladder element and the second bladder element.

The unique shape of the bladder element enables a novel mold assembly and an efficient method of manufacturing bladder elements using the mold assembly. The mold assembly for bladder elements used in articles of footwear may include a mold portion that defines a first mold cavity and a second mold cavity. Each of the first mold cavity and the second mold cavity may have a substantially arc-shaped heel cavity portion, a lateral arm cavity portion, and a medial arm cavity portion. The lateral arm cavity portion and the medial arm cavity portion may each extend from and may be continuous with the heel cavity portion. The medial arm cavity portion of the first mold cavity may be between the lateral and medial arm cavity portions of the second mold cavity. The medial arm cavity portion of the first mold cavity may extend generally toward the heel cavity portion of the second mold cavity, and the medial arm cavity portion of the second mold cavity may extend generally toward the heel cavity portion of the first mold cavity. This arrangement enables molding of multiple bladder elements simultaneously, potentially reducing processing time and cost. When polymeric sheets and/or other materials are used in the mold assembly to create the bladder elements, such as by thermoforming, the arrangement of the mold cavity portions minimizes scrap material.

In some embodiments, a first distance from an outer edge of the lateral arm cavity portion of the first mold cavity to an outer edge of the lateral arm cavity portion of the second mold cavity is less than twice a second distance from an outer edge of the medial arm cavity portion of the first mold cavity to an outer edge of the lateral arm cavity portion of the first mold cavity. The first distance and the second distance may be determined along a common cross section extending across the medial and lateral arm cavity portions of the first and second mold cavities.

In some embodiments, the mold portion is a first mold portion, and the mold assembly may also include a second mold portion that has mold cavities configured to correspond with the substantially arc-shaped heel cavity portions, the lateral arm cavity portions, and the medial arm cavity portions of the first and second mold cavities of the first mold portion when the second mold portion is placed adjacent to the first mold portion so that the mold cavities of the first and second mold portions together define molds for first and second bladder elements, each of the bladder elements having a substantially arc-shaped heel portion, a lateral arm portion, and a medial arm portion, with the lateral arm portion and the medial arm portion each extending from the substantially arc-shaped heel portion. The mold cavities of one of the first and the second mold portions may each be configured with a rim portion extending along the substantially arc-shaped heel cavity portion, the lateral arm cavity portion, and the medial arm cavity portion.

In some embodiments, the mold portion may further define a third mold cavity and a fourth mold cavity. Each of the third mold cavity and the fourth mold cavity may have a substantially arc-shaped heel cavity portion, a lateral arm cavity portion, and a medial arm cavity portion with the lateral arm cavity portion and the medial arm cavity portion each extending from and being continuous with the heel cavity portion. The medial arm cavity portion of the third mold cavity may be between the lateral and medial arm cavity portions of the fourth mold cavity. The medial arm cavity portion of the third mold cavity may extend generally toward the heel cavity portion of the fourth mold cavity. The medial arm cavity portion of the fourth mold cavity may extend generally toward the heel cavity portion of the third mold cavity. A third distance from an outer edge of the lateral arm cavity portion of the third mold cavity to an outer edge of the lateral arm cavity portion of the fourth mold cavity may be less than twice a fourth distance from an outer edge of the medial arm cavity portion of the third mold cavity to an outer edge of the lateral arm cavity portion of the third mold cavity. The third distance and the fourth distance are determined along a common cross section extending across the medial and lateral arm cavity portions of the third and fourth mold cavities. A lateral arm cavity portion of the second mold cavity is adjacent the lateral arm cavity portion of the third mold cavity.

The mold portion may have a first end and a second end opposite the first end. The heel cavity portions of the second and third mold cavities may be positioned such that the arm cavity portions of the second and third mold cavities extend generally toward the first end of the mold portion. The heel cavity portions of the first and fourth mold cavities may be positioned such that the arm cavity portions of the first and fourth mold cavities extend toward the second end of the mold portion.

In some embodiments, the mold portion is a first mold portion, and the mold assembly further includes a second mold portion having mold cavities configured to correspond with the substantially arc-shaped heel cavity portions, the lateral arm cavity portions, and the medial arm cavity portions of the first, second, third, and fourth mold cavities of the first mold portion when the second mold portion is placed adjacent to the first mold portion so that the mold cavities of the first and second mold portions together define molds for the first, second, third, and fourth bladder elements. Each of the bladder elements may have a substantially arc-shaped heel portion, a lateral arm portion, and a medial arm portion, with the lateral arm portion and the medial arm portion each extending from the substantially arc-shaped heel portion. The mold cavities of one of the first and the second mold portions may each be configured with a rim portion extending along the substantially arc-shaped heel cavity portion, the lateral arm cavity portion, and the medial arm cavity portion.

The above features and advantages and other features and advantages of the present teachings are readily apparent from the following detailed description of the modes for carrying out the present teachings when taken in connection with the accompanying drawings.

"A," "an," "the," "at least one," and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Those having ordinary skill in the art will recognize that terms such as "above," "below," "upward," "downward," "top," "bottom," etc., are used descriptively relative to the figures, and do not represent limitations on the scope of the invention, as defined by the claims.

Figure 5:
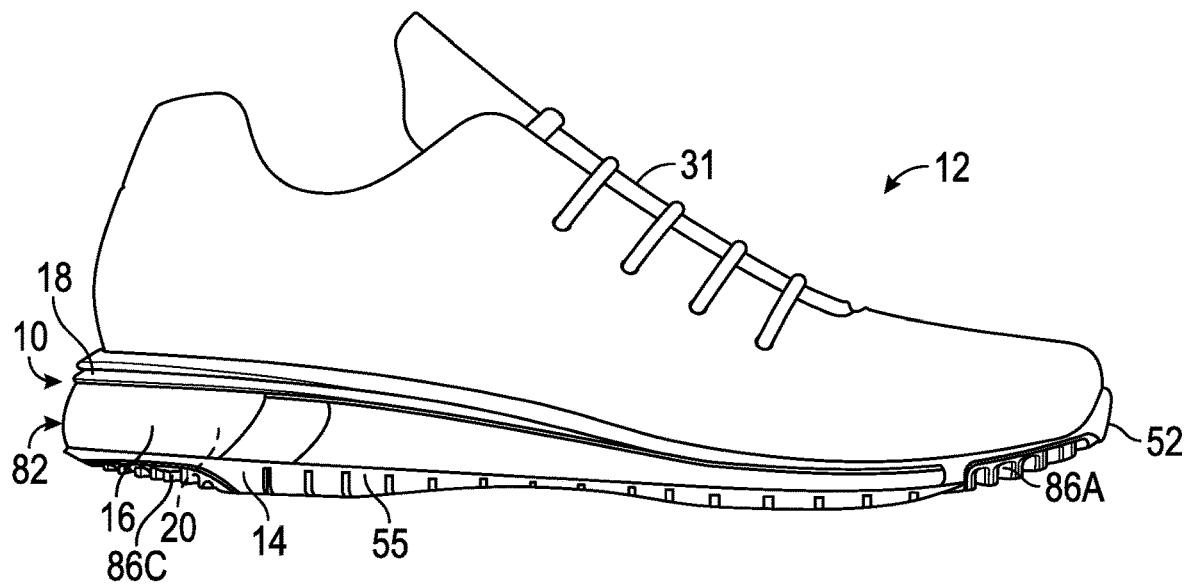
FIG. 5 is a schematic illustration in side view of an article of footwear having the midsole assembly of FIG. 1.

Referring to the drawings, wherein like reference numbers refer to like components throughout the several views, FIG. 1 is an exploded perspective view of an embodiment of a midsole assembly 10 for an article of footwear 12 shown in FIG. 5. The midsole assembly 10 includes a first resilient midsole layer 14 and a fluid-filled bladder element 16 configured to cooperatively fit to the first resilient midsole layer 14 so that the bladder element 16 is supported on and secured to a peripheral region 22 of the first resilient midsole layer 14 as shown in FIG. 5 and as further discussed herein. As used herein, a "peripheral region" is a region between a center region and a perimeter of an object. An overlaying component 18, which in this embodiment is a second resilient midsole layer 18, is configured to cooperatively fit to the bladder element 16 to rest above the bladder element 16 and the first resilient midsole layer 14. When the bladder element 16 is secured to the first resilient midsole layer 14 and the second resilient midsole layer 18 as described herein, an internal chamber 20 is formed by and between the first resilient midsole layer 14, the second resilient midsole layer 18, and the bladder element 16. The internal chamber 20 may be at an ambient pressure, but may be sealed by the first resilient midsole layer 14 and the second resilient midsole layer 18. A portion of the internal chamber 20 is visible through the bladder element 16 in FIG. 5.

Referring again to FIG. 1, the bladder element 16 is an elongated element configured to be supported on and secured to a peripheral region 22 of the first resilient midsole layer 14. The bladder element 16 has a substantially arc-shaped heel portion 24, that can also be referred to as a U-shaped heel portion, and has a medial arm portion 26A and a lateral arm portion 26B each extending from the heel portion 24. The heel portion 24 is configured to be located at the heel region 28 of the first resilient midsole layer 14 as discussed herein. The bladder element 16 can be formed from a variety of materials including various polymers that can resiliently retain a fluid such as air or another gas. Examples of polymer materials for bladder element 16 include thermoplastic urethane, polyurethane, polyester, polyester polyurethane, and polyether polyurethane. Moreover, the bladder element 16 can be formed of layers of different materials. In one embodiment, the bladder element 16 is formed from thin films having one or more thermoplastic polyurethane layers with one or more barriers layer of a copolymer of ethylene and vinyl alcohol (EVOH) that is impermeable to the pressurized fluid contained therein as disclosed in U.S. Pat. No. 6,082,025, which is incorporated by reference in its entirety. Bladder element 16 may also be formed from a material that includes alternating layers of thermoplastic polyurethane and ethylene-vinyl alcohol copolymer, as disclosed in U.S. Pat. Nos. 5,713,141 and 5,952,065 to Mitchell et al. which are incorporated by reference in their entireties. Alternatively, the layers may include ethylene-vinyl alcohol copolymer, thermoplastic polyurethane, and a regrind material of the ethylene-vinyl alcohol copolymer and thermoplastic polyurethane. The bladder element 16 may also be a flexible microlayer membrane that includes alternating layers of a gas barrier material and an elastomeric material, as disclosed in U.S. Pat. Nos. 6,082,025 and 6,127,026 to Bonk et al. which are incorporated by reference in their entireties. Additional suitable materials for the bladder element 16 are disclosed in U.S. Pat. Nos. 4,183,156 and 4,219,945 to Rudy which are incorporated by reference in their entireties. Further suitable materials for the bladder element 16 include thermoplastic films containing a crystalline material, as disclosed in U.S. Pat. Nos. 4,936,029 and 5,042,176 to Rudy, and polyurethane including a polyester polyol, as disclosed in U.S. Pat. Nos. 6,013,340, 6,203,868, and 6,321,465 to Bonk et al. which are incorporated by reference in their entireties. In selecting materials for the bladder element 16, engineering properties such as tensile strength, stretch properties, fatigue characteristics, dynamic modulus, and loss tangent can be considered. The thicknesses of sheets of materials used to form the bladder element 16 can be selected to provide these characteristics.

The bladder element 16 is resilient and provides cushioning and flexibility that can be tuned such as by selecting a level of pressurization. Tensile members and/or reinforcing structures can be integrated with the bladder element 16 to provide desired responsiveness, such as disclosed in U.S. Pat. No. 4,906,502 to Rudy et al., and U.S. Pat. No. 8,061,060 to Swigart et al., which are incorporated by reference in their entireties.

The first resilient midsole layer 14 is a unitary layer configured to extend the entire underfoot region of the article of footwear 12. In one embodiment, the first resilient midsole layer 14 may be a polymer foam material such as polyurethane or ethylene vinyl acetate (EVA). Alternatively, the first resilient midsole layer 14 may be a bladder element formed of any of the materials described with respect to bladder element 16. As shown in FIG. 5, the article of footwear 12 is an athletic shoe. In other embodiments, the midsole assembly 10 could be for an article of footwear that is a dress shoe, a work shoe, a sandal, a slipper, a boot, or any other category of footwear. The first resilient midsole layer 14 has a heel region 28, a forefoot region 30, and a midfoot region 32 there between. Heel region 28 generally includes portions of the first resilient midsole layer 14 corresponding with rear portions of a human foot of a size corresponding with the article of footwear 12, including the calcaneus bone. Forefoot region 30 generally includes portions of the first resilient midsole layer 14 corresponding with the toes and the joints connecting the metatarsals with the phalanges of a human foot of a size corresponding with the article of footwear 12. Midfoot region 32 generally includes portions of the first resilient midsole layer 14 corresponding with an arch area of a human foot of a size corresponding with the article of footwear 12. As used herein, a lateral side of a component for an article of footwear, such as a lateral side of the first resilient midsole layer, is a side that corresponds with an outside area of the foot of the wearer of the article of footwear that is generally further from the other foot of the wearer (i.e., the side closer to the fifth toe of the wearer). The fifth toe is commonly referred to as the little toe. A medial side of a component for an article of footwear, such as a medial side of the first resilient midsole layer 14, is the side that corresponds with an inside area of the foot on which the article of footwear is worn and that is generally closer to the other foot of the wearer (i.e., the side closer to the hallux of the foot of the wearer). The hallux is commonly referred to as the big toe. In the embodiment of the first resilient midsole layer 14 shown in FIG. 2, the heel region 28 extends from a rear extremity at boundary A to boundary B. Boundary B corresponds with a forward-most portion of an arcuate ridge 76 of central raised portion 38 described herein. Midfoot region 32 extends from boundary B to boundary C. Boundary C is at a rearward-most portion of recess 74C. Forefoot region 30 extends from boundary C to boundary D at a forward extremity of the first resilient midsole layer 14.

Figure 2:
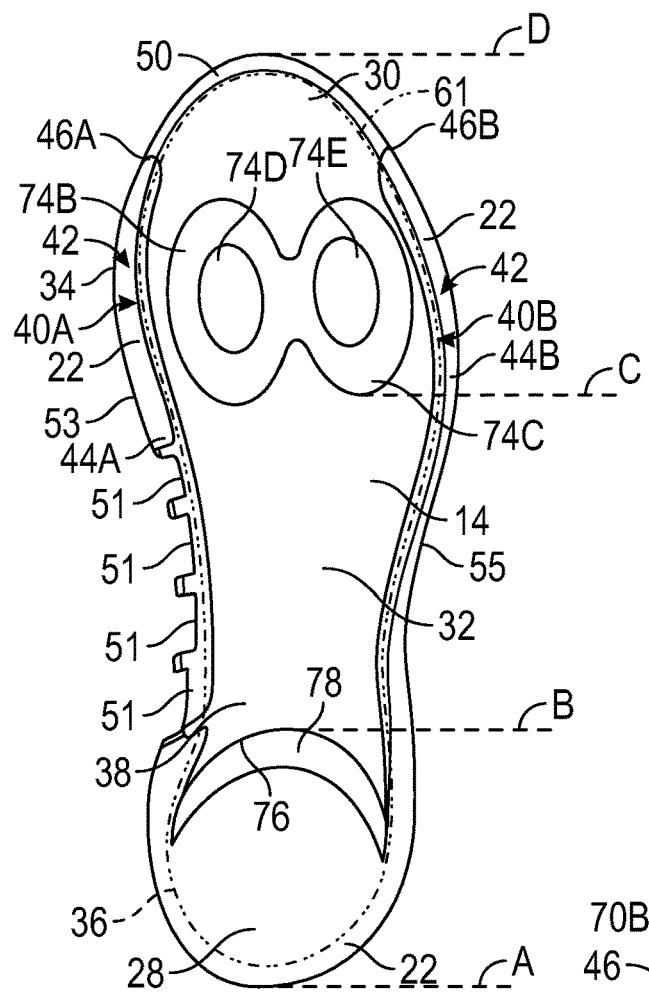
FIG. 2 is schematic illustration in plan view of a first resilient midsole layer of the midsole assembly of FIG. 1 with an inward extent of a peripheral region indicated in phantom.

The peripheral region 22 of the first resilient midsole layer 14 is a region extending from the outer perimeter 34 of the first resilient midsole layer 14 slightly inward to a boundary generally established by a raised central portion 38. The inward extent of the peripheral region 22 is indicated with phantom boundary 36 in FIG. 2. In the embodiment shown, the peripheral region 22 extends inward from an outer perimeter 34 of the first resilient midsole layer 14 to boundary 36 coinciding with the edges of a central raised portion 38 described herein. In FIG. 2, the boundary 36 is shown slightly offset from the edge of the central raised portion 38 in order to make phantom line 36 visible. In the heel region 28, the boundary 36 generally continues from the edge of the raised central portion 38 and follows the contours of the outer perimeter 34.

The first resilient midsole layer 14 is configured with a central raised portion 38 inward of the peripheral region 22. Side surfaces 40A, 40B of the central raised portion 38 extend upward from an upward facing surface 42 to form a medial side recess 44A and a lateral side recess 44B. The side recesses 44A, 44B extend along the peripheral region 22 from the heel region 28 to forward ends 46A, 46B, respectively. The side recesses 44A, 44B and the heel region 28 are configured to be complementary to the shape of the bladder element 16 so that the bladder element 16 can be supported on the first resilient midsole layer 14 with the heel portion 24 supported at the peripheral region 22 at the heel region 28, with the medial arm portion 26A fit in the side recess 44A, and with the lateral arm portion 26B fit in the side recess 44B. When fit to the first resilient midsole layer 14 in this manner, a terminal end 48A of the medial arm portion 26A rests at the forward end 46A of the side recess 44A, and a terminal end 48B of the lateral arm portion 26B rests at the forward end 46B of the side recess 44B. The terminal ends 48A, 48B are thus rearward of a forward-most portion 50 of the peripheral region 22. As shown in FIG. 1, the first resilient midsole layer 14 has an upwardly-extending lip 52 at the forward-most portion 50 of the peripheral region 22. The first resilient midsole layer 14 has a series of notches 51 in the peripheral region 22 at the medial side 53 of the first resilient midsole layer 14 that provide flexibility in an arch region. A lateral side 55 of the first resilient midsole layer 14 is without notches in the embodiment shown, but may also be notched. The notches 51 can be configured so that when the medial arm portion 26A of the bladder element seats at the peripheral region 22 of the first resilient midsole layer 14, the notches 51 are open at an underside. The midsole layer flexes at the notches, and the bottom surface of the midsole layer 14 can have an outsole layer to provide increased traction.

Figure 3:
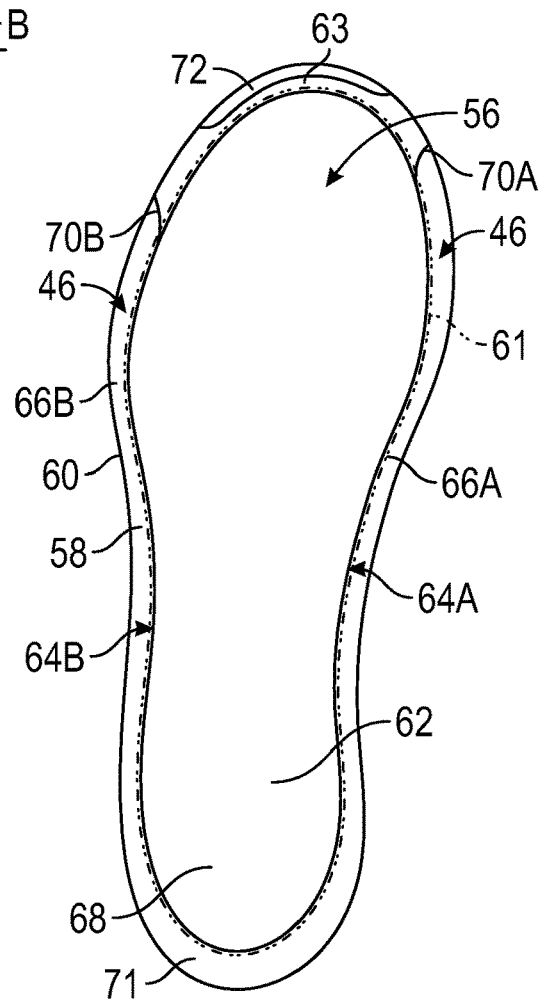
FIG. 3 is a schematic illustration in bottom view of a second resilient midsole layer of the midsole assembly of FIG. 1 with an inward extent of a peripheral region indicated in phantom.

Referring now to FIGS. 1 and 3, the midsole assembly 10 includes the overlaying element 18 which in this embodiment is a second resilient midsole layer 18 that is a unitary layer configured to extend the entire underfoot region of the article of footwear 12. The second resilient midsole layer 18 may be a polymer foam material similar to the first resilient midsole layer 14. Alternatively, the second resilient midsole layer 18 may be a non-foam polymer material with a durometer selected to be relatively low or relatively high in comparison to the first resilient midsole layer 14, as desired. The second resilient midsole layer 18 has an upper surface 54 that faces generally upward when the second resilient midsole layer 18 is assembled in the article of footwear 12, and a lower surface 56 that faces generally downward when the second resilient midsole layer 18 is assembled in the article of footwear 12. FIG. 3 shows that a peripheral region 58 of the second resilient midsole layer 18 is a region extending from an outer perimeter 60 of the second resilient midsole layer 18 slightly inward. The inward extent of the peripheral region 58 is indicated with phantom line 61 in FIGS. 2 and 3.

The second resilient midsole layer 18 is configured with a central raised portion 62 inward of the peripheral region 58. Side surfaces 64A, 64B of the central raised portion 62 extend downward from a downward-facing surface 46 to form a medial side recess 66A and a lateral side recess 66B. The side recesses 66A, 66B extend along the peripheral region 58 from a heel portion 68 to forward ends 70A, 70B, respectively. The central raised portion 62 and downward-facing surface 46 also define a recess 71 at the heel region 68. The heel recess 71 joins the side recesses 66A, 66B to define together with the side recesses 66A, 66B a peripheral cavity 66A, 71, 66B configured to receive the bladder element 16. The side recesses 66A, 66B and the heel recess 71 are configured to be complementary to the shape of the bladder element 16 so that the second resilient midsole layer 18 can be supported on the bladder element 16 with the heel portion 24 supported in the heel recess 71, with the medial arm portion 26A fit in the side recess 66A, and with the lateral arm portion 26B fit in the side recess 66B. When fit to the second resilient midsole layer 18 in this manner, a terminal end 48A of the medial arm portion 26A rests at the forward end 70A of the side recess 66A, and a terminal end 48B of the lateral arm portion 26B rests at the forward end 70B of the side recess 66B. The terminal ends 48A, 48B are thus rearward of a forward-most portion 63 of the peripheral region 58. As shown in FIG. 1, the second resilient midsole layer 18 has a downward-extending lip 72 at the forward-most portion 63 of the peripheral region 58.

When assembled in this manner and secured to one another under any of the methods described herein, the internal chamber 20 indicated in FIG. 5 is formed between the arm portions 26A, 26B, above the first resilient midsole layer 14, and below the second resilient midsole layer 18.

The lip 72 of the second resilient midsole layer 18 and the lip 52 of the first resilient midsole layer 14 can be secured to one another as described herein to close the forward portion of the midsole assembly 10. The first resilient midsole layer 14, the bladder element 16 and the second resilient midsole layer 18 thus define and seal the internal chamber 20. The internal chamber 20 may contain air at ambient pressure. The chamber 20 can extend forward of the heel region 28 between the first resilient midsole layer 14 and the second resilient midsole layer 18, or all or only portions of the central raised portion 62 of the second resilient midsole layer 18 can be in contact with portions of the central raised portion 38 of the first resilient midsole layer 14 under all conditions, or only under a predetermined amount and distribution of downward force on the midsole assembly 10. The foam layers 14, 18 may be more resilient than the bladder element 16, such that the bladder element 16 provides a desirable level of support and stability along the perimeter 22 at the heel region 28 and in the recesses 44A, 44B, while a greater cushioned response is provided in the midfoot region 32 and the forefoot region 30.

Additionally, a greater stiffness of the bladder element 16 will cause the bladder element 16 to be biased toward the unflexed position shown in FIG. 1. If the forefoot region 30 is flexed relative to the midfoot region 32 and the heel region 28, the arm portions 26A, 26B will also flex due to proximity to and termination near the forefoot region 30. The arm portions 26A, 26B will urge the forefoot region 30 to the unflexed position of FIG. 1, causing the forefoot region 30 to snap back to the unflexed position when the force flexing the forefoot region 30 lessens. The first resilient midsole layer 14 may have a first hardness, and the second resilient midsole layer 18 may be configured to have a second hardness that is greater than the first hardness. By providing the second resilient midsole layer 18 with a greater hardness, additional support and motion control relative to the bladder element 16 is provided for the foot of a wearer.

The central raised portion 38 of the first resilient midsole layer 14 ends at an arcuate ridge 76 of the central raised portion 38 forward of the heel region 28, and a surface 78 of the central raised portion 38 gradually tapers slightly rearward to the upward-facing surface 42. The taper of the surface 78 may be configured to match the curvature of the generally inward-facing surface 80 of the bladder element 16, enabling the bladder element 16 to be supported at and secured to the second resilient midsole layer 18 at the inward-facing surface 80. In this manner, a generally-outward-facing surface 82 of the bladder element 16 is unobstructed by the second resilient midsole layer 18, and is exposed on the article of footwear 12. Additionally, the bladder element 16 may be a substantially transparent material so that a view through the entire bladder element 16 from the lateral side 55 shown in FIG. 5 to the medial side 53 at the heel region 28 is possible. As used herein, a component is "substantially transparent" when it is sufficiently transparent to allow at least some light to pass through, thereby allowing visibility there through. A substantially transparent item may be translucent, and may be clear or may have a tinted color.

When the heel portion 24 of the bladder element 16 extends along the peripheral region 22 at the heel region 28, an internal chamber 74A is defined at the heel region 28 between the central raised portion 38 and the heel portion 24. The internal chamber 74A opens to the internal chamber 20. The first resilient midsole layer 14 can also be provided with one or more recesses in either or both of the midfoot region 32 or the forefoot region 30. FIG. 1 shows two interconnected recesses 74B, 74C between the forefoot region 30 and the midfoot region 32. The recesses 74B, 74C may also be referred to as internal chambers or may be continuous with the internal chamber 20 depending on whether the central raised portion 62 is configured to interact with the raised portion 38 in a manner that seals the recesses 74A, 74B. In the embodiment shown, the second resilient midsole layer 18 serves to close off the internal chamber 20 and the recesses 74B, 74C, creating pods of ambient air at the internal chamber 20 and the recesses 74B, 74C that function similar to the bladder element 16 without the addition of components. That is, the recesses 74A, 74B, 74C are void of material, allowing the material of the foam layers 14, 18 bordering the recesses 74A, 74B, 74C greater ability to compress during load-bearing impact, providing energy absorption to create a desirable underfoot feel. Optional upwardly-extending protrusions 74D, 74E of the first resilient midsole layer 14 extend toward the upper foam layer 18 and fill a portion of the recesses 74B, 74C. The configuration of the protrusions 74D, 74E can be tuned to control contact of the first resilient midsole layer 14 with the second resilient midsole layer 18 at the recesses 74B, 74C. Cushioning with a first energy absorption characteristic occurs in a first stage of compression prior to full contact of the first resilient midsole layer 14 with the second resilient midsole layer 18, and cushioning with a second energy absorption characteristic occurs in a second stage of compression after full contact of the first resilient midsole layer 14 with the second resilient midsole layer 18. In other embodiments, additional bladder elements can be placed in the recesses 74B, 74C.

Figure 4:
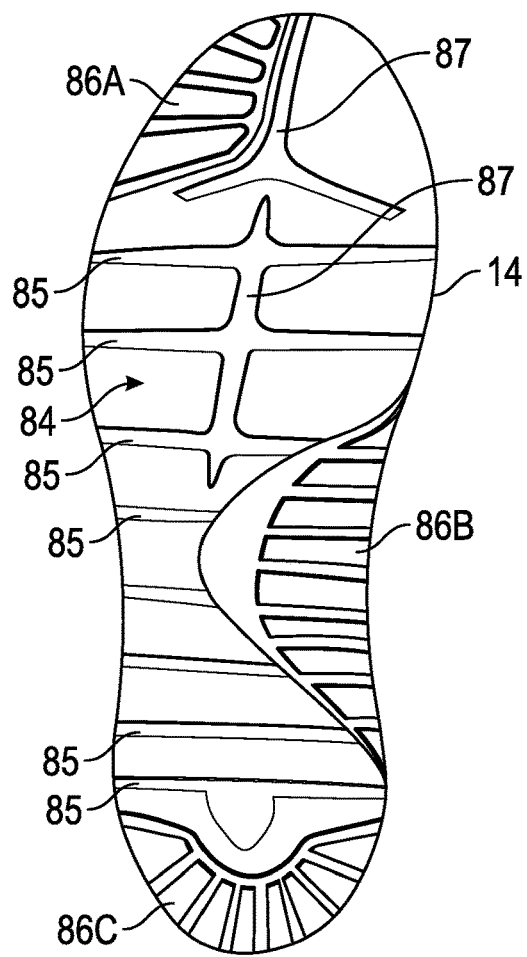
FIG. 4 is a schematic illustration in bottom view of the first resilient midsole layer of FIGS. 1-2 with outsole elements.

FIG. 4 shows a bottom surface 84 of the first resilient midsole layer 14 that serves as a ground contacting surface. The bottom surface 84 can have a variety of textures and formations. In the embodiment shown, the bottom surface 84 has a plurality of laterally-extending grooves 85 that promote flexibility of the first resilient midsole layer 14. Grooves 87 extending generally fore-aft are also provided. In one embodiment, a plurality of outsole elements 86A, 86B, 86C of a highly durable material such as rubber are secured to the bottom surface 84 in high wear areas. In an alternative embodiment in which the first resilient midsole layer 14 is a bladder element, the outsole elements 86A, 86B, 86C are coextruded with the bladder element material of the first resilient midsole layer 14. In such an embodiment, the first resilient midsole layer 14 and the outsole elements 86A, 86B, 86C are a single, integrated, one-piece component, over which the overlaying component 18 is laid to seal off the recesses 74A, 74B, 74C. In still other embodiments, the bottom surface 84 alone can serve as the ground contacting surface without the addition of outsole elements. In either instance, the first resilient midsole layer 14 of the midsole assembly 10 can be referred to as a unisole, because the first resilient midsole layer 14 and midsole assembly 10 are configured such that a conventional full-length outsole need not be provided.

A footwear upper 31 is secured to the second resilient midsole layer 18 by any suitable manner, such as adhesives, stitching, a combination of these methods, or otherwise. In the embodiment shown, the upper 31 is adhered to a perimeter of the second resilient midsole layer 18. A strobel unit can be adhered to the upper 31 and can overlay and be adhered to the upper surface 54 of the second resilient midsole layer 18. The footwear upper 31 may include multiple textile layers hot-melted together with TPU or polymer foam. A fabric net can also be integrated in the upper 31, and stretched as desired prior to hot-melting the upper components to one another, thereby affecting elasticity in various areas as desired.

Figure 6:
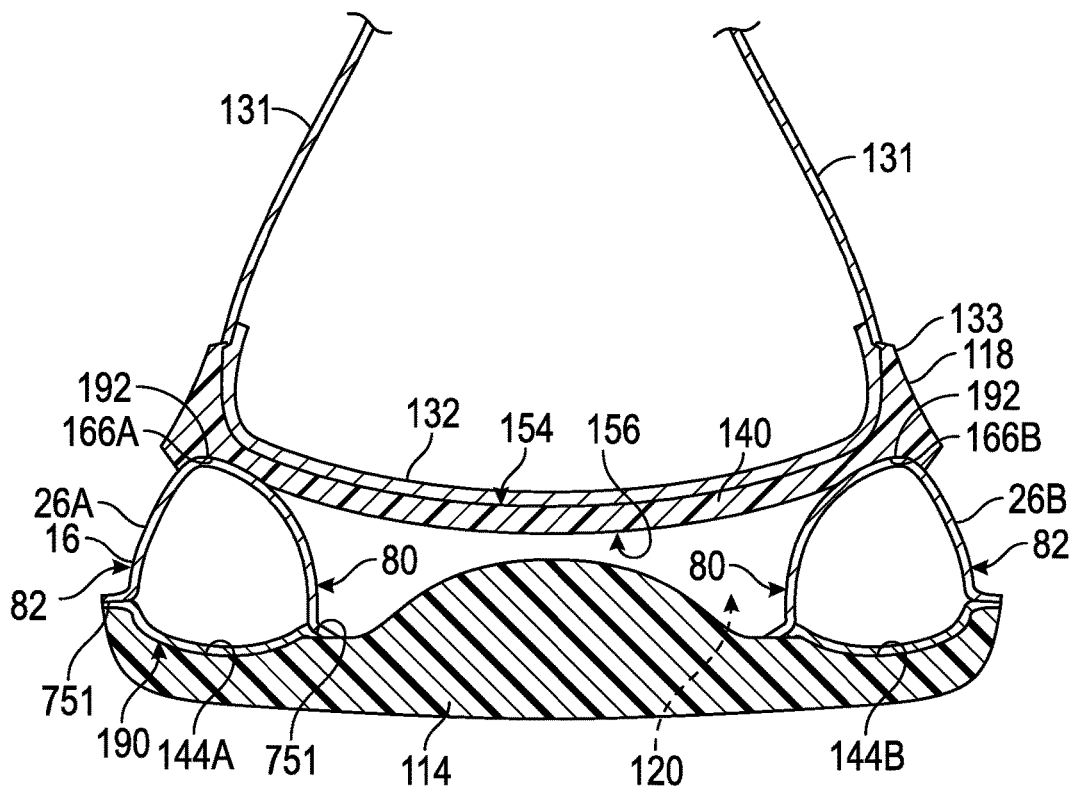
FIG. 6 is a schematic illustration in cross-sectional view of another embodiment of an article of footwear taken at lines 6-6 in FIG. 7.
Figure 7:
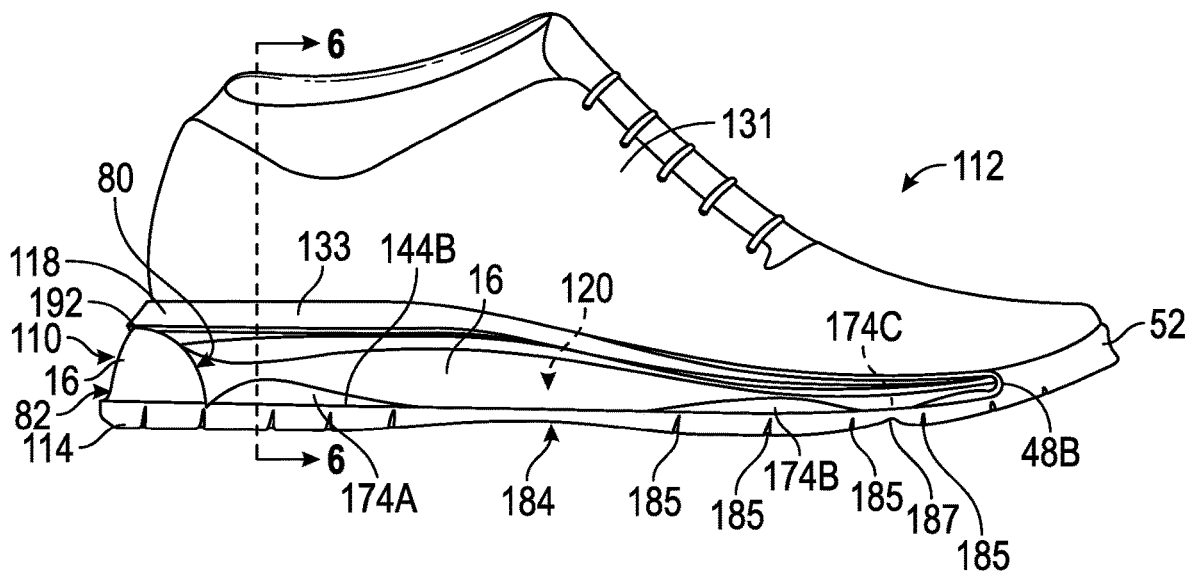
FIG. 7 is a schematic illustration in side view of a lateral side of the second embodiment of an article of footwear.

FIGS. 6 and 7 show another embodiment of an article of footwear 112 with a midsole assembly 110 having many of the same components as the midsole assembly 10. Identical reference numbers are used for components identical to those shown and described with respect to FIGS. 1-5. For example, the bladder element 16 is the same as previously described. A first resilient midsole layer 114 is similar to first resilient midsole layer 14 but has upwardly-extending protrusion 174A in the heel region and upwardly-extending protrusion 174B in the forefoot region, both of which are visible through the substantially transparent bladder element 16 from the exterior of the article of footwear 112 as indicated in FIG. 7. The first resilient midsole layer 114 has laterally-extending grooves 185 on a bottom surface 184, and no outsole elements. Only some of the grooves 185 are indicated in FIG. 7. A relatively large groove 187 extends laterally across the forefoot region to promote flexibility of the first resilient midsole layer 114 in the forefoot region.

Figure 16:
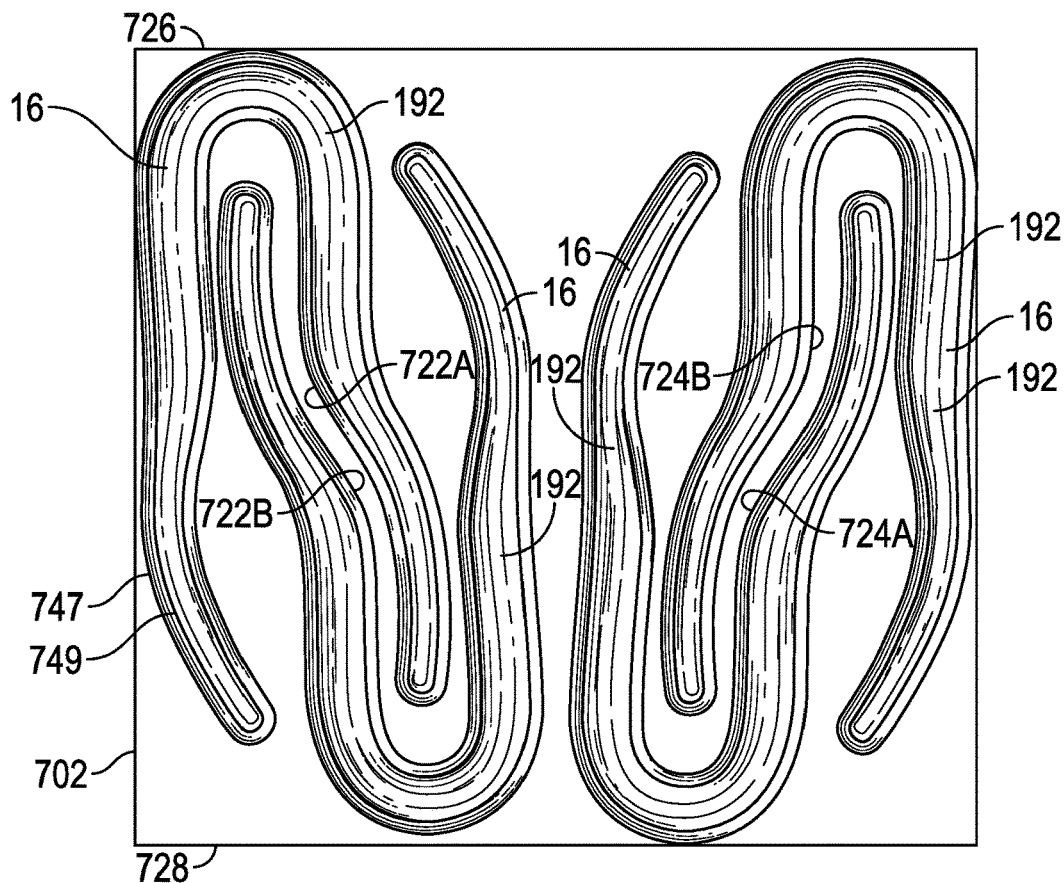
FIG. 16 is a schematic illustration in plan view of a first mold portion containing four bladder elements thermoformed therein.

As is apparent in FIGS. 6 and 7, when inflated, the bladder element 16 is configured with a base surface 190 (also referred to as a base portion) that rests on the first resilient midsole layer 114. The first resilient midsole layer 114 is configured with a medial side recess 144A and a lateral side recess 144B a portion of which is visible in FIG. 6. The recesses 144A, 144B are configured to receive the medial arm portion 26A and the lateral arm portion 26B, respectively. The bladder element 16 is configured to taper from the base surface 190 to a peak 192 extending along the upper portion of the bladder element 16 opposite the first resilient midsole layer 114. The peak 192 is also illustrated in FIG. 16. The peak 192 separates the outer surface of the bladder element 16 between the generally outward-facing side surface 82 that extends between the base surface 190 and the peak 192, and the generally inward-facing side surface 80 that extends between the base surface 190 and the peak 192.

The second resilient midsole layer 118 is configured with a lower surface 156 facing generally downward that has a medial side recess 166A and a lateral side recess 166B with a central raised portion 140 extending generally downward and partially defining the side recesses 166A, 166B. The second resilient midsole layer 118 is configured cooperatively with the first resilient midsole layer 114 and the bladder element 16 so that the second resilient midsole layer 118 is supported substantially on the inward-facing surface 80 of the bladder element 16, enabling a large portion of the outward-facing surface 82 to be exposed. When the first resilient midsole layer 114, the bladder element 16, and the second resilient midsole layer 118 are assembled in this manner and secured to one another such as by adhesives, a sealed internal chamber 120 is formed that is at ambient pressure. Either or both of the first resilient midsole layer 114 and the second resilient midsole layer 118 can have recesses opening to the internal chamber 120 or covered by the other of the foam layers 114, 118 to create internal ambient pods to affect flexibility and ride. For example, FIG. 7 shows that the first resilient midsole layer 114 has a recess 174C in the forefoot region. During engagement of the article of footwear 112 with the ground plane and under sufficient loading force of at least a threshold minimum loading force, the second resilient midsole layer 118 may contact the protrusion 174B such that the recess 174C may be closed off from the internal chamber 120, and thereby function as a separate embodiment pod affecting cushioning and ride of the article of footwear 112. The second resilient midsole layer 118 may contact the protrusion 174A in a similar manner to close off the portion of chamber 120 forward of the protrusion 174A from the portion rearward of the protrusion 174A.

A footwear upper 131 is secured to the second resilient midsole layer 118 by any suitable manner, such as adhesives, stitching, a combination of these methods, or otherwise. In the embodiment shown, the upper 131 is adhered to an upward extending flange 133 that extends around a perimeter of the second resilient midsole layer 118. As shown in FIG. 7, the flange 133 is exposed on the article of footwear 112. A strobel unit 132 is adhered to the upper 131 and overlays and is adhered to the upper surface 154 of the second resilient midsole layer 118. The footwear upper 131 may include multiple textile layers hot-melted together with TPU or polymer foam. A fabric net can also be integrated in the upper 131, and stretched as desired prior to hot-melting the upper components to one another, thereby affecting elasticity in various areas as desired.

Figure 8:
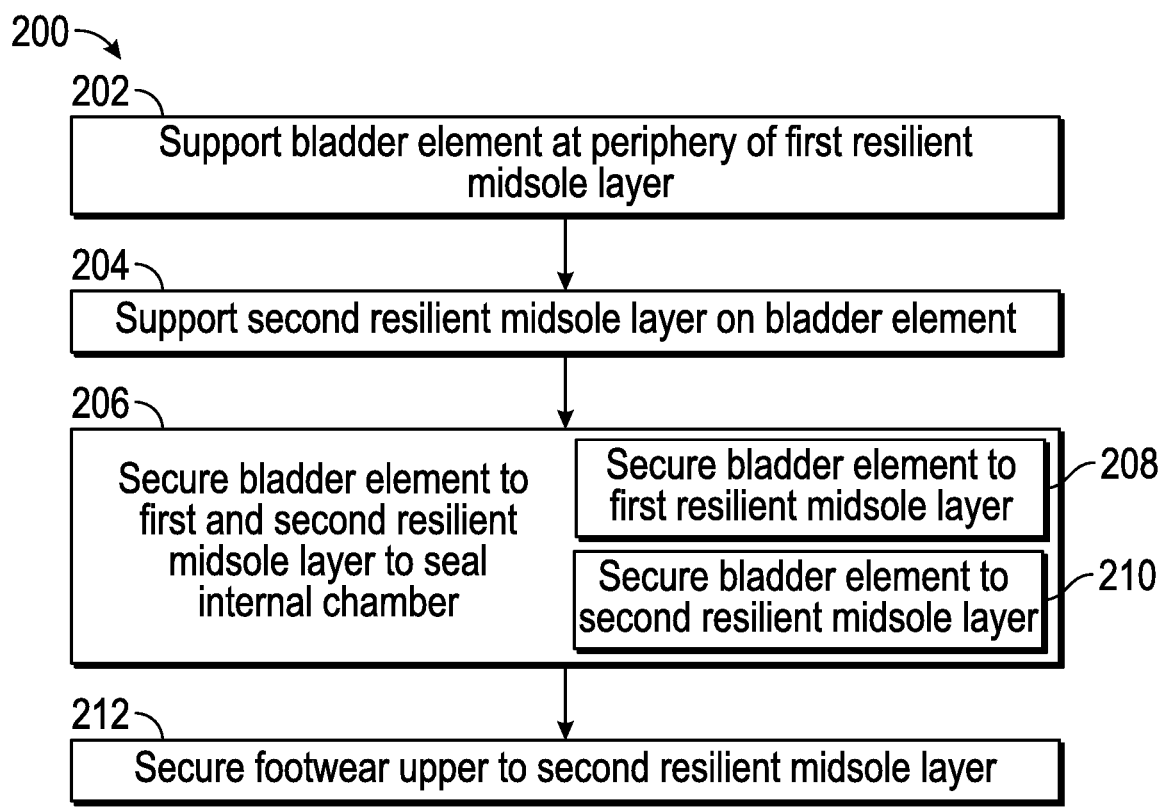
FIG. 8 is a flow diagram of a method of manufacturing the articles of footwear of FIGS. 1-7.

FIG. 8 is a flow diagram of one method of manufacturing 200 the article of footwear 12 of FIGS. 1-5 or the article of footwear 112 of FIGS. 6-7. The method 200 includes supporting a bladder element 16 at the peripheral region of the first resilient midsole layer 14 or 114 in step 202. Step 202 may include placing the medial and lateral arms portions 26A, 26B in the side recesses 44A, 44B, and the heel portion 24 at the heel region 28 of the first resilient midsole layer 14 or 114. Optionally, the method 200 may also include forming the bladder element 16, such as by thermoforming or by any other suitable method, and inflating the bladder element. Manufacturing the bladder element may be according to the method of manufacturing 800 described herein with respect to FIGS. 17, 18 and 21. Alternatively, manufacturing of the bladder element 16 can be accomplished separately, and the method 200 can be accomplished using a pre-manufactured bladder element that is provided prior to the method 200.

The method 200 also includes supporting the second resilient midsole layer 18 or 118 on the bladder element 16. Step 204 may include placing the medial and lateral arm portions 26A, 26B in the side recesses 66A, 66B of second resilient midsole layer 18 or side recesses 166A, 166B of second resilient midsole layer 118, and the heel portion 24 in the heel recess 71.

With the bladder element 16 arranged between the first resilient midsole layer 14 or 114 and the second resilient midsole layer 18 or 118 in this manner, the first and second resilient midsole layers 14 or 114 and 18 or 188 are secured to the bladder element 16 in step 206 to seal the internal chamber 20 or 120.

Securing the bladder element 16 to the first resilient midsole layer 14 or 114 in step 206 may include sub-step 208, in which the base surface 190 of the bladder element 16 is secured to the first resilient midsole layer 14 by adhesives. Step 206 may also include sub-step 210, in which the second resilient midsole layer 18 or 118 is secured to the bladder element 16 by adhesives, with the second resilient midsole layer 18 or 118 being positioned substantially at the inward facing surface 80, inward of the peak 192. The method 200 includes step 212 in which the footwear upper 131 and strobel unit 132 are secured to the second resilient midsole layer 18 or 118, such as by adhesives, stitching, or both.

Figure 9:
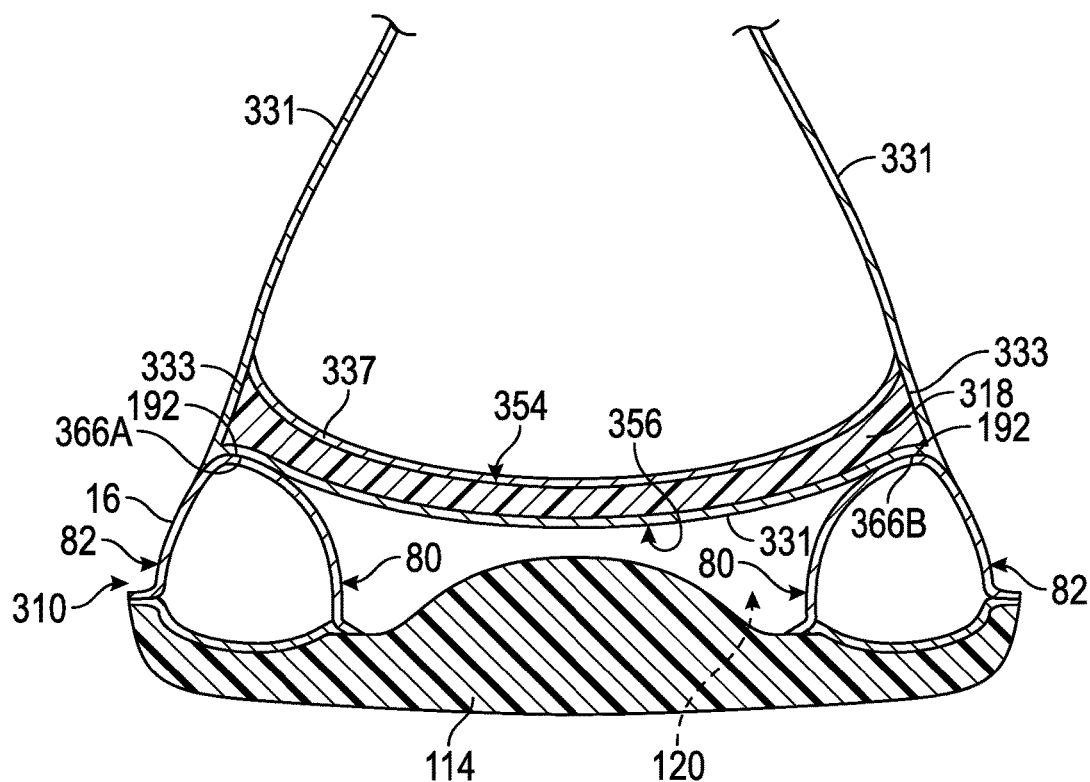
FIG. 9 a schematic illustration in cross-sectional view of another embodiment of an article of footwear taken at lines 9-9 in FIG. 10.
Figure 10:
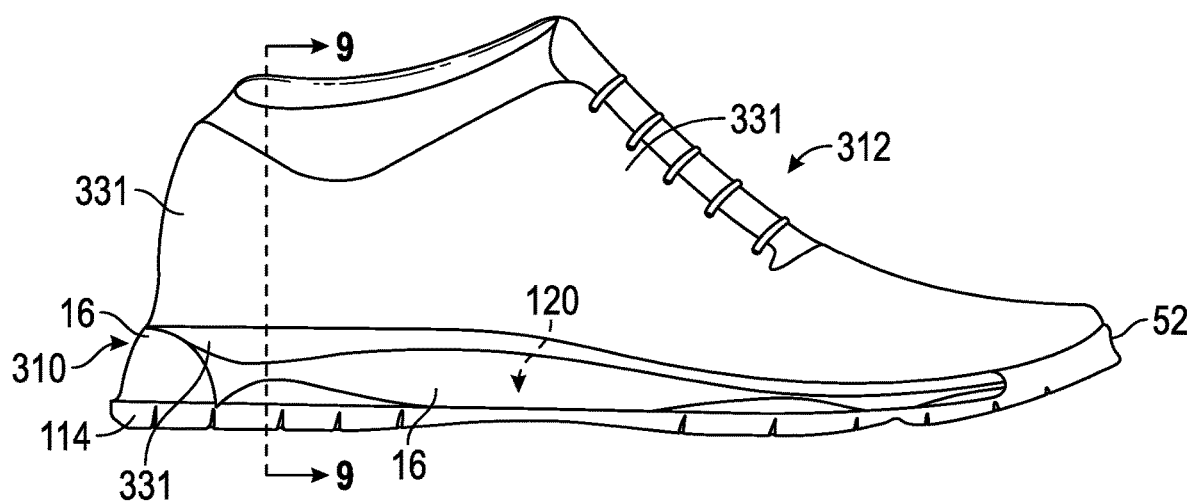
FIG. 10 is a schematic illustration in side view of a lateral side of the article of footwear of FIG. 9.

FIGS. 9 and 10 show another embodiment of a midsole assembly 310 for an article of footwear 312. The midsole assembly 310 and article of footwear 312 are alike in all aspects to the midsole assembly 110 and article of footwear 112 except that the overlaying component is both a footwear upper 331 and strobel unit 337 with a second resilient midsole layer 318 to which the footwear upper 331 is double-lasted. The footwear upper 331 surrounds the sides 333 of the second resilient midsole layer 318 as well as the bottom surface 356 of the second resilient midsole layer 318. The upper 331 and strobel unit 337 may be secured to the second resilient midsole layer 318 by adhesive, heat fusing or by any other suitable manner.

As is apparent in FIG. 10, the second resilient midsole layer 318 is thus completely concealed at the exterior of the article of footwear 312 by the upper 331. The upper 331 rather than the second resilient midsole layer 318 is in direct contact with the bladder element 16. The bottom portion of the upper 331 at the underside of the second resilient midsole layer 318 is visible through the bladder 16 from the lateral and medial sides of the article of footwear 312.

Figure 11:
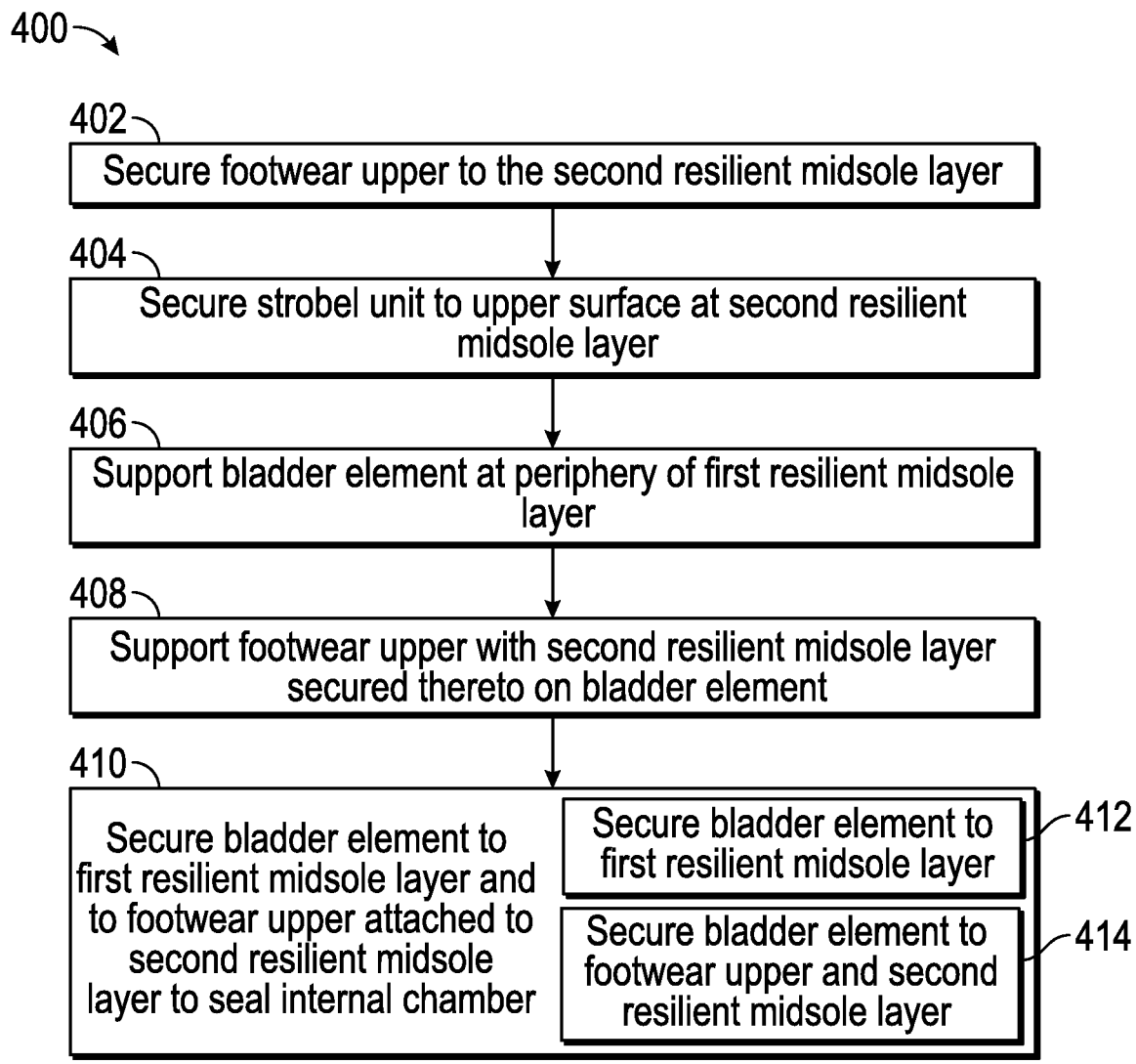
FIG. 11 is a flow diagram of a method of manufacturing the article of footwear of FIGS. 9-10.

FIG. 11 is a flow diagram of one method of manufacturing 400 the article of footwear 312 of FIGS. 9-10. The method 400 includes securing the footwear upper 331 to the second resilient midsole layer 318 in step 402, and in step 404, securing a strobel unit 337 to the second resilient midsole layer 318 at the upper surface 354 of the second resilient midsole layer 318. Alternatively, the upper 331 can be secured to the upper surface 354, and a separate upper layer can be secured to the side 333 and bottom surface 356. In either case, securing can be by adhesives, heat fusing, or the like.

The bladder element 16 is then supported at the peripheral region of the first resilient midsole layer 114 in step 406. Step 406 may include placing the medial and lateral arms portions 26A, 26B in the side recesses 44A, 44B, and the heel portion 24 at the heel region 28 of the first resilient midsole layer 114. Optionally, the method 400 may also include forming the bladder element 16, such as by thermoforming or by any other suitable method, and inflating the bladder element. Additionally, the bladder element 16 may be manufactured according to the method of manufacturing 800 described herein with respect to FIGS. 17, 18 and 21. Alternatively, manufacturing of the bladder element 16 can be accomplished separately, and the method 400 can be accomplished using a pre-manufactured bladder element that is provided prior to the method 400.

The method 400 also includes step 408, supporting the upper 331 with the second resilient midsole layer 318 attached thereto as set forth in steps 402 and 404, on the bladder element 16. Step 408 may include placing the medial and lateral arm portions 26A, 26B in side recesses 366A, 366B that run along the peripheral region of the second resilient midsole layer 318 similar to recesses 66A, 66B of FIG. 3, and the heel portion 28 in a recess similar to recess 71 of FIG. 3.

With the bladder element 16 arranged between the first resilient midsole layer 114 and the second resilient midsole layer 318 in this manner, the first resilient midsole layer 114 and the second resilient midsole layer 318 with upper 331 attached thereto are secured to the bladder element 16 in step 410 to seal the internal chamber 120.

Securing the bladder element 16 to the first resilient midsole layer 114 may include sub-step 412, in which the base portion 40 of the bladder element 16 is secured to the first resilient midsole layer 114 by adhesive, heat fusing, or any other suitable manner. Step 410 may also include sub-step 414, in which the second resilient midsole layer 318 with attached upper 331 is secured to the bladder element 16 by adhesives, heat-fusing, or other suitable manner, with the second resilient midsole layer 318 being positioned substantially at the inward facing surface 80, inward of the peak 192.

Figure 12:
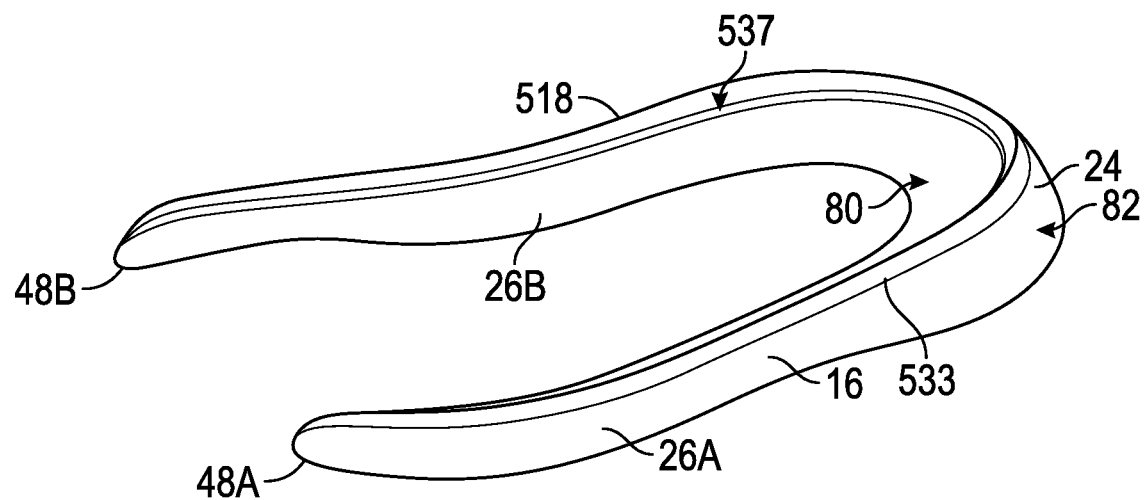
FIG. 12 is a schematic illustration in perspective view of another embodiment of a peripheral bladder element.
Figure 13:
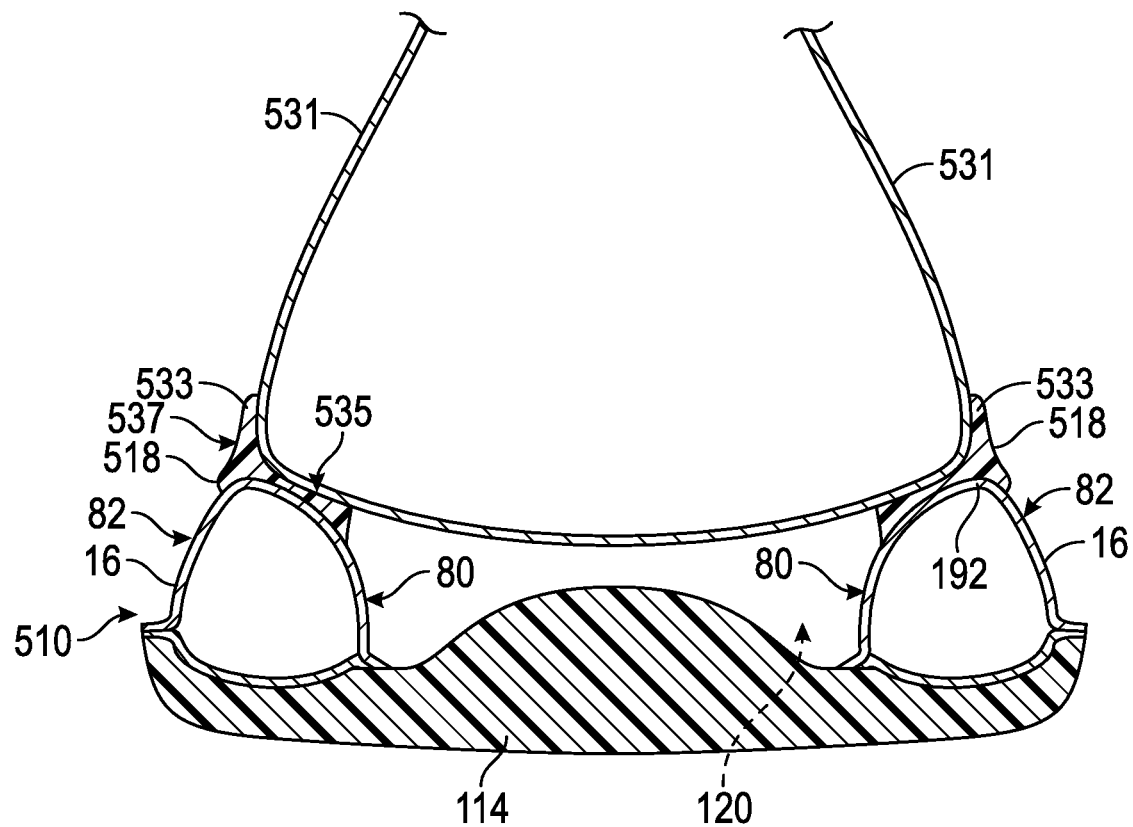
FIG. 13 is a schematic illustration in cross-sectional view of another embodiment of an article of footwear taken at lines 13-13 in FIG. 14.
Figure 14:
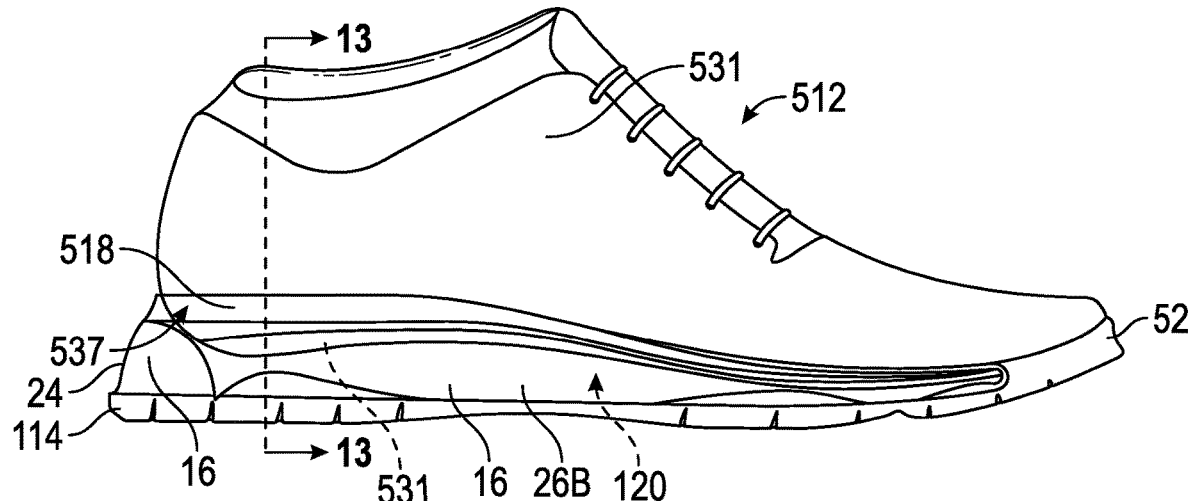
FIG. 14 is a schematic illustration in side view of a lateral side of the article of footwear of FIG. 13.
Figure 20:
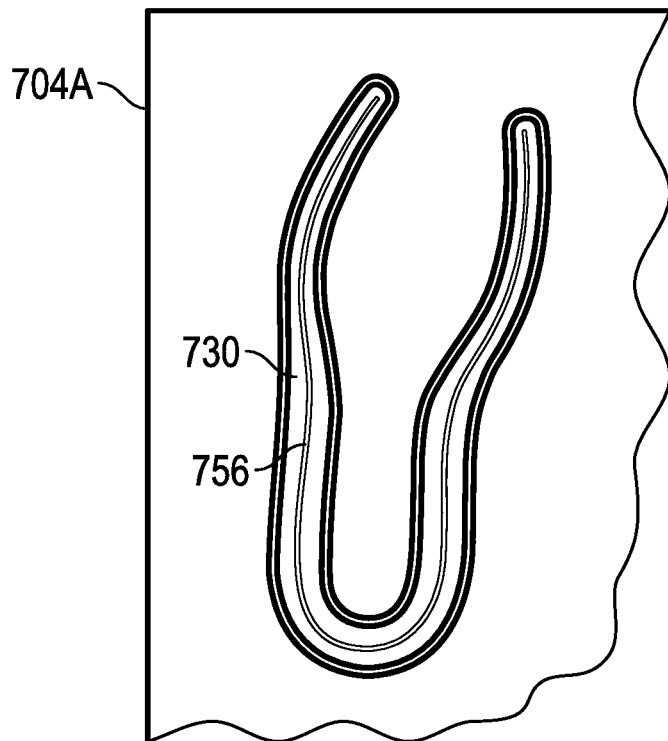
FIG. 20 is a schematic illustration in fragmentary plan view of a first mold portion of the mold assembly of FIG. 19.

FIGS. 13 and 14 show another embodiment of a midsole assembly 510 for an article of footwear 512. The midsole assembly 510 and article of footwear 512 are alike in many aspects to the midsole assembly 110 and article of footwear 112. Identical components are indicated with identical reference numbers and are as described with respect to FIGS. 6-7. The midsole assembly 510 has the same bladder element 16 and first resilient midsole layer 114. The midsole assembly 510 does not have a second resilient midsole layer like second resilient midsole layer 118. Instead, a rim 518 functions as an overlaying component. As shown in FIG. 12, the rim 518 extends along the entire bladder element 16 at an upper extent, and is secured to the bladder element 16 substantially on the inward-facing surface 80. The rim 518 extends generally along the peak 192 from the terminal ends 48A, 48B and around the heel portion 24 and functions as a perch to which a footwear upper 531 is secured. The rim 518 can be any suitable material that can be secured to the bladder element 16 and to the footwear upper 531. In one embodiment, the rim 518 is thermoplastic polyurethane (TPU) and is co-molded with the bladder element 16 as further described herein with respect to FIGS. 19-21.

The rim 518 has an upwardly-extending flange 533 that functions as a cage or outer rail to provide side support for the footwear upper 531. The footwear upper 531 is attached to a generally upward-facing interior surface 535 of the rim 518, inward of the flange 533, so that the rim 518 separates the footwear upper 531 from the bladder element 16 and an exterior surface 537 of the flange 533 is exposed.

The footwear upper 531 may be attached by any suitable method, such as by adhesives. The rim 518 may be substantially transparent. Accordingly, with the substantially transparent bladder element 16 and substantially transparent rim 518, the footwear upper 531 and the internal chamber 120 are exposed and visible from an exterior of the article of footwear 512. An insole (not shown) can be placed in and stitched or adhered to the upper 531. The footwear upper 531 may include multiple textile layers hot-melted together with TPU or polymer foam. A fabric net can also be integrated in the upper 531, and stretched as desired prior to hot-melting the upper components to one another, thereby affecting elasticity in various areas as desired.

Figure 15:
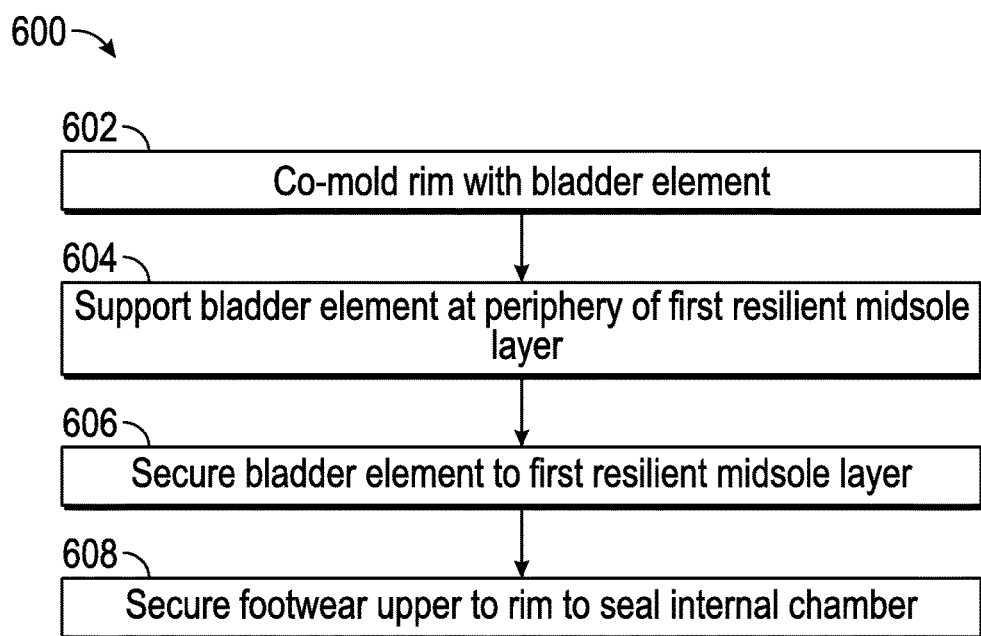
FIG. 15 is a flow diagram of a method of manufacturing the article of footwear of FIGS. 13-14.

FIG. 15 is a flow diagram of one method of manufacturing 600 the article of footwear 512 of FIGS. 12-14. The method 600 may include co-molding the rim 518 with the bladder element 16 in step 602. The bladder element 16 may be manufactured according to the method of manufacturing 900 described herein with respect to FIGS. 19, 20, and 22. Alternatively, manufacturing of the bladder element 16 with the co-molded rim 518 can be accomplished separately, and the method 600 can be accomplished using a pre-manufactured bladder element 16 with co-molded rim 518 that is provided prior to the method 600.

The bladder element 16 with co-molded rim 518 is then supported at the peripheral region of the first resilient midsole layer 114 in step 604. Step 604 may include placing the medial and lateral arms portions 26A, 26B in the side recesses 44A, 44B, and the heel portion 24 at the heel region 28 of the first resilient midsole layer 114.

The method includes step 606, securing the bladder element 16 to the first resilient midsole layer 114, such as by adhesive or heat fusing. The method 600 also includes step 608, securing the footwear upper 531 to the rim 518 such as by adhesive. With the footwear upper 531 and the first resilient midsole layer 114 secured to the bladder element 16, the internal chamber 120 is bounded by and sealed between the upper 531, the rim 518, the bladder 16, and the first resilient midsole layer 114.

Figure 17:
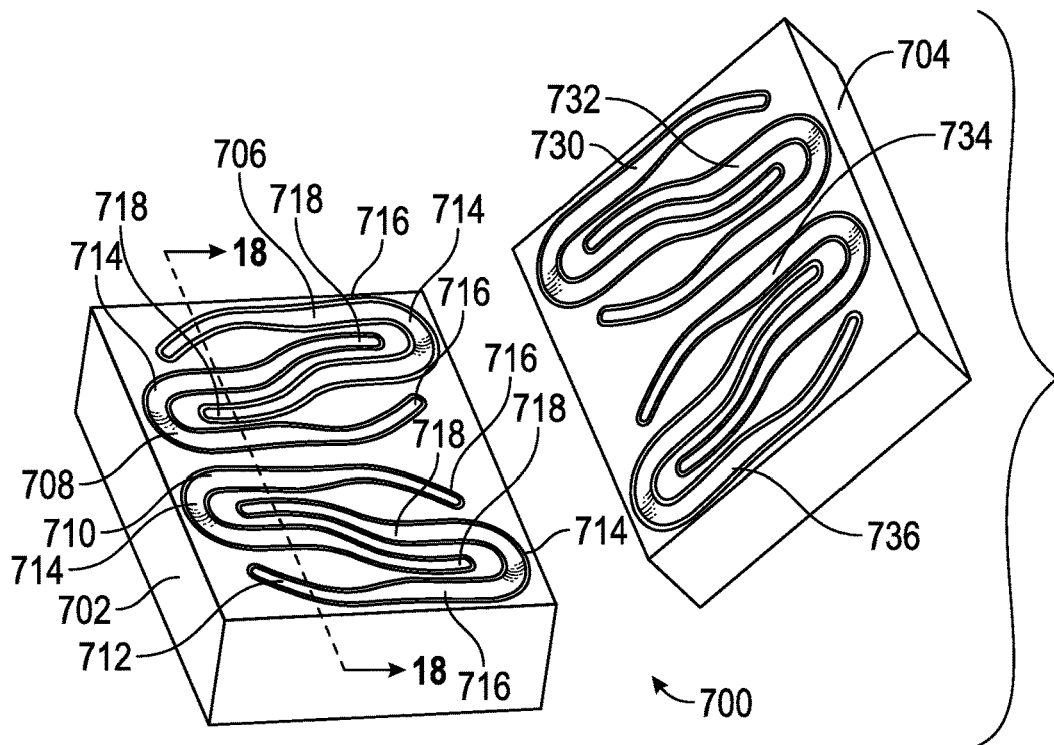
FIG. 17 is a schematic illustration in exploded view of a first embodiment of a mold assembly including the first mold portion of FIG. 16.

The unique shape of the bladder element 16 enables efficient manufacturing with the potential for material and time savings. As shown in FIGS. 17-19, portions of adjacent mold cavities can be nested together, enabling molding of multiple bladder elements 16 in a single mold assembly. Specifically, FIGS. 17-18 show a mold assembly 700 that includes a first mold portion 702 and a second mold portion 704 configured for simultaneous thermoforming of multiple bladder elements, reducing scrap of the material used for thermoforming the bladder elements 16. Although the mold assembly 700 illustrates only four mold cavity portions 702, 704, 706, 708, the mold assembly 700 may be configured with additional nested pairs of mold cavity portions depending on the size of the sheet material that is thermoformed. The first mold portion 702 defines a first mold cavity portion 706 and a second mold cavity portion 708. Additionally, the first mold portion 702 defines a third mold cavity portion 710 and a fourth mold cavity portion 712. Each mold cavity portion 706, 708, 710, and 712 has a substantially arc-shaped heel cavity portion 714, a lateral arm cavity portion 716, and a medial arm cavity portion 718. The lateral arm cavity portion 716 and the medial arm cavity portion 718 each extend from and are continuous with the respective heel cavity portion 714. The first mold cavity portion 706 and the second mold cavity portion 708 are each for a bladder element 16 to be used in an article of footwear having a right foot orientation, as the medial arm cavity portion 718 extends from the left side of the heel cavity portion 714 when viewed with the arm cavity portions 716, 718 extending upward from the heel cavity portion 714. The third mold cavity 710 and the fourth mold cavity 712 are each for a bladder elements 16 to be used in an article of footwear having a left foot orientation, as the medial arm cavity portion 718 extends from the right side of the heel cavity portion 714 when viewed with the arm cavity portions 716, 718 extending upward from the heel cavity portion 714. FIG. 16 shows four bladder element 16 supported on the first mold portion 702 after thermoforming in the mold assembly 700.

When arranged as shown in FIG. 17, the medial arm cavity portion 718 of the first mold cavity 706 is between the lateral arm cavity portion 716 and medial arm cavity portion 718 of the second mold cavity 708 and extends generally toward the heel portion 714 of the second mold cavity 708. The medial arm cavity portion 718 of the second mold cavity 708 is between the lateral arm cavity portion 716 and medial arm cavity portion 718 of the first mold cavity 706 and extends generally toward the heel portion 714 of the first mold cavity 706. Similarly, the medial arm cavity portion 718 of the third mold cavity 710 is between the lateral arm cavity portion 716 and the medial arm cavity portion 718 of the fourth mold cavity 712. The lateral arm cavity portion 716 of the second mold cavity 708 is adjacent the lateral arm cavity portion 716 of the third mold cavity 710.

As discussed with respect to FIGS. 16 and 18, polymeric sheet material may be used to form the bladder elements 16, and may be laid over the first mold portion 702 across the mold cavity portions 706, 708, 710, 712 during the formation process. A portion of the sheet material 750, 752 extending between the arm portions 716, 718 of the first mold cavity 706 is thus utilized in forming the medial arm portion of a second bladder element 16 via the inter-disposed medial arm portion 718 of the second mold cavity 710. As best indicated in FIG. 16, which shows the resulting bladder elements 16 still in the mold cavities of the first mold portion 702, the curvature of the inner edge 722A of the medial arm portions 718 of the bladder element 16 formed in the first mold cavity 706 follows the curvature of the inner edge 722B of the medial arm portion of the bladder element 16 formed in the second mold cavity 708 when the heel portion portion 714 of the first mold cavity 706 is disposed at a first end 726 of the first mold portion 702 and the heel cavity portion 714 of the second mold cavity 708 is disposed at an opposite second end 728 of the first mold portion 702 as shown. Likewise, the curvature 724A of the inner edge of the medial arm portion 718 of the bladder element 16 formed in the third mold cavity 710 follows the curvature 724B of the inner edge of the medial arm portion 718 of the bladder element 16 formed in the fourth mold cavity 712 when the heel cavity portion 714 of the third mold cavity 710 is disposed at the first end 726 and the heel cavity portion 714 of the fourth mold cavity 712 is disposed at an opposite second end 728 of the first mold portion 702 as shown.

When arranged in this manner, a first distance D1 from an outer edge of the lateral arm cavity portion 716 of the first mold cavity 706 to an outer edge of the lateral arm cavity portion 716 of the second mold cavity 708 is less than twice a second distance D2 from an outer edge of the medial arm cavity portion 718 of the first mold cavity 706 to an outer edge of the lateral arm cavity portion 716 of the first mold cavity 706. The first distance D1 and the second distance D2 are determined along a common cross-section extending across the medial and lateral arm cavity portions of the first and second mold cavities, as best indicated in FIG. 18. A third distance D3 from an outer edge of the lateral arm cavity portion 716 of the third mold cavity 710 to an outer edge of the lateral arm cavity portion 716 of the fourth mold cavity 712 is less than twice a fourth distance D4 from an outer edge of the medial arm cavity portion 718 of the third mold cavity 710 to an outer edge of the lateral arm cavity portion 716 of the third mold cavity 710. The third distance D3 and the fourth distance D4 are determined along a common cross-section extending across the medial and lateral arm cavity portions 716, 718 of the third and fourth mold cavities 710, 712. The first and second distances D1, D2 may be the same as the third and fourth distances D3, D4 if the bladder elements 16 are all of identical size.

FIGS. 17 and 18 show that the second mold portion 704 has mold cavity portions 730, 732, 734, 736 configured to correspond with the substantially arc-shaped heel cavity portions, the lateral arm cavity portions, and the medial arm cavity portions of the first, second, third, and fourth mold cavity portions 706, 708, 710, 712 of the first mold portion 702 when the second mold portion 704 is placed adjacent to the first mold portion 702 as shown in FIG. 18. The mold cavities of the first and second mold portions 702, 704 together define molds for the first, second, third, and fourth bladder elements 16 shown from left to right in FIG. 16 each having a substantially arc-shaped heel portion 24, a lateral arm portion 26B, and a medial arm portion 26A, with the lateral arm portion 26B and the medial arm portion 26A each extending from the substantially arc-shaped heel portion 24, and providing the peak 192, and base surface 190 such as shown and described with respect to FIG. 7.

FIG. 18 shows the mold cavities of the mold cavity portions 702, 704 aligned for simultaneous formation of the first, second, third and fourth bladder elements 16 of FIG. 16. The bladder elements 16 can be formed by any suitable process, such as thermoforming a first polymeric sheet 750 and a second polymeric sheet 752 as described in U.S. Pat. No. 6,082,025 to Bonk et al., which is hereby incorporated by reference in its entirety. The first and second sheets 750, 752 are originally planar, but take on the shapes of the mold cavities via vacuuming and heating steps included in the thermoforming process. The bladder elements 16 can then be cooled, inflated to a predetermined pressure, and sealed to retain pressure. Various thermoforming techniques may be used, such as are described in U.S. Pat. No. 6,119,371 to Goodwin et al., which is hereby incorporated by reference. The pressure and heat between the mold portions 702, 704 will cause the sheets to bond to one another in the areas between the arm portions. Excess material is then removed by trimming. A molded flange 747 around each of the bladder elements 16 can then be trimmed at an inner edge 749 so that the first bladder element 16 has a relatively small perimeter flange 751 (shown, e.g., in FIG. 6) at which the sheets 750, 752 are bonded to one another. Trimming may be automated and may occur at a separate steel roll die trim. Alternatively, trimming could be accomplished manually.

FIG. 19 shows an alternate mold assembly 700A that has an identical first mold portion 702 to mold assembly 700, but utilizes a second mold portion 704A that has a rim portion 756 extending from each mold cavity portion 730, 732, 734, 736. The rim portion 756 extends along the entire mold cavity portion as indicated with respect to mold cavity portion 730 in FIG. 20. The rim portion 756 is filled with a TPU material to form a rim 518 shown in FIGS. 12 and 13. The TPU material can be placed in the rim portion 756 and co-molded with the first sheet 750 and second sheet 752 so that the rim portions 756 are integral with the bladder elements 16.

Figure 21:
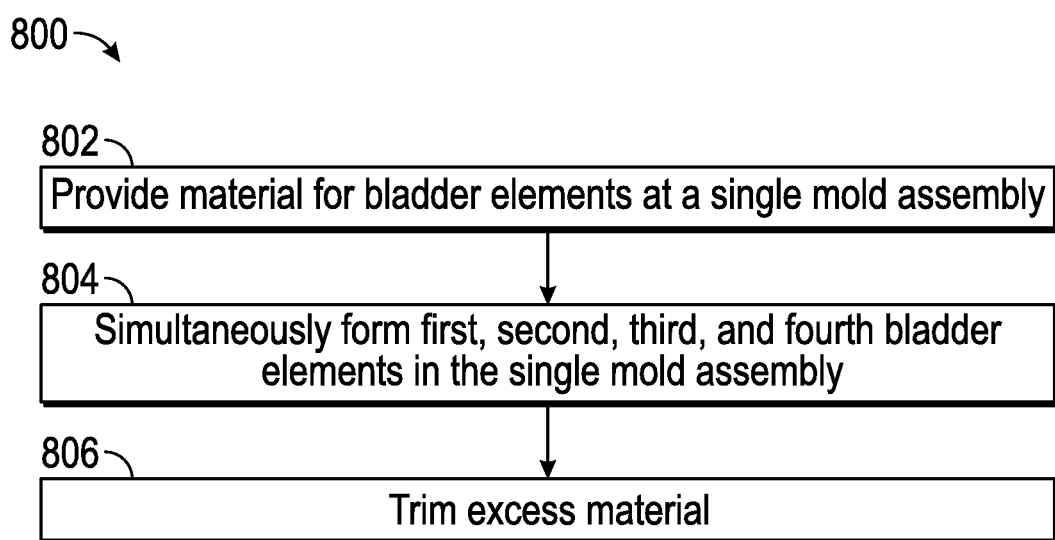
FIG. 21 is a flow diagram of a method of manufacturing footwear with the mold assembly of FIG. 18.

FIG. 21 is a flow diagram of a method of manufacturing 800 the bladder elements of FIGS. 16 and 18 using the mold assembly 700. Under the method 800, materials for the bladder elements 16 are provided at the mold assembly 700 in step 802. Step 802 may include placing sheets of material 750, 752 in the mold assembly 700. The first, second, third, and fourth bladder elements 16 are then formed in step 804, with the first bladder elements 16 being formed in mold cavity portions 706 and 730, the second bladder elements 16 being formed in mold cavity portions 708 and 732, the third bladder element 16 being formed in mold cavity portions 710, 734, and the fourth bladder element 16 being formed in mold cavity portions 712, 736. The forming step 804 may include thermoforming by heating the sheets of material 750, 752, providing vacuum to urge the sheets to the shape of the mold cavities, and subsequently inflating and sealing the bladder elements 16. In step 806, excess sheet material is trimmed, such as at cut lines 760, so that a small flange borders the perimeter of the bladder element, similar to the flange 751 shown in FIG. 6. The trimming may occur after removal of the sheets 750, 752 from the mold assembly 700. The sheets 750, 752 will be bonded together in the areas between the mold cavities portions 706 and 730, 708 and 732, 710, 734, and 712, and 736 due to the compression of the mold assembly 700 and thermoforming of the materials.

Figure 22:
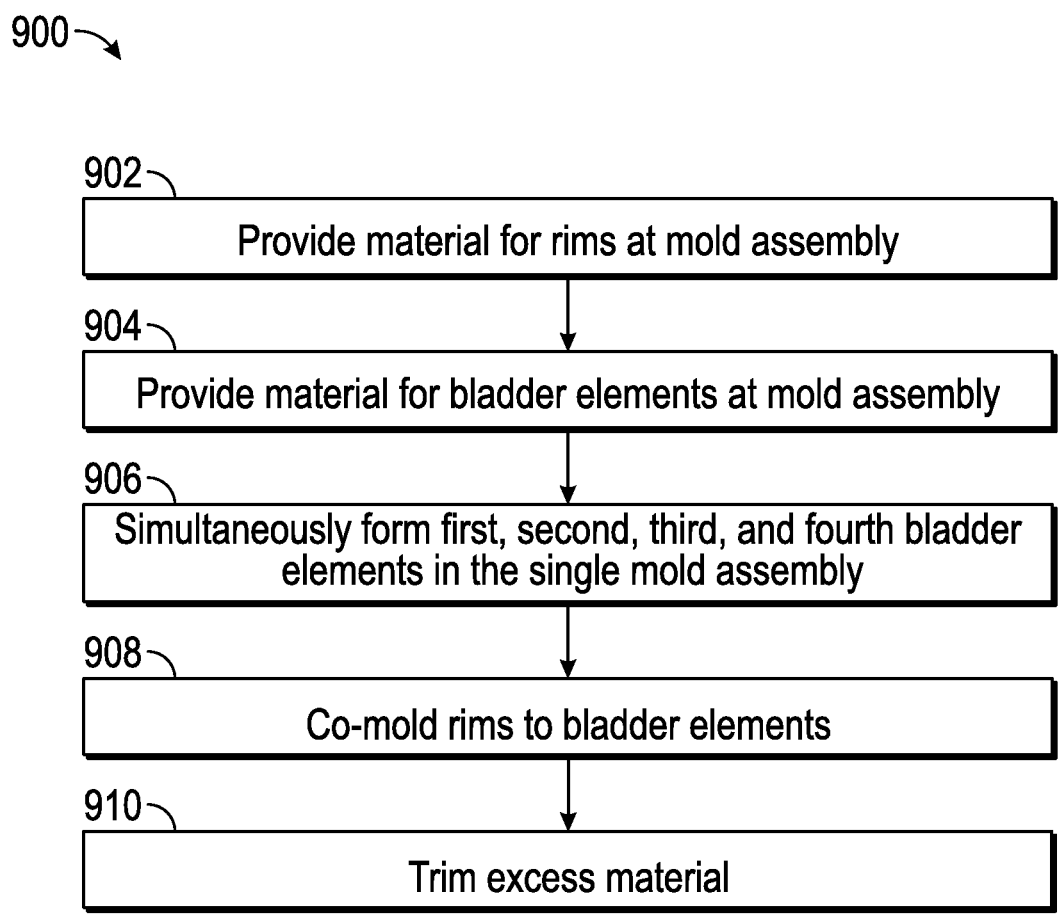
FIG. 22 is a flow diagram of a method of manufacturing footwear with the mold assembly of FIG. 19.
Figure 23:
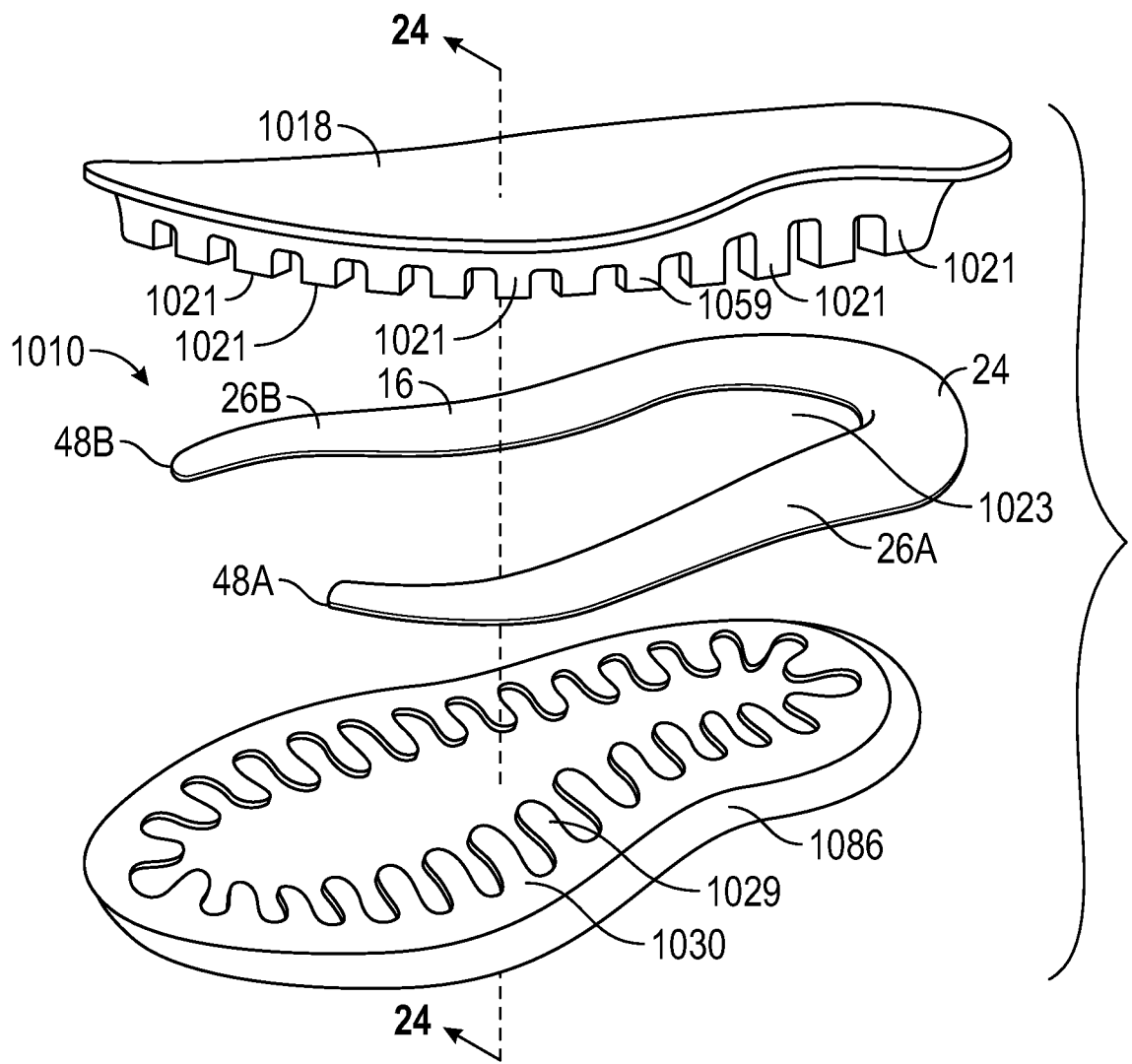
FIG. 23 is a schematic illustration in exploded perspective view of another embodiment of a midsole assembly including a peripheral fluid-filled bladder element for an embodiment of an article of footwear.

FIG. 22 is a flow diagram of a method of manufacturing 900 the bladder elements of FIGS. 12, 13 and 19 using the mold assembly 700A. Under the method 900, material for the rim 518 is provided at the mold assembly 700A in step 902, and material for the bladder elements 16 is provided at the mold assembly 700A in step 904. Step 902 may include placing the rim material in the rim cavity portion 756 of the mold portion 704A. Step 904 may include placing sheets of material 750, 752 in the mold assembly 700A. The first, second, third, and fourth bladder elements 16 are then formed, in step 906 with the first bladder elements 16 being formed in mold cavity portions 706 and 730, the second bladder element 16 being formed in mold cavity portions 708 and 732, the third bladder element 16 being formed in mold cavity portions 710, 734, and the fourth bladder element 16 being formed in mold cavity portions 712, 736. The forming step 906 may include thermoforming by heating the sheets of material 750, 752, providing vacuum to urge the sheets to the shape of the mold cavities, and subsequently inflating and sealing the bladder elements 16. The rims are co-molded to the bladder elements 16 in step 908. Step 908 can occur prior to or simultaneously with step 906. In step 910, excess sheet material is trimmed, such as at cut lines 760, so that a small flange borders the perimeter of the bladder element, similar to the flange 751 indicated in FIG. 6. The trimming may occur after removal of the sheets 750, 752 from the mold assembly 700A. The sheets 750, 752 will be bonded together in the areas between the mold cavity portions 730 and 732, and between the mold cavity portions 734 and 736, due to the compression of the mold assembly 700A and thermoforming of the materials.

Referring to FIGS. 23-27, a midsole assembly 1010 and an outsole 1086 are shown in exploded view. The midsole assembly 1010 includes the fluid-filled bladder element 16 as described with respect to FIG. 1. When assembled, the midsole assembly 1010 and the outsole 1086 form the sole assembly of an article of footwear 1012 of FIG. 25. The bladder element 16 is arranged so that the substantially arc-shaped heel portion 24 is positioned in a heel region 28 of the article of footwear 1012, and the arm portions 26A, 26B extend from the heel region 28 to the forefoot region 30 along a peripheral region 22. The article of footwear 1012 has a heel region 28, a forefoot region 30, and a midfoot region 32 corresponding with portions of a human foot as described with respect to similar regions of the midsole layer 14 of FIG. 2.

Figure 25:
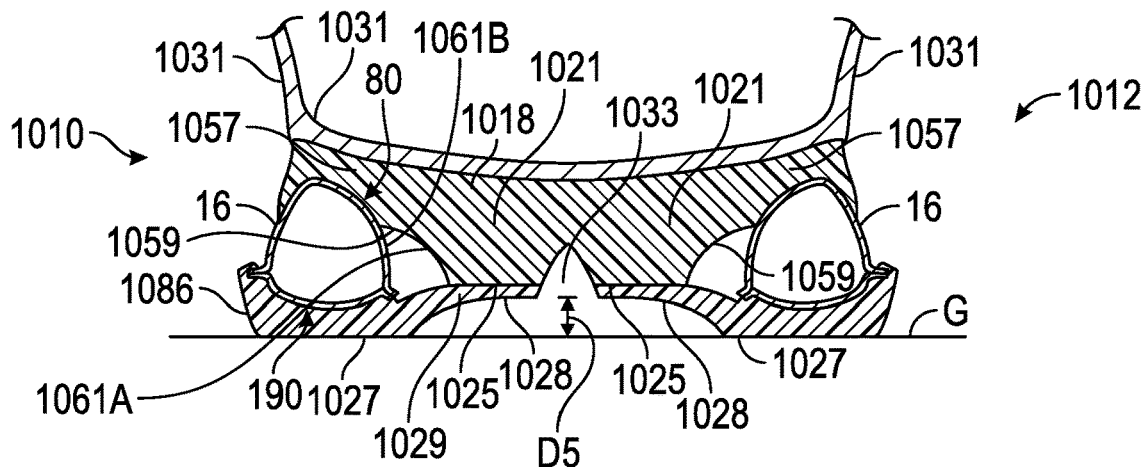
FIG. 25 is a schematic illustration in cross-sectional view of an article of footwear with the sole assembly of FIG. 23 taken at lines 25-25 in FIG. 27.

The midsole assembly 1010 includes a resilient midsole layer 1018 that is secured to and rests on the bladder element 16 as shown in FIG. 25. The midsole layer 1018 has a large number of protrusions 1021 that descend from a lower portion of the midsole layer 1018 into a cavity 1023 between the arm portions 26A, 26B. An outsole layer or outsole elements, such as an outsole layer 1086, is secured to the bladder element 16 as well as to a lowest extent 1025 of the protrusions 1021. The outsole layer 1086 can be a unitary layer that extends beneath and is secured to the bladder element 16 as well as to the protrusions 1021, or can be discrete outsole elements on a lower surface of the bladder element 16 and on each protrusion 1021. The outsole layer 1086 can be a material similar to the midsole layer 1018, a rubber material, or can be a unisole material. For example, if the outsole layer 1086 is a material similar to the midsole layer 1018, such as but not limited to foam, such as an EVA foam, then the outsole layer 1086 may function as another midsole layer, and additional outsole elements can be secured to a bottom surface thereof. The outsole layer 1086 can also be referred to as an additional sole layer, or an outer foam layer, and the midsole layer 1018 can be referred to as an inner foam layer.

The midsole layer 1018 is configured so that the lowest extent 1025 of each of the protrusions 1021 terminates above the base surface 190 of the bladder element 16 in the absence of at least the threshold loading force acting to compress the midsole layer 1018. A distance D5 spaces the lowest extent 1028 of the outsole layer 1086 secured to the protrusions 1021 from a lowest extent 1027 of the outsole layer 1086 where secured to the bladder element 16. The distance D5 thus also represents the distance of the lowest extent 1028 of the outsole layer 1086 from the ground plane G. The lowest extent 1028 of the outsole layer 1086 is the bottom surface of the outsole layer 1086 at the protrusions 1021. With this configuration, the protrusions 1021 are not in operative contact with the ground plane G in the absence of at least the threshold loading force on the midsole layer 1018, as represented by a compressive downward loading force F shown in FIG. 26. As used herein, the protrusions 1021 are in "operative contact" with the ground plane G when the protrusions 1021 directly contact the ground plane G if no outsole layer 1086 is provided. In other words, the protrusions 1021 are not in operative contact with the ground plane G until a loading force F is applied that is at least a predetermined threshold loading force that is sufficient to cause the lowest extent 1028 of the extension portions 1029 of the outsole layer 1086 to contact the ground plane G, with the extension portions 1029 thus becoming part of the ground contact surface of the article of footwear 1012. If additional outsole elements, such as outsole layer 1086, are secured to the protrusions 1021, then the protrusions are in operative contact with the ground plane G when the portion of the outsole layer 1086 secured to the protrusions 1021 contacts the ground plane G so that the protrusions 1021 are thus in indirect contact with the ground plane G.

Figure 24:
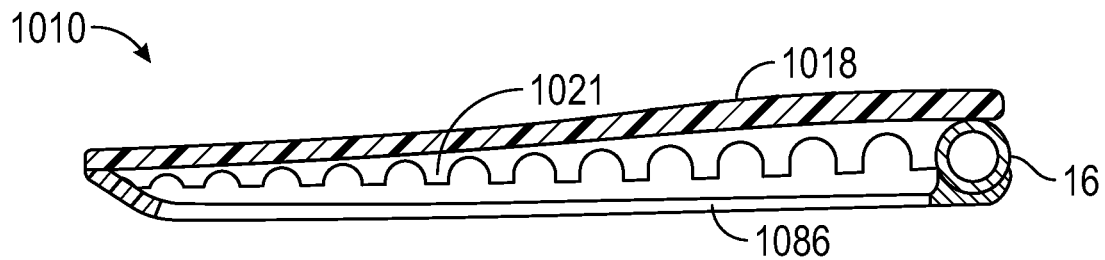
FIG. 24 is a schematic illustration in cross-sectional view of the sole assembly of FIG. 23 in an assembled state.
Figure 27:
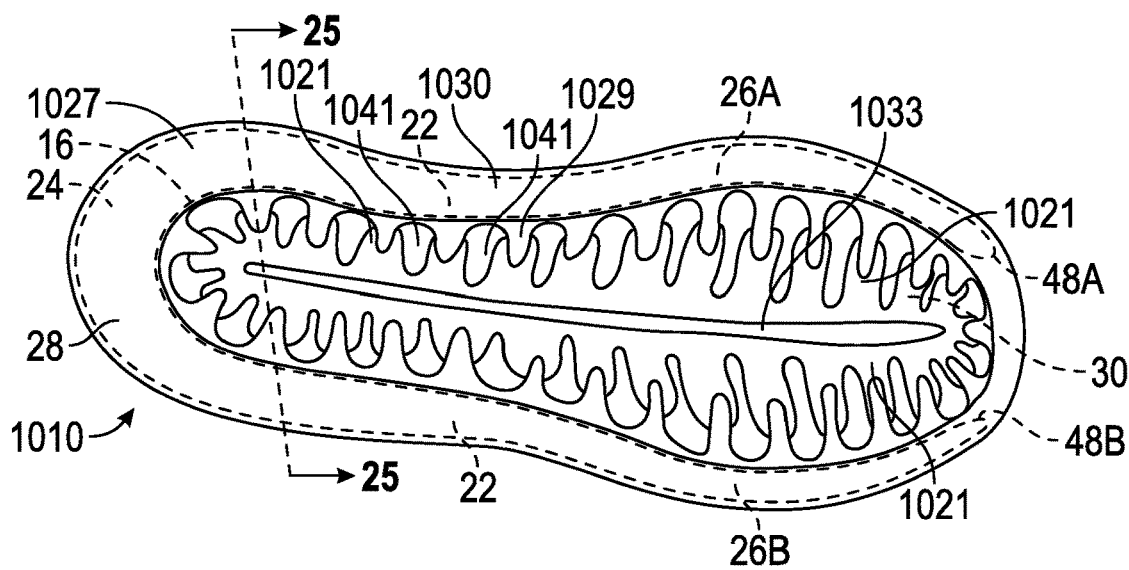
FIG. 27 is a schematic illustration in bottom view of the midsole assembly of FIG. 23 in an assembled state.

As best shown in FIGS. 24 and 27, the outsole layer 1086 is secured to the entire base surface 190 of the bladder element 16. The outsole layer 1086 has a peripheral portion 1030 and extension portions 1029 that extend inward and slightly upward from the peripheral portion 1030 to interface with the lowest extent 1025 of each protrusion 1021. The outsole layer 1086 is secured to the bladder element 16 at the peripheral portion 1030, and the protrusions 1021 are secured to the extension portions 1029 by bonding, adhesives, welding, or the like.

A flex groove 1033 is formed in and extends generally lengthwise across a bottom surface of the midsole layer 1018 from the forefoot region 30 to the heel region 28 between different ones of the protrusions 1021. Additional grooves 1041 extend generally laterally between the protrusions 1021. A footwear upper 1031 is welded, adhered, stitched, or otherwise secured to the midsole layer 1018.

Figure 26:
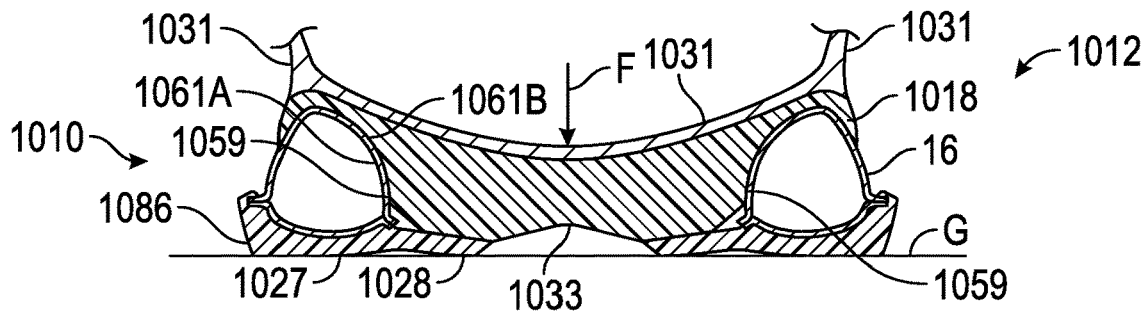
FIG. 26 is a schematic illustration in cross-sectional view of the article of footwear of FIG. 25 with the midsole assembly under compression.

As best shown in FIGS. 25 and 26, the resilient midsole layer 1018 and the bladder element 16 are configured so that a first portion 1057 of the resilient midsole layer 1018 adjacent the inward-facing surface 80 of the bladder element 16 is secured to the bladder element 16 such as by welding, bonding, or the like. A second portion 1059 of the resilient midsole layer 1018 adjacent the inward-facing surface 80 of the bladder element is spaced from the bladder element 16 when the threshold compressive force F is not applied to the resilient midsole layer 1018. In other words, as shown in FIG. 25, the second portion 1059 of each protrusion 1021 is spaced from the inward-facing surface 80 of the bladder element 16. The spacing of the second portions 1059 is due to the angling of the second portions 1059 inward toward the center of the midsole layer 1018 (i.e., toward the flex groove 1033) relative to the first portion 1057. The second portion 1059 has a surface profile 1061A that is substantially identical to a surface profile 1061B of the portion of the inward-facing surface 80 of the bladder element 16 that is adjacent to the second portion 1059.

Due to the flexible and resilient properties of the midsole layer 1018, under the threshold loading force F, compression of the midsole layer 1018 as well as flexing at the flex groove 1033 causes the second portions 1059 to move into contact with the inward-facing surface 80 of the bladder element 16, as shown in FIG. 26. During application of the force F, a first stage of attenuation of the force F occurs prior to operative contact of the protrusions 1021 with the ground plane G. That is, the first stage of attenuation occurs before the extension portion 1029 of the outsole layer 1086 contacts the ground plane G. During the first stage of attenuation, the midsole layer 1018 compresses downward to attenuate some of the loading force F. A second stage of attenuation occurs after the protrusions 1021 are in operative contact with the ground plane G through the extension portions 1029 of the outsole layer 1086, as shown in FIG. 26. In the first stage, compression and flexing of the midsole layer 1018 has caused some or all of the second portions 1059 to come into contact with the inward-facing surface 80 of the bladder element 16. During the second stage, the protrusions 1021 have moved into operative contact with the ground plane G, so that the loading force F is attenuated both by the protrusions 1021, and by the bladder element 16.

The midsole assembly 1010 can be tuned during the design of the assembly 1010 to provide a desired underfoot feel by selecting the spacing of the portions 1059 from the bladder element 16, the profile 1061A, the distance D5, the depth and width of the flex groove 1033, and the selection of material for the midsole layer 1018. For example, these variables may be selected so that the protrusions 1021 move into operative contact with the ground surface G under at least the threshold loading force F only after the second portion 1059 of the resilient midsole layer 1018 moves into contact with the inward-facing surface 80 of the bladder element 16. The midsole assembly 1010 can thus provide a first stage of attenuation of loading force when the second portion 1059 of the resilient midsole layer 1018 moves into contact with the inward-facing surface 80 of the bladder element, and a second stage of attenuation of loading force F when the protrusions 1021 thereafter move into operative contact with the ground surface G. Selecting the variables described can cause the first stage of attenuation to have a first energy absorbing characteristic, and the second stage of attenuation to have a second energy absorbing characteristic. For example, the rate of compression of the midsole assembly 1010 may be different in the different stages of attenuation. Additionally, when the protrusions 1021 contact the ground, a greater tactile underfoot feel is experienced by a wearer of the article of footwear 1012, which may be desirable.

Figure 28:
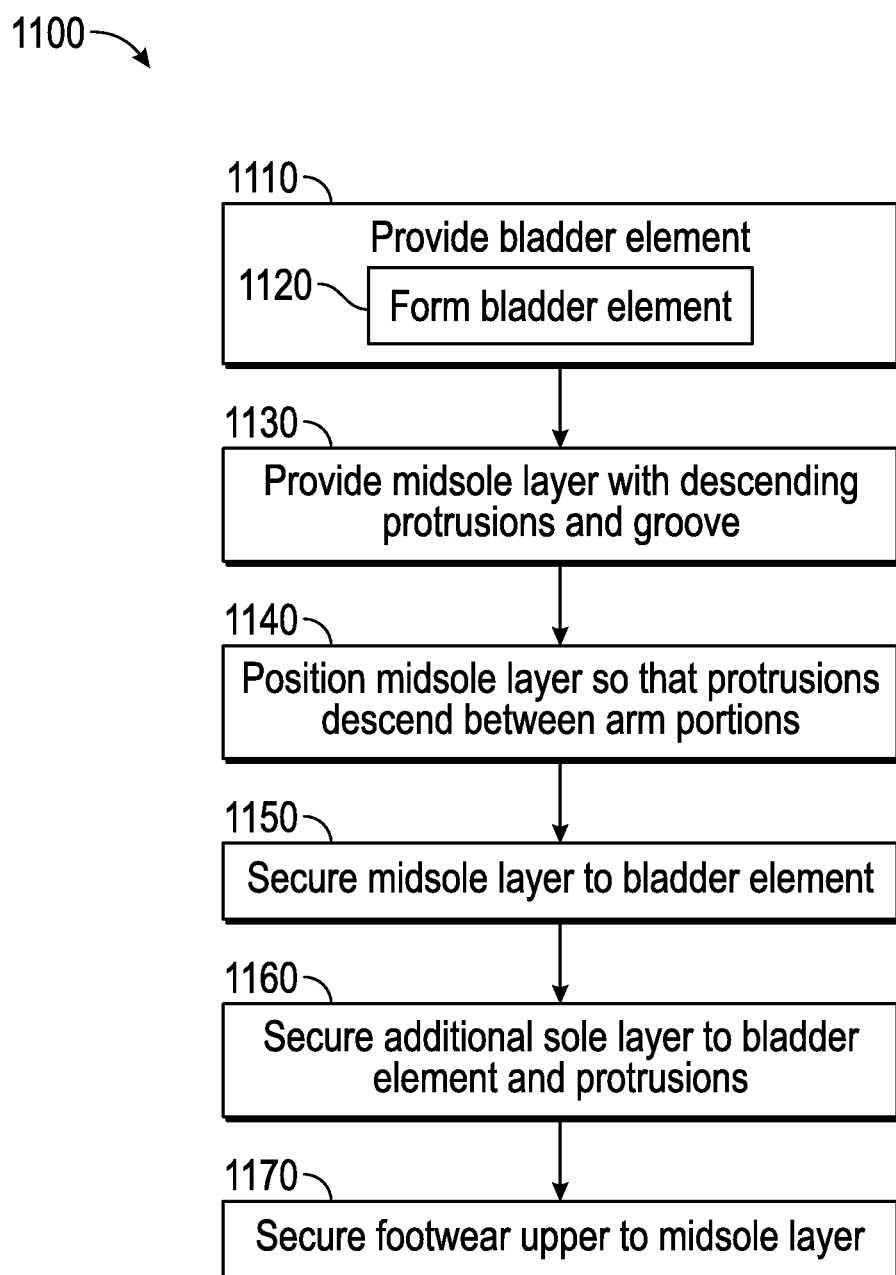
FIG. 28 is a flow diagram of a method of manufacturing the article of footwear of FIG. 23.

FIG. 28 shows a flow diagram of one method 1100 of manufacturing the article of footwear 1012 of FIGS. 23-27 with the midsole assembly 1010. The method 1100 begins in step 1110 by providing a bladder element 16 formed from first and second polymeric sheets so that the bladder element 16 has a substantially arc-shaped heel portion 24, a lateral arm portion 26B, a medial arm portion 26A laterally-spaced from the lateral arm portion 26B, and with the lateral arm portion and the medial arm portion each extending from the heel portion 24. Providing the bladder element 16 in step 1110 may also include forming the bladder element 16 in step 1120, as described with respect to FIGS. 17 and 18. Alternatively, the bladder element 16 can be obtained after it has been formed.

The method 1100 further includes step 1130 in which the midsole layer 1018 with the descending protrusions 1021 and the flex groove 1033 is provided. In step 1140, the midsole layer 1018 is positioned relative to the bladder element 16 so that the protrusions 1021 descend between the arm portions 26A and 26B into the cavity 1023. The midsole layer 1018 is then secured to the bladder element 16 in step 1150. As discussed with respect to FIG. 25, only a first portion 1057 of the midsole layer 1018 facing the inward-facing surface 80 of the bladder element 16 is secured to the bladder element 16. Optionally, in step 1160, an additional sole layer, such as outsole layer 1086, is secured to the bladder element 16 and, optionally, to the protrusions 1021. In step 1170, the footwear upper 1031 is secured to the midsole layer 1018 by any suitable manner such as disclosed herein.

Figure 29:
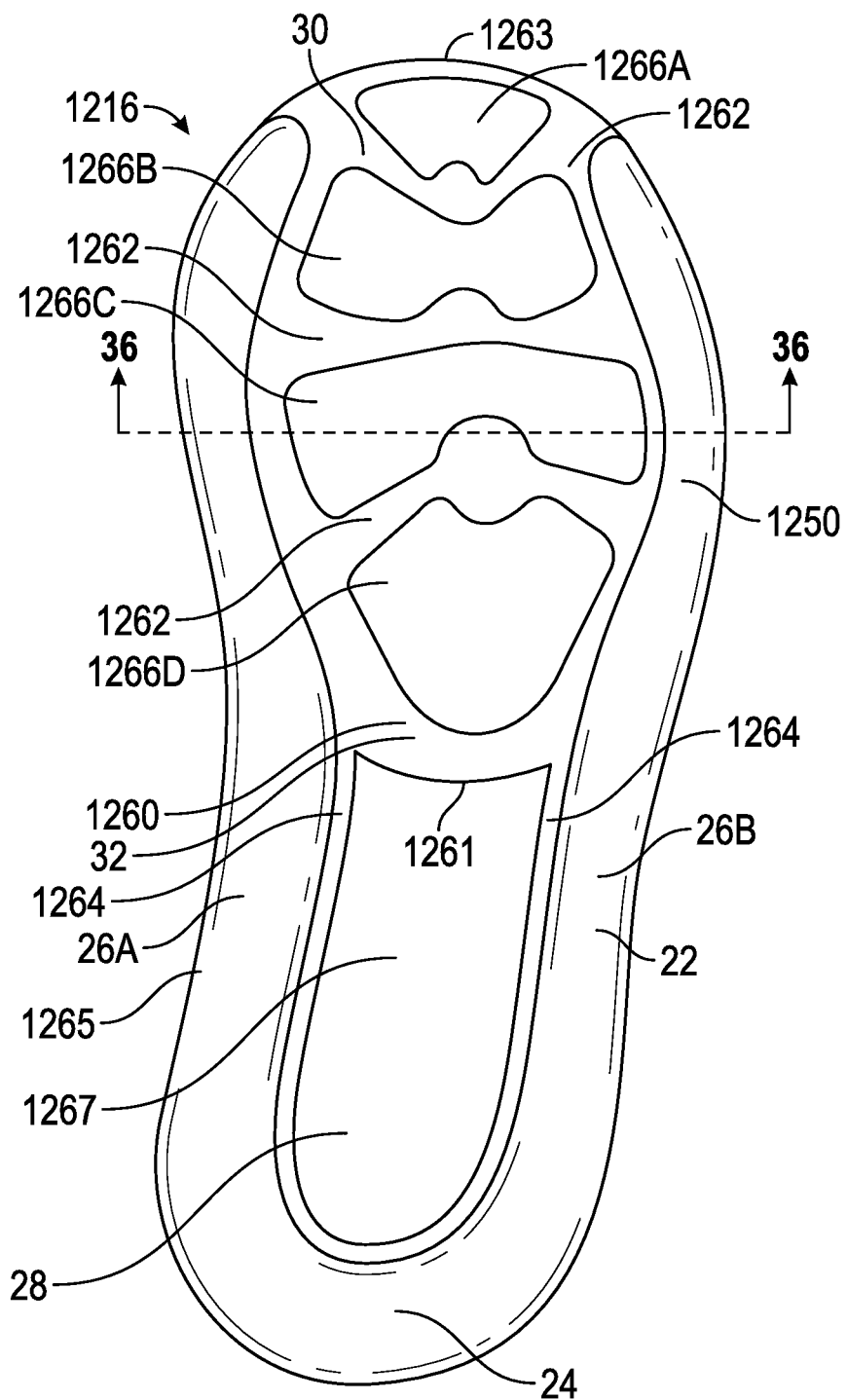
FIG. 29 is a schematic illustration in plan view of another embodiment of a bladder element for a midsole assembly.
Figure 30:
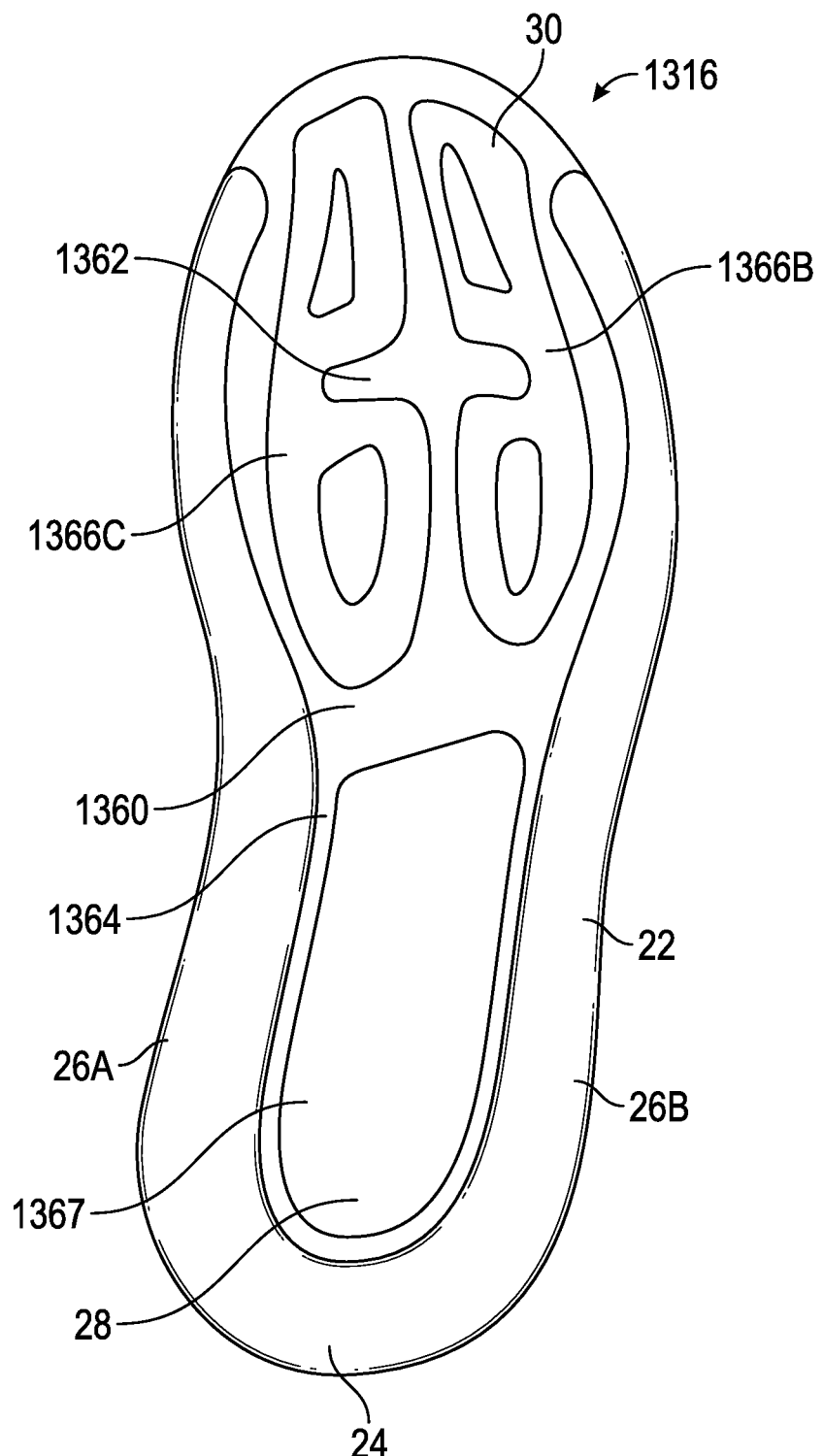
FIG. 30 is a schematic illustration in plan view of another embodiment of a bladder element for a midsole assembly.
Figure 31:
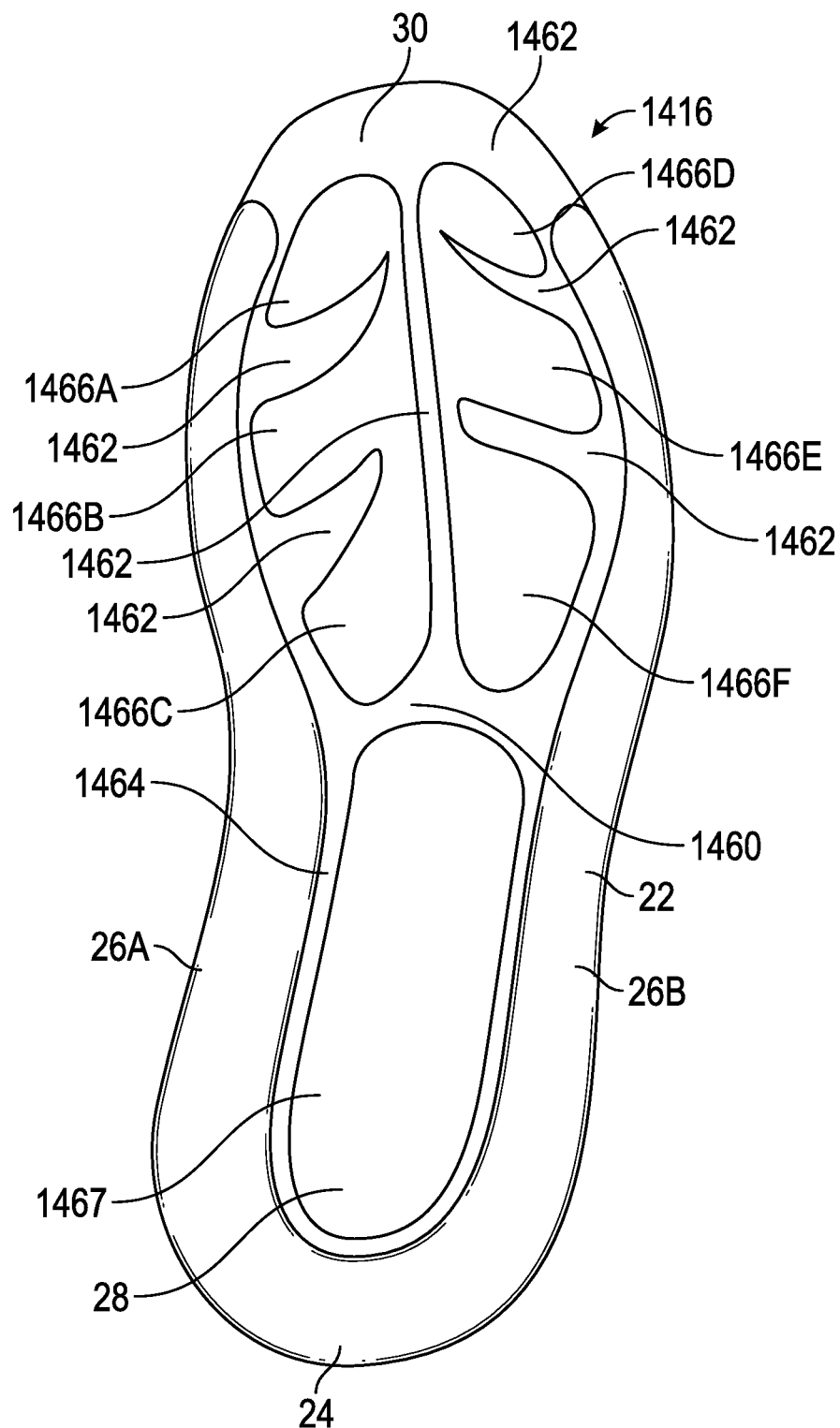
FIG. 31 is a schematic illustration in plan view of another embodiment of a bladder element for a midsole assembly.

Referring now to FIGS. 29-31, alternate embodiments of bladder elements 1216, 1316, and 1416 are illustrated. Each of the bladder elements 1216, 1316, 1416 has a substantially arc shaped heel portion 24, a lateral lateral arm portion 26B, and a medial arm portion 26A spaced from the lateral arm portion 26B to form a generally peripheral chamber. Each of the arm portions 26A, 26B extends from a heel region 28 to a forefoot region 30, and are arranged generally at a peripheral region 22 that respectively correspond with a heel region, a forefoot region, and a peripheral region of an article of footwear in which the bladder element 1216, 1316, or 1416 is assembled.

Each of the bladder elements 1216, 1316, and 1416, is formed from an upper polymeric sheet and a lower polymeric sheet of any of the materials as described with respect to bladder element 16. The arm portions 26A, 26B are interconnected in the forefoot region 30 by a web formed by the respective bladder element 1216, 1316, or 1416. In other words, the polymeric sheets are trimmed in the area between the arm portions 26A, 26B only at the heel region 28, creating an opening 1267, 1367, 1467, through the respective bladder element 1216, 1316, 1416, to provide a cavity similar to cavity 1023 in FIG. 23. The polymeric sheets are not trimmed in the area between the arm portions 26A, 26B at the forefoot region 30.

Figure 33:
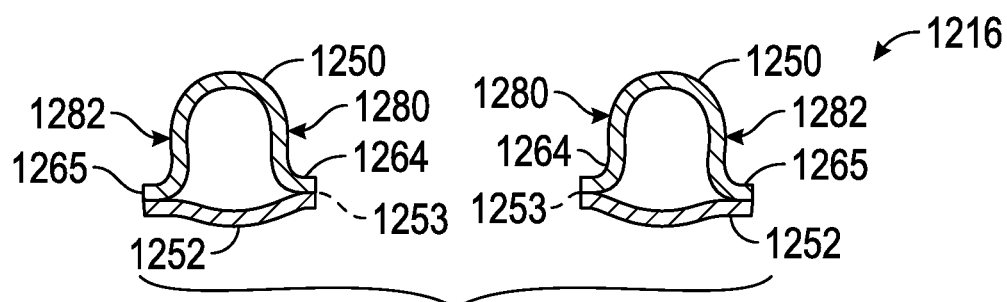
FIG. 33 is a schematic cross-sectional illustration of the bladder element of FIG. 29 taken at lines 33-33 in FIG. 32.
Figure 34:
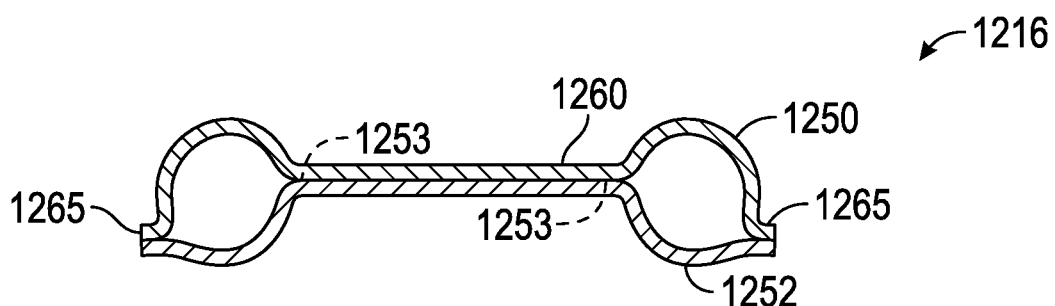
FIG. 34 is a schematic cross-sectional illustration of the bladder element of FIG. 29 taken at lines 34-34 in FIG. 32.

Specifically, with reference to the bladder element 1216 of FIG. 29, a web 1260 connects the arm portions 26A, 26B and extends from a rearward end 1261 in the midfoot region 32 to a distal end 1263 of the forefoot region 30. The web 1260 includes areas where the adjacent upper and lower sheets are compressed together. These areas are indicated with reference number 1262. Portions of the compressed area 1262 form thickened flanges adjacent the arm portions 26A, 26B and heel portion 24. An inner flange 1264 is at an inward-facing surface 1280 shown in FIG. 33. An outer flange 1265 is at an outward-facing surface 1282 of the bladder element 1216. The web 1260 also includes descending protrusions in the form of fluid-filled pods 1266A, 1266B, 1266C, 1266D made discreet and separated from the arm portions 26A, 26B and heel portion 24 by the compressed portions 1262.

Figure 35:
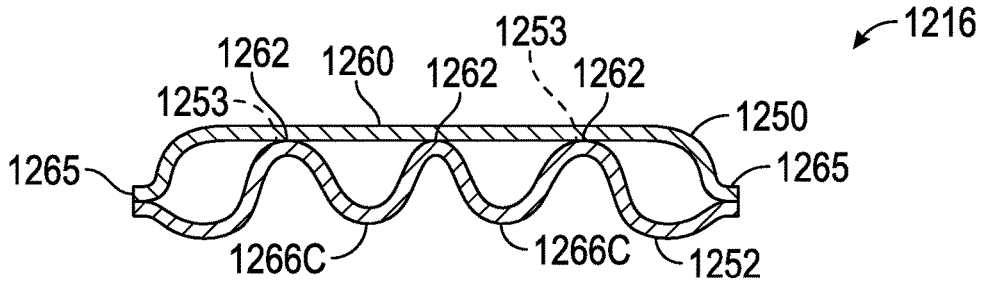
FIG. 35 is a schematic cross-sectional illustration of the bladder element of FIG. 29 taken at lines 35-35 in FIG. 32.
Figure 36:
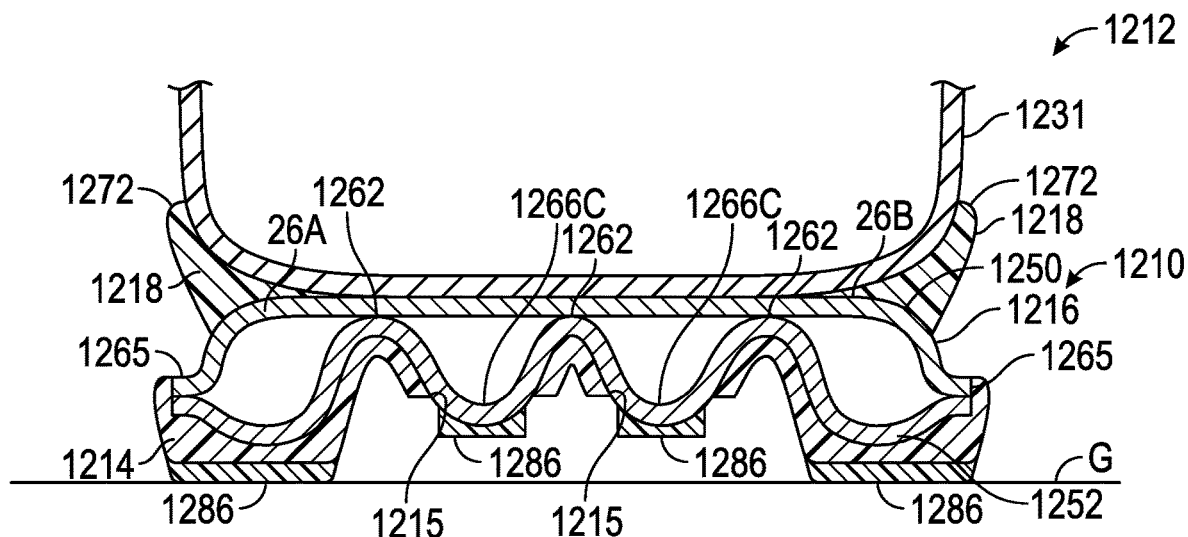
FIG. 36 is a schematic illustration in cross-sectional view of an article of footwear with the bladder element of FIG. 29 taken at lines 36-36 in FIG. 29 and with midsole layers and outsole elements.

The fluid-filled pods 1266A, 1266B, 1266C, 1266D are preferably filled with air at ambient pressure. The pods 1266A, 1266B, 1266C, 1266D may be formed during thermoforming of the bladder element 1216 by providing mold assemblies that enable the lower polymeric sheet 1252 to be separated from the upper polymeric sheet 1250 and formed into the desired pod shapes. For example, FIG. 36 shows an article of footwear 1212 that includes the bladder element 1216 and indicates the relationship between the upper sheet 1250 and the lower sheet 1252 at a cross-section through the forefoot region 30 indicated in FIG. 29. The sheets 1250, 1252 are separated from one another at the arm portions 26A, 26B and at the fluid filled pods 1266A, 1266B, 1266C, 1266D but are bonded to one another at compressed areas 1262. As shown in FIGS. 35 and 36, the pods, such as pod 1266C, are formed to extend generally downward, and are not in operative contact with a ground surface in the absence of a sufficient loading force F. The pods 1266C will move into operative contact with the ground surface G under the sufficient loading force F to thereby function similarly as the protrusions 1021 of FIG. 25.

Figure 32:
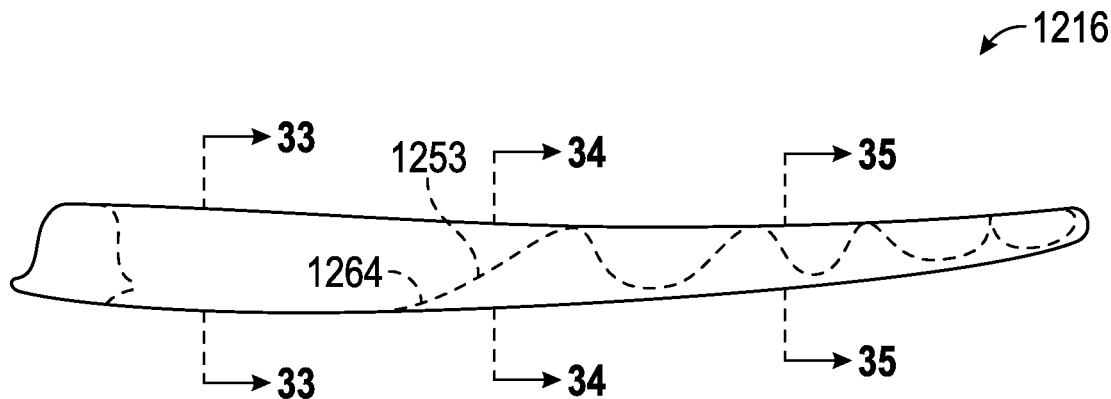
FIG. 32 is a schematic illustration in side view of the bladder element of FIG. 29.

Downward protrusion of the pods 1266 is enabled by bonding the sheets 1250, 1252 via a roll seam at an inward-facing flange 1264 of the arm portions 26A, 26B. The flange 1264 and the seam therein progresses generally upward from the heel region 24 to the forefoot region 30 along the arm portions 26A, 26B. Such a roll seam is further shown and explained with respect to FIG. 32. The outer flange 1265 is provided by a pinch seam. The outer flange 1265 is at a lower portion of the bladder element 1216 from the heel region 28 to the forefoot region 30, and does not roll or progress upward like the inner flange 1264.

Additional sole layer 1214 can be secured to the lower sheet 1252 to provide additional cushioning response and support for the downward extending pods such as pod 1266C shown in FIG. 36. Specifically, the sole layer 1214 is formed with apertures 1215 that correspond with the descending pods 1266C. The apertures 1215 are sized to provide a sleeve that generally supports the downwardly descending pods and allows a lowest extent of each pod to descend below the sole layer 1214 through the aperture 1215. In this manner, the sole layer 1214 cups the pods such as pod 1266C.

Figure 37:
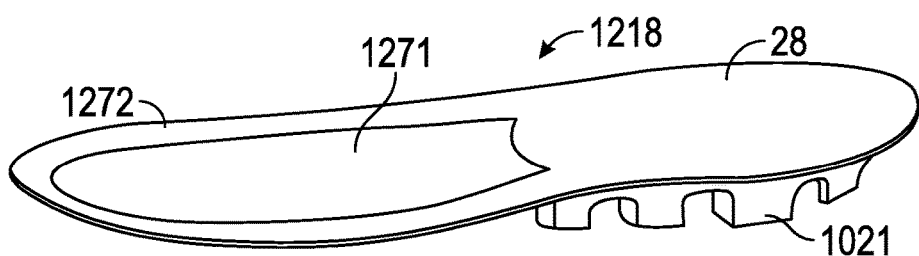
FIG. 37 is a schematic illustration in perspective view of one of the midsole layers of the article of footwear of FIG. 36.

A midsole layer 1218 is secured to an upper portion of the bladder element 1216. Specifically, the midsole layer 1218 has descending protrusions 1021 (shown in FIG. 37) like those of FIG. 23, but the protrusions 1021 are only in the heel region 28 of the midsole layer 1218 and are positioned so that the protrusions 1021 extend through an opening 1267 in the heel region 28 of the bladder element 1216. The opening 1267 is shown in FIG. 29. As shown in FIG. 37, the midsole layer 1218 has an opening 1271 in the forefoot region 30 so that the midsole layer 1218 forms only a narrow strip 1272 around the forefoot region 30 that extends over and is secured to the arm portions 26A, 26B. A footwear upper 1231 is cupped by the strip 1272 of the midsole layer 1218, and is secured to the midsole layer 1218 along the strip 1272 and in the heel region 28, and also to the upper sheet 1250 of the bladder element 1216 in the forefoot region 30 by any suitable manner such as disclosed herein.

As shown in FIG. 36, an outsole layer provided by discreet outsole elements 1286 is secured to a lower surface of the peripheral bladder element (i.e., to the underside of the arms 26A, 26B and the heel portion 24, as well as to a lower surface of each of the pods, such as pod 1266C). The outsole elements 1286 can be a material similar to the sole layer 1214, such as a material suitable for a midsole or unisole, or can be a more durable material such as a rubber material. The outsole elements 1286 contact the ground plane G under the pods 1266C when the pods 1266C move downward under at least the threshold loading force F, similar to movement of the protrusions 1021 in FIG. 26. The midsole assembly 1210 with upper 1231 and outsole elements 1286 form an article of footwear 1212.

FIGS. 30 and 31 are alike in all aspects to FIG. 29, but with differently shaped ambient pods. Specifically, a web 1360 of bladder element 1316 in FIG. 30 includes compressed portions 1362, including a compressed flange 1364 adjacent the arm portions 26A, 26B, an opening 1367 in the heel region 28, and differently shaped ambient pods 1366B, 1366C. A web 1460 of bladder element 1416 in FIG. 31 includes compressed portions 1462, including a compressed flange 1464 adjacent the arm portions 26A, 26B, an opening 1467 in the heel region 28, and differently shaped ambient pods 1466A, 1466B, 1466C, 1466D, 1466E, and 1466F. The pods 1466A, 1466B, 1466C are contiguous and form one larger pod. The pods 1466D, 1466E, and 1466F are contiguous and form another larger pod. Either of the bladder elements 1316 and 1416 can be used in place of bladder element 1216 in the midsole assembly 1210 and of FIG. 36.

Figure 38:
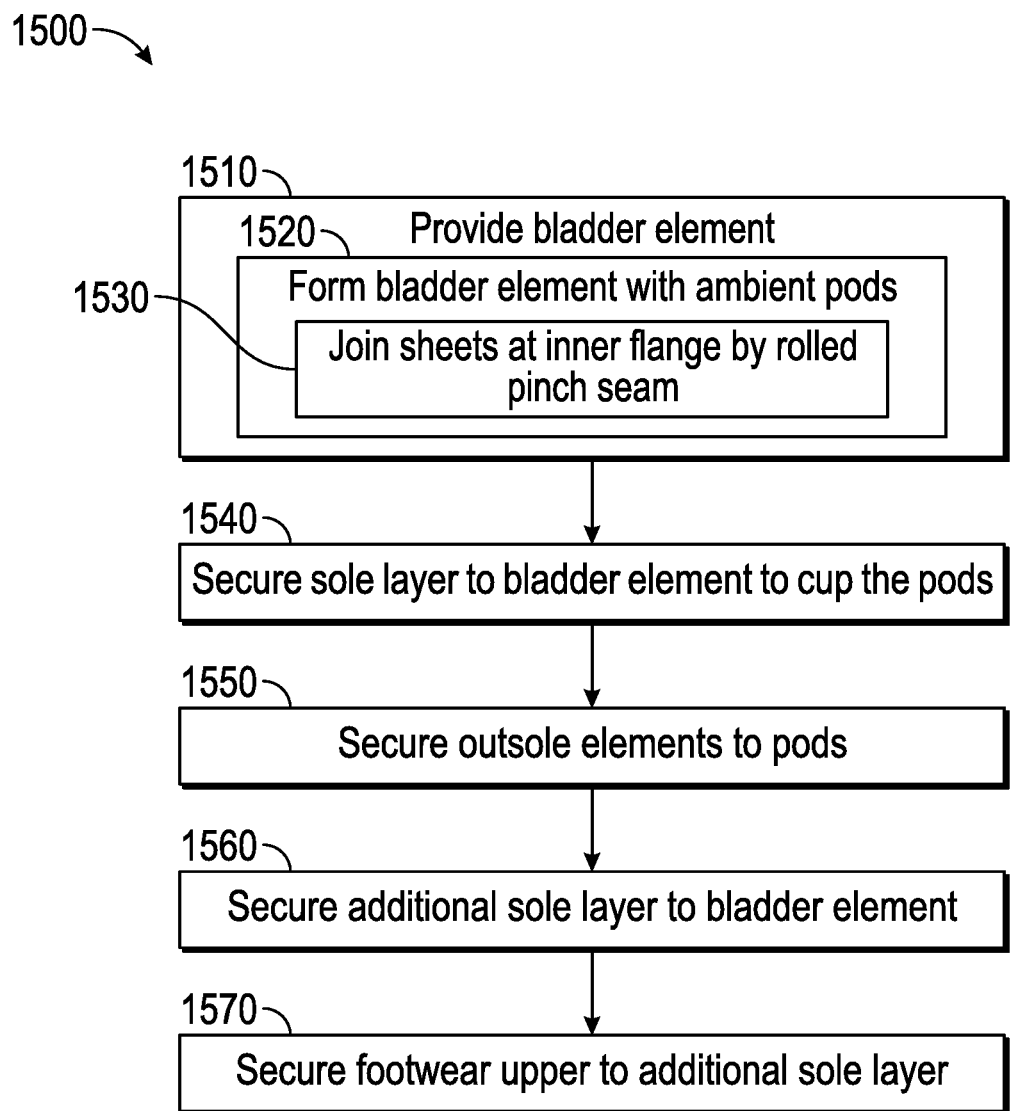
FIG. 38 is a flow diagram of a method of manufacturing the midsole assembly of FIG. 36.

Referring to FIG. 38, a method of manufacturing 1500 an article of footwear with any of the bladder elements 1216, 1316, 1416 of FIGS. 29-31 is shown. The method 1500 is described with respect to the article of footwear 1212 of FIG. 36. The method 1500 includes step 1510, providing a bladder element 1216 formed from first and second polymeric sheets 1250, 1252 so that the bladder element 1216 has a substantially arc-shaped heel portion 24, a lateral arm portion 26B, a medial arm portion 26A laterally-spaced from the lateral arm portion 26B, and with the lateral arm portion 26B and the medial arm portion 26A each extending from the heel portion 24.

Providing the bladder element 1216 in step 1510 may include forming the bladder element 1216 in step 1520, such as by thermoforming in a mold assembly configured to enable formation of the pods 1266A, 1266B, 1266C, and 1266D. Alternatively, the bladder element 1216 can be obtained after it has been formed. Forming the bladder element 1216 in step 1520 includes sub-step 1530, in which the polymeric sheets 1250, 1252 are joined at an inner flange 1264 by a rolled pinch seam 1253. The pinch seam 1253 is the joining of the sheets 1250, 1252 by compression at the flange 1264 at the inward-facing side of each arm portion 26A, 26B. The pinch seam 153 progresses upward (i.e., rolls upward) along the bladder element 1216 from a relatively low position at the heel portion 24 to a relatively high position at the top of the arm portions 26A, 26B at the forefoot region 30. The location of the pinch seam 1253 in FIGS. 32-35 illustrates the progression from a low position (FIG. 33) to a high position (FIG. 35). At the high position, the pinch seam 1253 is at the top, or highest level, of the bladder element 1216, allowing the web 1260 and arm portions 26A, 26B to provide a generally flat foot-receiving surface in the forefoot region 30. The web 1260 extends between the arm portions 26A, 26B at the cross-sections of FIGS. 34 and 35. In the forefoot region 30 of FIG. 35, the web 1260 is at the highest point of the bladder element 1216, with the upper sheet 1250 providing a smooth, flat surface. Due to the progression of the pinch seam 1253 from a low position to a high position on the bladder element 1216, the pinch seam 1253 is also referred to as a roll seam. Progression of the seam 1253 in this manner is enabled by the shapes of the mating mold portions to create the flange 1264 in which the first and second polymeric sheets 1250, 1252 are positioned and thermoformed. In other words, the mold portions are designed to create the roll pinch seam 1253 at the inner flange 1264 and pinch seam at the outer flange 1265.

Following step 1510 with sub-steps 1520 and 1530, the sole layer 1214 is secured to a lower surface of the bladder element 1216 in step 1540 with the pods extending downward through apertures 1215 in the sole layer 1214, enabling the sole layer 1214 to cup the pods, as illustrated with respect to pod 1266C in FIG. 36. The sole layer 1214 also extends around and cups the remaining pods 1266A, 1266B, and 1266D as well. The sole layer 1214 can be configured to extend under the entire bladder element 1216 with apertures provided for each of the pods 1266A, 1266B, 1266C, and 1266D to extend through.

Following step 1540, outsole elements 1286 can be secured to each of the exposed lower portions of the pods 1266A, 1266B, 1266C, and 1266D and to the bladder element arm portions 26A, 26B and heel portion 24 in step 1550, as shown in FIG. 36. In step 1560, an additional sole layer such as sole layer 1218 of FIG. 37 can be secured to an upper surface of the bladder element 1216 in step 1560. In step 1570, a footwear upper 1231 can then be secured to the bladder element 1216 by adhesive, stitching, or otherwise.

As an alternative to the roll pinch seam 1253 at inner flange 1264 and pinch seam of outer flange 1265, both the inner and outer flange could instead be located at an uppermost portion of any of the bladder elements 1216, 1316, 1416, and formed in a swept pinch seam to create a cupping rim for a footwear upper. FIGS. 39-42 show such an alternative embodiment of an article of footwear 1612 that has a midsole assembly 1610 with a bladder element 1616 with arm portions and a heel portion like that of FIG. 29, but that has a "full skin" footbed. In other words, webbing 1660 extends between the arm portions from the heel region 28 to the forefoot region 30, with no trimming or cutouts. Descending ambient fluid-filled pods 1666 are formed by the upper and lower sheets 1650, 1652 by compressing the sheets together in compressed areas 1662, and separating the sheets to form the pods 1666.

Figure 42:
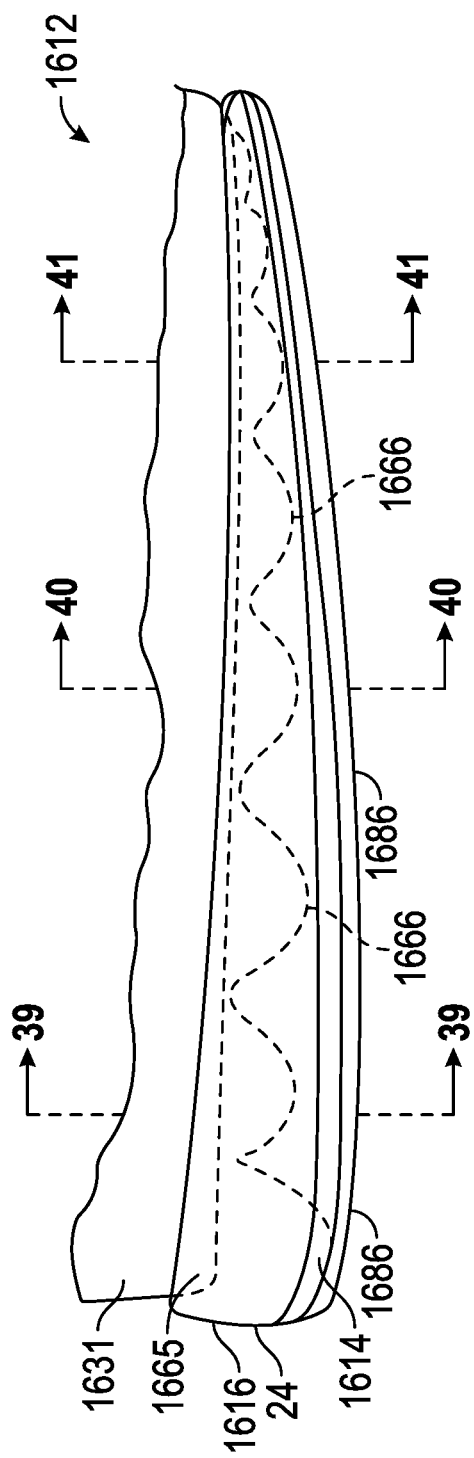
FIG. 42 is a schematic illustration in side view of the article of footwear of FIGS. 39-41.

The outer flange 1665 is formed with a swept pinch seam so that the flange 1665 extends generally upward, and serves as a rim to cup a footwear upper 1631 secured thereto. As shown in FIG. 42, the outer flange 1665 is exposed on the article of footwear 1612. No sole layer is provided between the bladder element 1616 and the footwear upper 1631. By compressing the sheets into shaped areas of the mold assembly, the flange 1665 can be formed to be generally tapered, and triangular in cross-section, with a thickness T1 at a base of the taper that is greater than the sum of the thicknesses T2 and T3 of the sheets 1650, 1652 away from the outer flange 1665. An inner flange 1664 is also formed by a swept pinch seam to extend generally level with a top of the arm portions 26A, 26B. Outsole element 1686 is secured to lower surfaces of the bladder element 1616 and lower surfaces of the pods 1666. An additional sole layer 1614 can be secured to the lower sheet 1652 to provide additional cushioning response and support for the downward extending pods such as pod 1666 shown in FIGS. 39-42. Specifically, the sole layer 1614 is formed with apertures 1615 that correspond with the descending pods 1666. Each aperture 1615 is sized to allow a lower extent of a pod 1666 to descend through the sole layer 1614 at the aperture. In this manner, the sole layer 1614 functions as a sleeve that generally supports and cups the descending pods, such as pod 1666.

Figure 43:
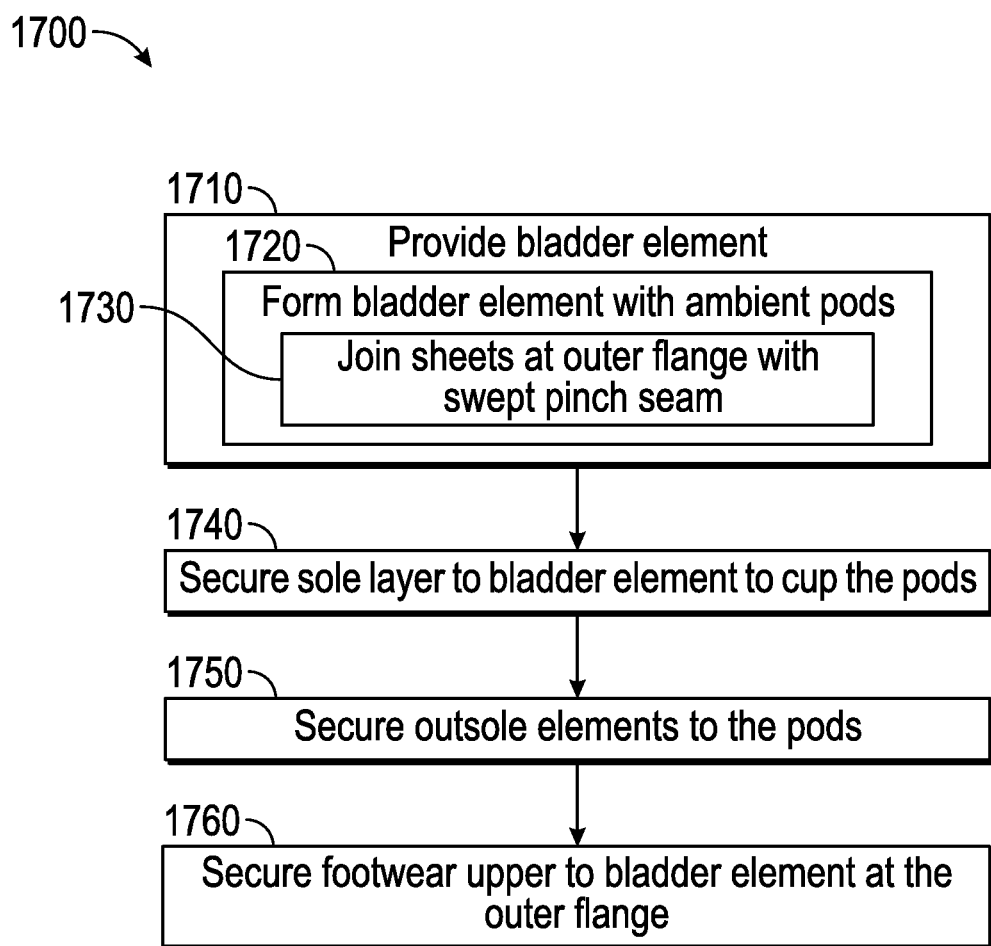
FIG. 43 is a flow diagram of a method of manufacturing the article of footwear of FIG. 39.

Referring to FIG. 43, a method of manufacturing 1700 an article of footwear 1612 with the bladder element 1616 of FIGS. 39-42 is shown. The method 1700 includes step 1710, providing a bladder element 1616 formed from first and second polymeric sheets 1650, 1652 so that the bladder element 1616 has a substantially arc-shaped heel portion 24, a lateral arm portion 26B, a medial arm portion 26A laterally-spaced from the lateral arm portion, and with the lateral arm portion and the medial arm portion each extending from the heel portion.

Providing the bladder element 1616 in step 1710 may include forming the bladder element 1616 in step 1720, such as by thermoforming in a mold assembly configured to enable formation of the pods 1666. Alternatively, the bladder element 1616 can be obtained after it has been formed. Forming the bladder element 1616 in step 1720 includes sub-step 1730, in which the polymeric sheets 1650, 1652 are joined at an outer flange 1665 by a swept pinch seam 1653.

The pinch seam 1653 is the joining of the sheets 1650, 1652 by compression at the flange 1665 at the outward-facing side of each arm portion 26A, 26B. The pinch seam 1653 is at a high position at the top, or highest level, of the bladder element 1616 along the entire bladder element 1616. The inner flange 1664 is also formed by a pinch seam at an upper portion of the bladder element 1216, preferably at the top of the bladder element 1616 so that the web 1660 extends between the arm portions 26A, 26B at the upper portion or highest level of the bladder element 1616 from the heel portion 24 to the forefoot region 30, with the upper sheet 1650 providing a smooth, flat surface. Providing the flanges 1664, 1665 in this manner is enabled by the shapes of the mating mold portions in which the first and second polymeric sheets 1650, 1652 are positioned and thermoformed.

Figure 39:
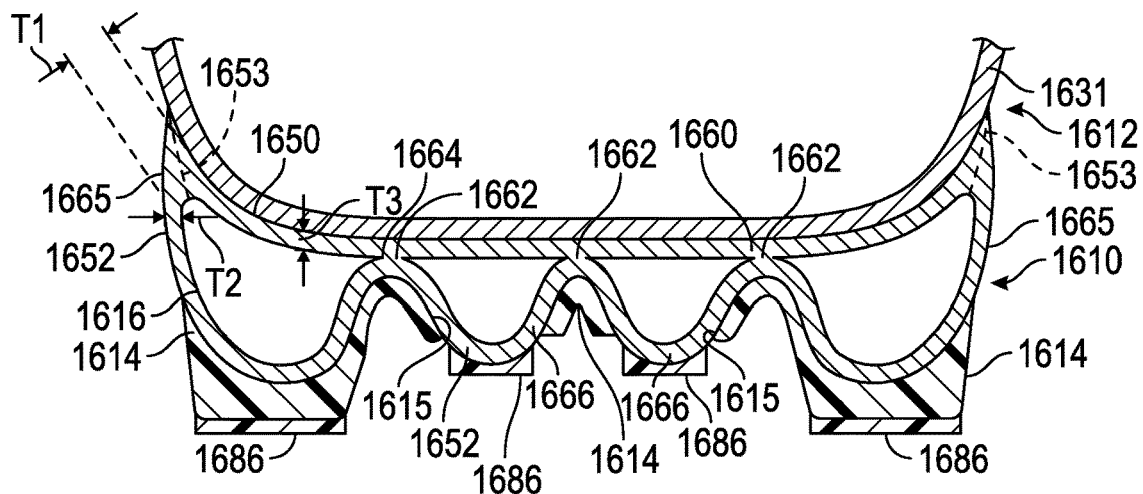
FIG. 39 is a schematic cross-sectional illustration taken at lines 39-39 in FIG. 42 of a heel region of another embodiment an article of footwear including a peripheral fluid-filled bladder element.
Figure 40:
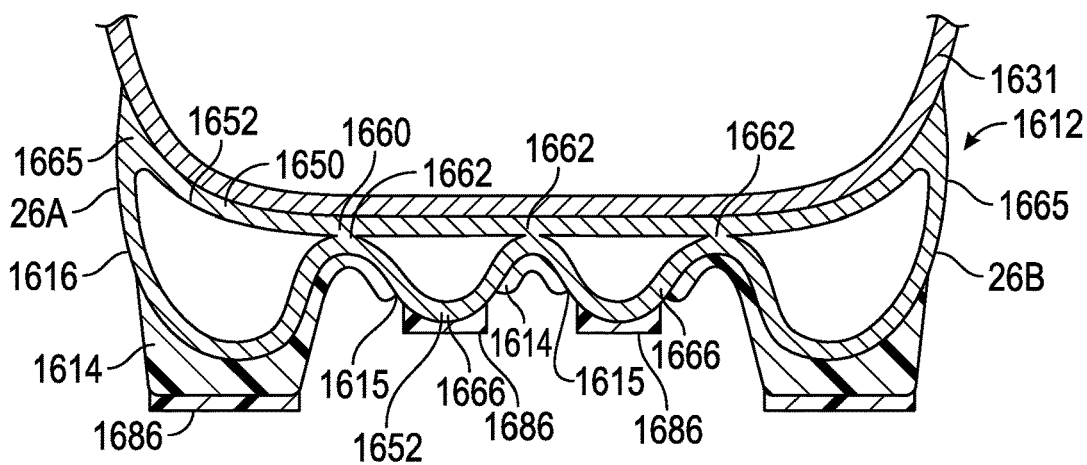
FIG. 40 is a schematic cross-sectional illustration taken at lines 40-40 in FIG. 42 of the article of footwear of FIG. 32.
Figure 41:
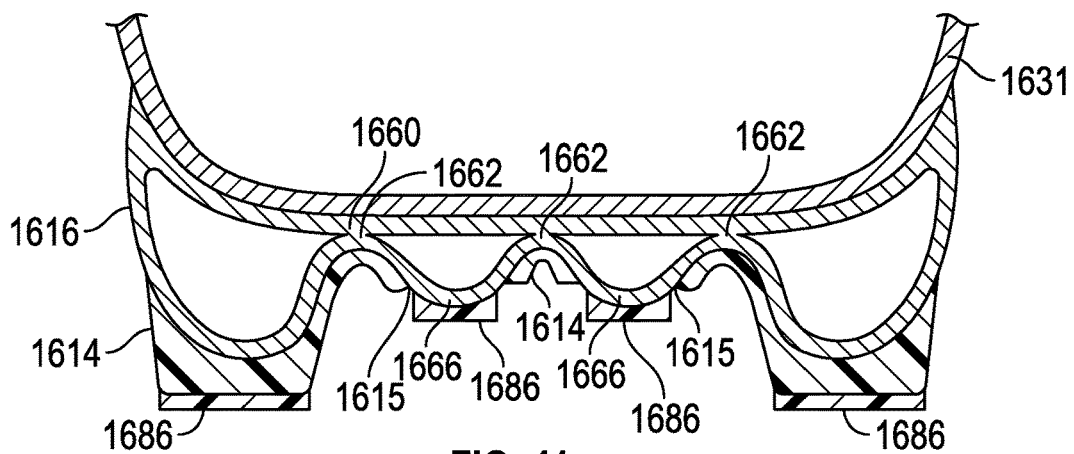
FIG. 41 is a schematic cross-sectional illustration taken at lines 41-41 in FIG. 42 of the article of footwear of FIG. 39.

Following step 1710 with sub-steps 1720 and 1730, the sole layer 1614 is secured to a lower surface of the bladder element 1616 in step 1740 with the pods 1666 extending downward through apertures 1615 in the sole layer 1614, enabling the sole layer 1614 to cup the pods 1666, as illustrated in FIG. 39. The sole layer 1614 can be configured to extend under the entire bladder element 1616 with apertures provided for each of the pods 1666 to extend through. Following step 1740, outsole elements 1686 can be secured to each of the exposed lower portions of the pods 1666 and to the bladder element arm portions 26A, 26B and heel portion 24 in step 1750, as shown in FIGS. 39-42. In step 1760, a footwear upper 1631 can then be secured to the bladder element 1616 by adhesive, stitching, or otherwise.

Referring to FIGS. 44-47, a portion of an article of footwear 1812 is shown that includes a midsole assembly 1810 with a fluid-filled bladder element 16 as described with respect to FIG. 1. The bladder element 16 is arranged so that the substantially arc-shaped heel portion 24 is positioned in a heel region 28 of the article of footwear 1812, and the arm portions 26A, 26B extend from the heel region 28 to the forefoot region 30 along a peripheral region 22. The article of footwear 1812 has a heel region 28, a forefoot region 30, and a midfoot region 32 corresponding with portions of a human foot as described with respect to similar regions of the midsole layer 14 of FIG. 2.

Figure 45:
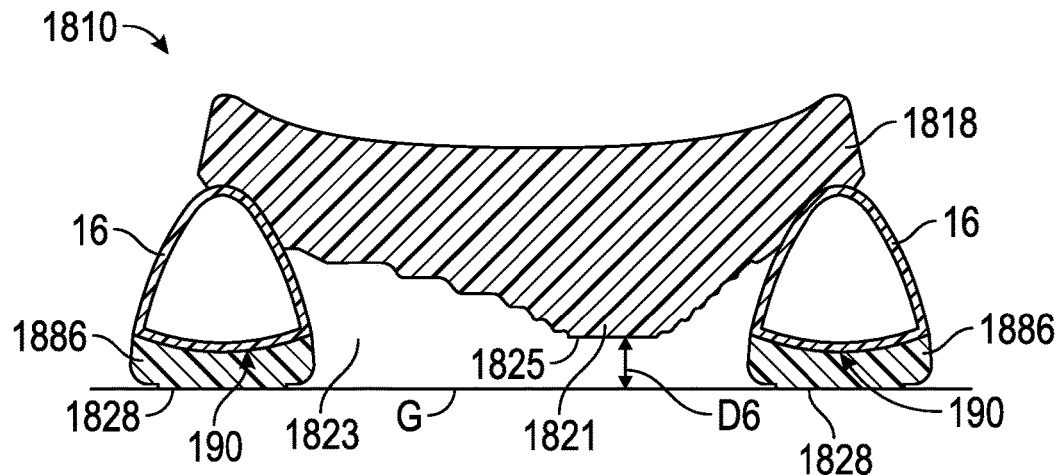
FIG. 45 is a schematic cross-sectional illustration taken at lines 45-45 in FIG. 44 of the article of footwear of FIG. 44.
Figure 46:
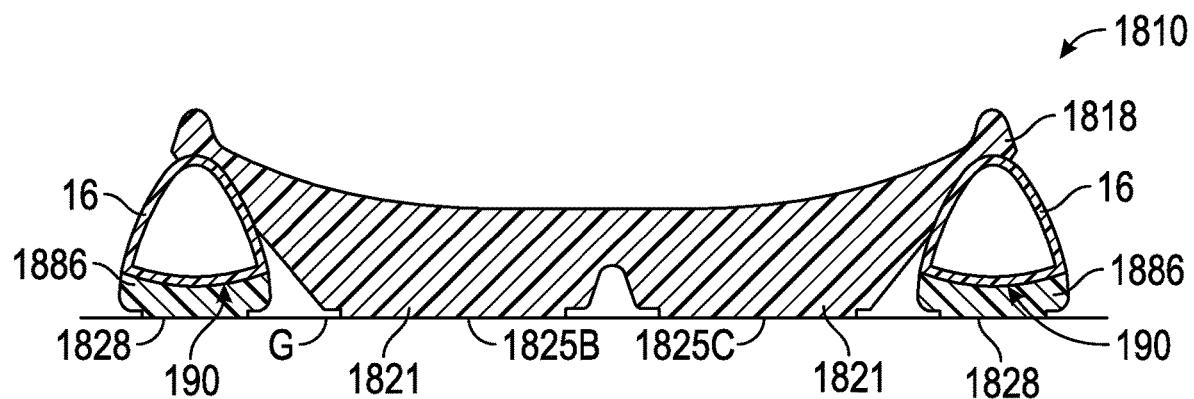
FIG. 46 is a schematic cross-sectional illustration taken at lines 46-46 in FIG. 44 of the article of footwear of FIG. 44.

The midsole assembly 1810 includes a resilient midsole layer 1818 that is secured to and rests on the bladder element 16 as shown in FIGS. 45 and 46. The midsole layer 1818 has protrusions 1821 that descend from a lower portion of the midsole layer 1818 into a cavity 1823 between the arm portions 26A, 26B. The midsole layer 1818 may be referred to as an inner foam layer as it extends inward of the bladder element 16. An additional sole layer 1886, which may be referred to as an outsole layer or as an outer foam layer, is secured to the bladder element 16 so that the bladder element 16 rests on the additional sole layer 1886. The additional sole layer 1886 may also be referred to as an outer foam layer as it is outward of the protrusions 1821 of the midsole layer 1818, and further outward of a longitudinal centerline 1811 of the midsole assembly 1810 than the midsole layer 1818.

Figure 44:
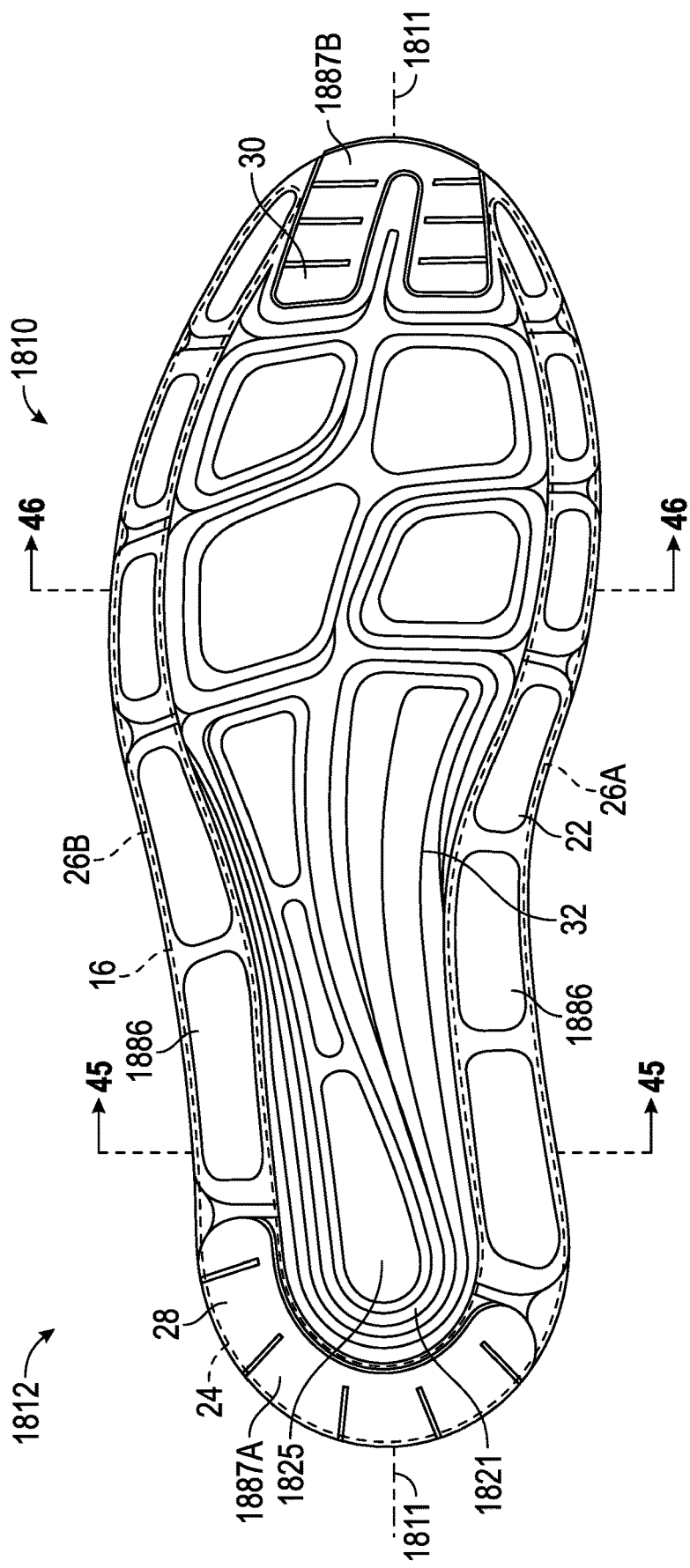
FIG. 44 is a schematic illustration in bottom view of another embodiment of an article of footwear including a peripheral fluid-filled bladder element.

The additional sole layer 1886 can be a unitary layer that extends beneath and is secured to the bladder element 16. The additional sole layer 1886 can be a material similar to the midsole layer 1818, or a rubber material, or a material such as used for a unisole. If the additional sole layer 1886 is a material similar to the midsole layer 1818, such as but not limited to foam, such as an EVA foam, then the additional sole layer 1886 may function as a lower midsole layer. For example, the midsole layer 1818 and the additional sole layer 1886 can both be an injected Phylon EVA foam. In one embodiment, the midsole layer 1818 has a first density, and the additional sole layer 1886 has a second density greater than the first density. By way of non-limiting example, the specific density of the midsole layer 1818 may be 0.28 or greater, but less than the specific density of the additional sole layer 1886, which may be up to about 0.32 (with reference to water at 4 degrees Celsius). By way of another further non-limiting example, the durometer of the midsole layer 1818 and the additional sole layer 1886 can both be between 52-58 on a durometer type C scale to measure Shore hardness (Asker C), with the durometer of the additional sole layer 1886 greater than the durometer of the midsole layer 1818. If desired, additional harder outsole elements can be secured to a bottom surface of the additional sole layer 1886. One outsole element 1887A is shown in FIG. 44 secured to the additional sole layer 1886 in the heel region 28, and another outsole element 1887B is secured to the midsole layer 1810 in the forefoot region 30. The outsole elements 1887A, 1887B can be rubber or another durable material for these high wear areas.

The midsole layer 1818 is configured so that there is only a single protrusion 1821 at any lateral cross-section of the heel region 28, and the single protrusion 1821 tapers laterally inward, away from the arm portions of the bladder element 16 to the lowest extent 1825. This allows the bladder element 16 to distort inward under loading without interference from the protrusion 1821. The lowest extent 1825 of the protrusion 1821 in the heel region 24 terminates above the lowest extent 1828 of the additional sole layer 1886 (i.e., a base of the additional sole layer 1886) in the absence of at least the threshold loading force acting to compress the midsole layer 1818. A distance D6 spaces the lowest extent 1828 of the additional sole layer 1886 from the lowest extent 1825 of the midsole layer 1818. The distance D6 thus also represents the distance of the lowest extent 1825 of the protrusion 1821 from the ground plane G. With this configuration, the protrusion 1821 in the heel region 28 is not in operative contact with the ground plane G in the absence of at least the threshold loading force on the midsole layer 1818. As used herein, the protrusions 1821 are in "operative contact" with the ground plane G when the protrusions 1821 directly contact the ground plane G, assuming no additional outsole elements are secured to the lowest extent 1825. If an additional outsole element is secured to the protrusion 1821, then the protrusion is in operative contact with the ground plane G when the additional outsole element contacts the ground plane G so that the protrusion 1821 is thus in indirect contact with the ground plane G. In other words, the protrusion 1821 positioned in the heel region 28 is not in operative contact with the ground plane G until a loading force F is applied that is at least a predetermined threshold loading force that is sufficient to cause the lowest extent 1825 of the protrusion 1821 to contact the ground plane G, thus becoming part of the ground contact surface of the article of footwear 1812.

As shown in FIG. 46, lowest extents 1825B, 1825C of protrusions 1821 in the forefoot region 30 are in operative contact with the ground plane G even in the absence of the threshold loading force. In other words, the lowest extents 1825B, 1825C of the midsole layer 1818 and the lowest extent, or base surface 1828 of the additional outsole layer 1886 are flush with one another, at the ground plane G, in the forefoot region 30. The additional sole layer 1886 is secured to the entire base surface 190 of the bladder element 16 by bonding, adhesives, welding, or the like, and is in operative contact with the ground plane G even in the absence of the threshold loading force.

During application of at least a threshold loading force, a first stage of attenuation of the force occurs prior to operative contact of the protrusion 1821 in the heel region 28 with the ground plane G. During the first stage of attenuation, the harder additional sole layer 1886 and the bladder element 16 attenuate the force in the heel region 28, with the midsole layer 1818 in the forefoot region 30 attenuating some of the loading force F. A second stage of attenuation occurs in the heel region 28 as the midsole layer 1818 moves downward and the lowest extent 1825 of the protrusion 1821 moves into operative contact with the ground plane G. During the second stage, the protrusion 1821 in the heel region 28 has moved into operative contact with the ground plane G, so that the loading force F is attenuated both by the protrusion 1021 and by the bladder element 16 in the heel region 28.

The midsole assembly 1810 can be tuned during the design of the assembly 1810 to provide a desired underfoot feel by selecting the geometry of the protrusions 1821, the distance D6, and the selection of materials for the midsole layer 1818 and the additional sole layer 1886. These parameters can be selected to cause the first stage of attenuation to have a first energy absorbing characteristic, and the second stage of attenuation to have a second energy absorbing characteristic. For example, the rate of compression of the midsole assembly 1810 may be different in the different stages of attenuation. Additionally, when the protrusions 1821 contact the ground, a greater tactile underfoot feel is experienced by a wearer of the article of footwear 1012, which may be desirable.

Figure 47:
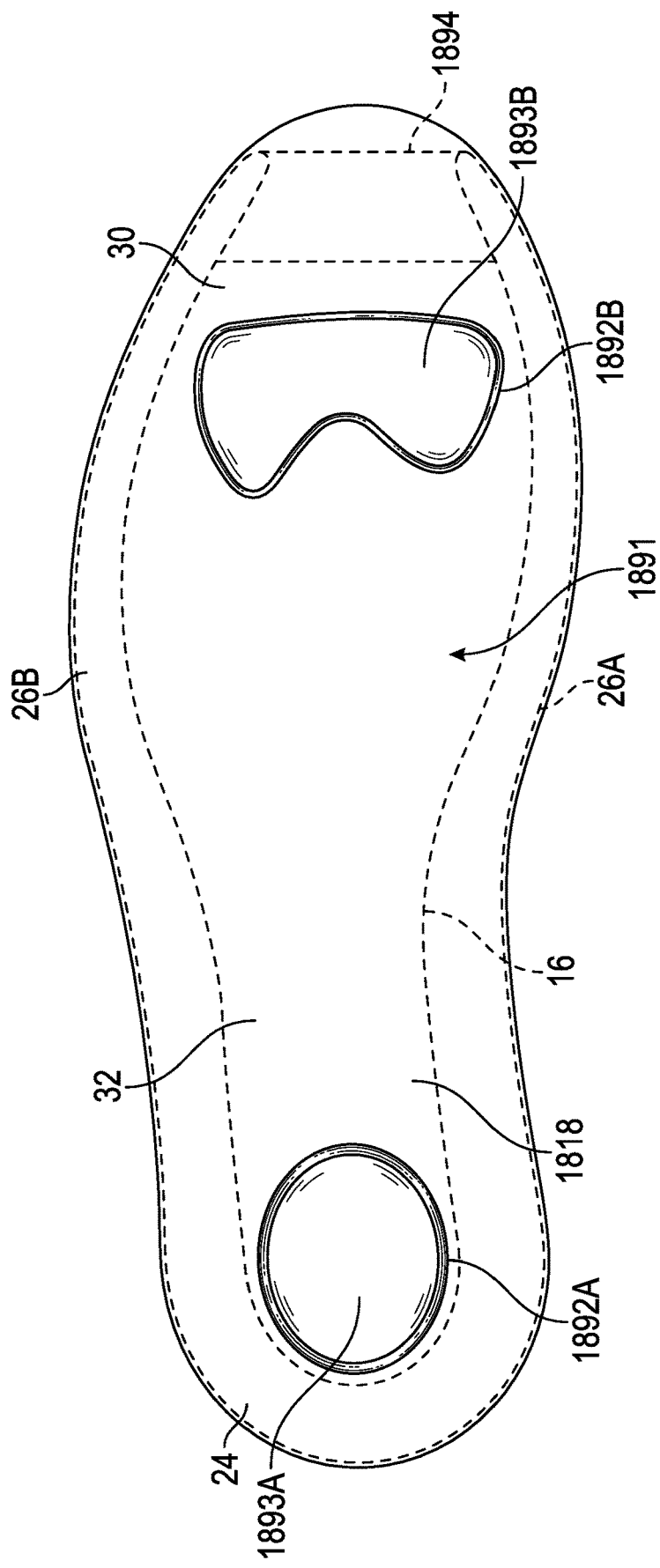
FIG. 47 is a schematic illustration in top view of a midsole layer of the article of footwear of FIG. 44.

FIG. 47 shows a top surface 1891 of the midsole layer 1818, and indicates that the top surface 1891 can optionally be configured with recesses 1892A, 1892B configured to retain ambient bladder elements 1893A, 1893B to provide additional localized cushioning. The bladder elements 1893A, 1893B may also be referred to as ambient pods, and are formed from the same materials used to construct the bladder element 16, but configured as unpressurized, sealed chambers. Alternatively, the recesses 1892A, 1892B can be empty, and sealed by an overlaying foam layer (not shown), similar to the recesses 74B, 74C of FIG. 1.

Optionally, a plate 1894 can be molded to the bladder element 16, such as by co-molding during thermoforming of the bladder element 16. The plate 16 can extend between the arm portions 26A, 26B in the forefoot region 30. The plate 1894 can be a relatively stiff material, such as a thermoplastic elastomer, or a urethane coated carbon fiber. The plate 1894 increases the stiffness of the forefoot region 30, creating a high propensity for the flexing of the forefoot region 28 or the midfoot region 32 to cause "snap-back", or return of the midsole assembly 1810 to an unflexed position following flexing.

Figure 48:
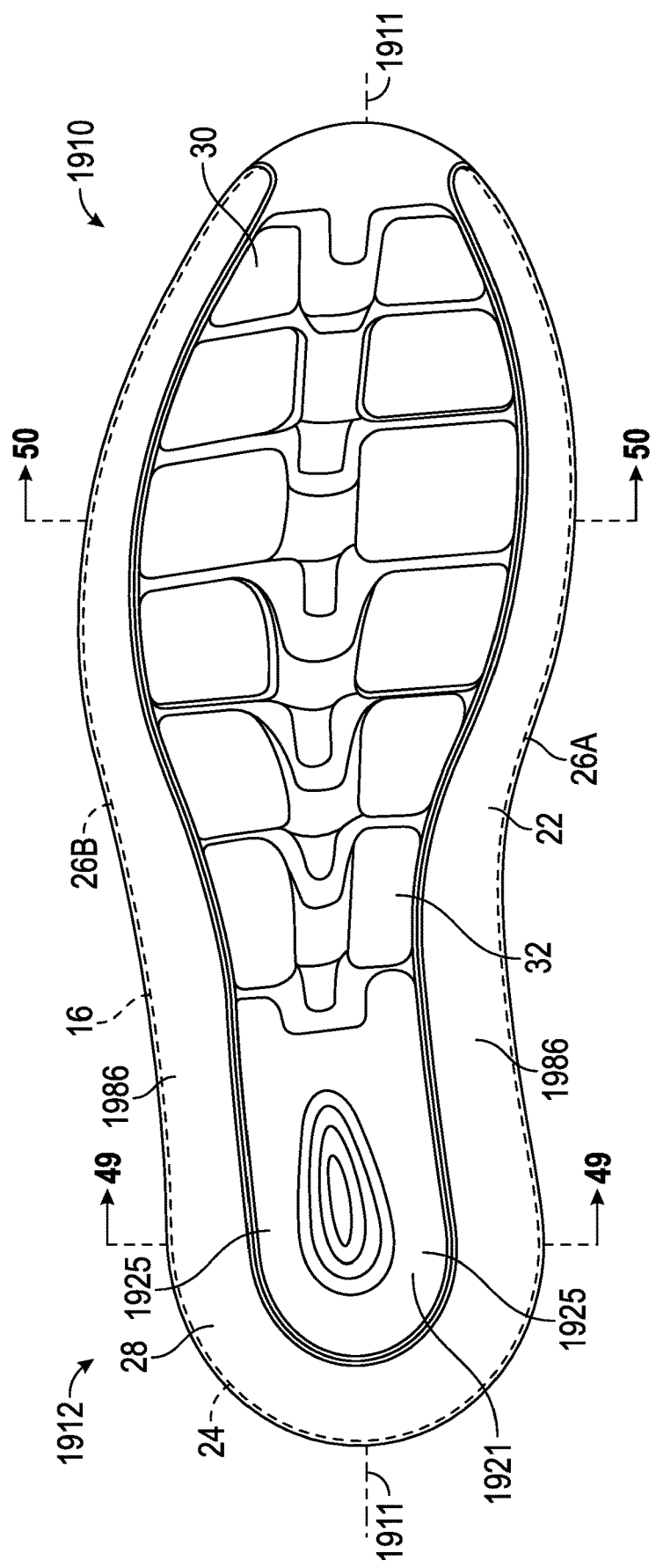
FIG. 48 is a schematic illustration in bottom view of another embodiment of an article of footwear including a peripheral fluid-filled bladder element.
Figure 49:
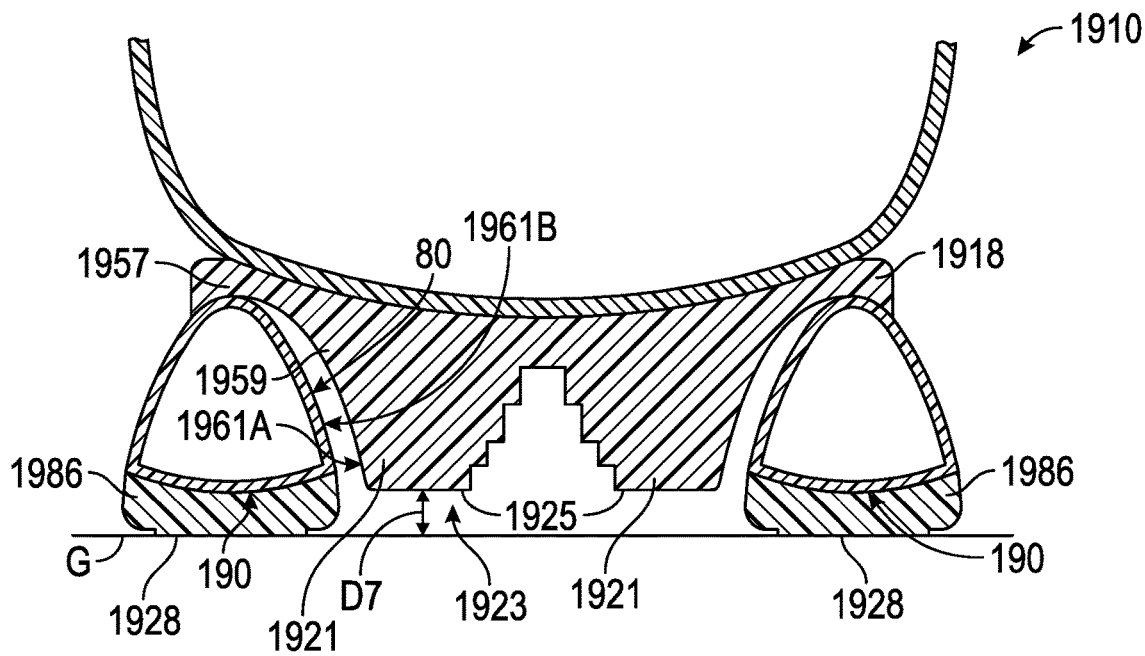
FIG. 49 is a schematic cross-sectional illustration taken at lines 49-49 in FIG. 48 of the article of footwear of FIG. 48.
Figure 50:
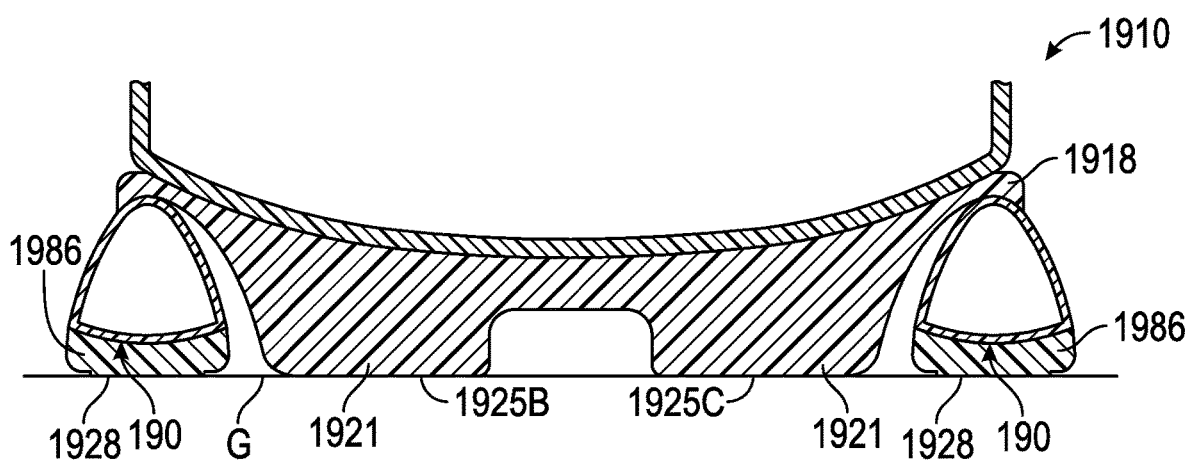
FIG. 50 is a schematic cross-sectional illustration taken at lines 50-50 in FIG. 48 of the article of footwear of FIG. 48.

Referring to FIGS. 48-50, a portion of an article of footwear 1912 is shown that includes a midsole assembly 1910 with a fluid-filled bladder element 16 as described with respect to FIG. 1. The bladder element 16 is arranged so that the substantially arc-shaped heel portion 24 is positioned in a heel region 28 of the article of footwear 1912, and the arm portions 26A, 26B extend from the heel region 28 to the forefoot region 30 along a peripheral region 22. The article of footwear 1912 has a heel region 28, a forefoot region 30, and a midfoot region 32 corresponding with portions of a human foot as described with respect to similar regions of the midsole layer 14 of FIG. 2.

The midsole assembly 1910 includes a resilient midsole layer 1918 that is secured to and rests on the bladder element 16 as shown in FIGS. 49 and 50. The midsole layer 1918 has protrusions 1921 that descend from a lower portion of the midsole layer 1918 into a cavity 1923 between the arm portions 26A, 26B. The midsole layer 1918 may be referred to as an inner foam layer as it extends inward of the bladder element 16. An additional sole layer 1986, which may be referred to as an outsole layer or as an outer foam layer, is secured to the bladder element 16 so that the bladder element 16 rests on the additional sole layer 1986. The additional sole layer 1986 may also be referred to as an outer foam layer as it is outward of the protrusions 1921 of the midsole layer 1918, and further outward of a longitudinal centerline 1911 of the midsole assembly 1910 than the midsole layer 1918.

The additional sole layer 1986 can be a unitary layer that extends beneath and is secured to the bladder element 16. The additional sole layer 1986 can be a material similar to the midsole layer 1918, or a rubber material, or a material such as used for a unisole. If the additional sole layer 1986 is a material similar to the midsole layer 1918, such as but not limited to foam, such as an EVA foam, then the additional sole layer 1986 may function as a lower midsole layer. For example, the midsole layer 1918 and the additional sole layer 1986 can both be an injected Phylon EVA foam. In one embodiment, the midsole layer 1918 has a first density, and the additional sole layer 1986 has a second density greater than the first density. By way of non-limiting example, the specific density of the midsole layer 1918 may be 0.28 or greater, but less than the specific density of the additional sole layer 1986, which may be up to about 0.32 (with reference to water at 4 degrees Celsius). By way of another further non-limiting example, the durometer of the midsole layer 1918 and the additional sole layer 1986 can both be between 52-58 on a durometer type C scale to measure Shore hardness (Asker C), with the durometer of the additional sole layer 1986 greater than the durometer of the midsole layer 1918. If desired, additional harder outsole elements can be secured to a bottom surface of the additional sole layer 1986.

The midsole layer 1918 is configured so that the lowest extent 1925 of each protrusion 1921 in the heel region 24 terminates above the lowest extent 1928 of the additional sole layer 1986 (i.e., a base of the additional sole layer 1986) in the absence of at least the threshold loading force acting to compress the midsole layer 1918. A distance D7 spaces the lowest extent 1928 of the additional sole layer 1986 from the lowest extent 1925 of the midsole layer 1918. The distance D7 thus also represents the distance of the lowest extent 1725 of the protrusion 1921 from the ground plane G. With this configuration, the protrusions 1921 in the heel region 28 are not in operative contact with the ground plane G in the absence of at least the threshold loading force on the midsole layer 1918. As used herein, the protrusions 1921 are in "operative contact" with the ground plane G when the protrusions 1921 directly contact the ground plane G, assuming no additional outsole elements are secured to the lowest extent 1925. In other words, the protrusion 1921 positioned in the heel region 28 is not in operative contact with the ground plane G until a loading force F is applied that is at least a predetermined threshold loading force sufficient to cause the lowest extent 1925 of the protrusion 1921 to contact the ground plane G, thus becoming part of the ground contact surface of the article of footwear 1812. If an additional outsole element is secured to the protrusion 1921, then the protrusion is in operative contact with the ground plane G when the additional outsole element contacts the ground plane G so that the protrusion 1921 is thus in indirect contact with the ground plane G.

As shown in FIG. 50, lowest extents 1925B, 1925C of protrusions 1921 in the forefoot region 30 are in operative contact with the ground plane G even in the absence of the threshold loading force. In other words, the lowest extents 1925B, 1925C of the midsole layer 1918 and the lowest extent, or base surface 1928 of the additional outsole layer 1986 are flush with one another, at the ground plane G, in the forefoot region 30. The additional sole layer 1986 is secured to the entire base surface 190 of the bladder element 16 by bonding, adhesives, welding, or the like, and is in operative contact with the ground plane G even in the absence of the threshold loading force.

During application of at least a threshold loading force, a first stage of attenuation of the force occurs prior to operative contact of the protrusions 1921 in the heel region 28 with the ground plane G. During the first stage of attenuation, the harder additional sole layer 1986 and the bladder element 16 attenuate the force in the heel region 28, with the midsole layer 1918 in the forefoot region 30 attenuating some of the loading force F. A second stage of attenuation occurs in the heel region 28 as the midsole layer 1918 moves downward and the lowest extent 1925 of the protrusions 1921 move into operative contact with the ground plane G. During the second stage, the protrusions 1921 in the heel region 28 have moved into operative contact with the ground plane G, so that the loading force F is attenuated both by the protrusions 1921, and by the bladder element 16 in the heel region 28.

As best shown in FIGS. 49 and 50, the resilient midsole layer 1918 and the bladder element 16 are configured so that a first portion 1957 of the resilient midsole layer 1918 adjacent the inward-facing surface 80 of the bladder element 16 is secured to the bladder element 16 such as by welding, bonding, or the like. A second portion 1959 of the resilient midsole layer 1918 adjacent the inward-facing surface 80 of the bladder element is spaced from the bladder element 16 when the threshold loading force is not applied to the resilient midsole layer 1918. In other words, as shown in FIG. 49, the second portion 1959 of each protrusion 1921 is spaced from the inward-facing surface 80 of the bladder element 16. The spacing of the second portion 1959 is due to the angling of the second portion 1959 inward toward the center of the midsole layer 1918 relative to the first portion 1957. The second portion 1959 has a surface profile 1961A that is substantially identical to a surface profile 1961B of the portion of the inward-facing surface 80 of the bladder element 16 that is adjacent to the second portion 1959.

Due to the flexible and resilient properties of the midsole layer 1918, under at least the threshold loading force, compression of the midsole layer 1918 9 causes the second portions 1959 to move into contact with the inward-facing surface 80 of the bladder element 16, similar to the midsole layer 1018 of FIG. 26.

The midsole assembly 1910 can be tuned during the design of the assembly 1910 to provide a desired underfoot feel by selecting the geometry of the protrusions 1921, the distance D7, the second portions 1959 and the selection of materials for the midsole layer 1918 and the additional sole layer 1986. These parameters can be selected to cause the first stage of attenuation to have a first energy absorbing characteristic, and the second stage of attenuation to have a second energy absorbing characteristic. For example, the rate of compression of the midsole assembly 1910 may be different in the different stages of attenuation. Additionally, when the protrusions 1921 contact the ground, a greater tactile underfoot feel is experienced by a wearer of the article of footwear 1912, which may be desirable. The midsole layer 1918 could be configured with recesses similar to recesses 1892A, 1892B for forming or supporting ambient pods. The midsole layer 1918 could also have a plate similar to plate 1894 in the forefoot region 30 to increases the stiffness of the forefoot region 30, create a high propensity for the flexing of the forefoot region 28 or the midfoot region 32 to cause "snap-back", or return of the midsole assembly 1910 to an unflexed position following flexing.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative only and not as limiting.

The invention claimed is:

1. An article of footwear having a heel region, a forefoot region, and a peripheral region; and the article of footwear comprising:
   a midsole assembly having:
      a fluid-filled bladder element having an arc-shaped heel portion, a lateral arm portion, a medial arm portion spaced from the lateral arm portion, each of the lateral and medial arm portions extending from the heel portion, and the bladder element configured to be positioned with the heel portion in the heel region and the lateral and medial arm portions extending from the heel region to the forefoot region along the peripheral region;
      a midsole layer secured to and resting on the bladder element and having multiple protrusions descending into a cavity formed between the lateral and medial arm portions; wherein a lowest extent of each of said multiple protrusions terminates above a base surface of the bladder element; wherein the midsole layer has a flex groove extending generally lengthwise and positioned between at least some of the multiple protrusions; and
   an outsole secured to the base surface of the fluid-filled bladder element and having extension portions secured to the multiple protrusions such that the extension portions are excluded from the ground contact surface of the article of footwear in the absence of at least a threshold loading force on the midsole assembly.

2. The article of footwear of claim 1, wherein the lateral and medial arm portions have terminal ends positioned in the forefoot region.

3. The article of footwear of claim 1, wherein the midsole layer has laterally-extending grooves between at least some of the multiple protrusions.

4. The article of footwear of claim 1, wherein:
   a first portion of the midsole layer adjacent to an inward-facing surface of the bladder element is secured to the bladder element; and
   a second portion of the midsole layer adjacent to the inward-facing surface of the bladder element is spaced from the bladder element in the absence of at least the threshold loading force and is configured to move into contact with the inward-facing surface of the bladder element under compression by the threshold loading force to attenuate the threshold loading force.

5. The article of footwear of claim 4, wherein the second portion has a surface profile in the absence of at least the threshold loading force that is identical to a surface profile of the inward-facing surface of the bladder element.

6. The article of footwear of claim 5, wherein:
the extension portions of the outsole are configured to move into contact with the ground plane to become part of the ground contact surface of the article of footwear only after the second portion of the midsole layer moves into contact with the inward-facing surface of the bladder element; and
the midsole assembly provides a first stage of attenuation of the loading force when the second portion of the midsole layer moves into contact with the inward-facing surface of the bladder element, and provides a second stage of attenuation of the loading force when the extension portions of the outsole move into operative contact with the ground plane.

7. The article of footwear of claim 1, wherein:
the bladder element tapers from the base surface to a peak extending along the bladder element opposite the base surface;
the bladder element has a generally outward-facing side surface between the base surface and the peak, and a generally inward-facing side surface between the base surface and the peak; and
the midsole layer is supported on the inward-facing side surface so that at least a portion of the outward-facing side surface of the bladder element is exposed.

8. The article of footwear of claim 1, wherein the bladder element is transparent.

9. The article of footwear of claim 1, wherein the article of footwear has a midfoot region between the forefoot region and the heel region; wherein the outsole has a peripheral portion that extends around the forefoot region, the midfoot region, and the heel region at both a medial side and a lateral side of the outsole, and the extension portions extend laterally inward from the peripheral portion.

10. The article of footwear of claim 9, wherein the multiple protrusions are disposed in the forefoot region, the midfoot region, and the heel region.

11. The article of footwear of claim 9, wherein the extension portions extend upward from the peripheral portion in the absence of at least the threshold loading force.

12. The article of footwear of claim 9, wherein:
the flex groove extends generally lengthwise from the forefoot region to the heel region on a bottom surface of the midsole layer and positioned between at least some of the multiple protrusions; and
the midsole layer has laterally-extending grooves extending generally laterally on the bottom surface of the midsole layer, each of the laterally-extending grooves disposed between adjacent protrusions of the multiple protrusions.

13. The article of footwear of claim 12, wherein the flex groove increases in width under the threshold loading force.

14. The article of footwear of claim 9, wherein the outsole is a unitary, one-piece outsole defining an opening extending completely through the outsole between the extension portions.

15. An article of footwear having a heel region, a forefoot region, a midfoot region between the heel region and the forefoot region, and a peripheral region; and the article of footwear comprising:
a midsole assembly having:
a fluid-filled bladder element having an arc-shaped heel portion, a lateral arm portion, a medial arm portion spaced from the lateral arm portion, each of the lateral and medial arm portions extending from the heel portion, and the bladder element configured to be positioned with the heel portion in the heel region and the lateral and medial arm portions extending from the heel region to the forefoot region along the peripheral region;
a midsole layer secured to and resting on the bladder element and having multiple protrusions descending into a cavity formed between the lateral and medial arm portions; wherein a lowest extent of each of said multiple protrusions terminates above a base surface of the bladder element; and
an outsole secured to the base surface of the fluid-filled bladder element and having extension portions secured to the multiple protrusions such that the extension portions are excluded from the ground contact surface of the article of footwear in the absence of at least a threshold loading force on the midsole assembly;
wherein a first portion of the midsole layer adjacent to an inward-facing surface of the bladder element is secured to the bladder element;
wherein a second portion of the midsole layer adjacent to the inward-facing surface of the bladder element is spaced from the bladder element in the absence of at least the threshold loading force and is configured to move into contact with the inward-facing surface of the bladder element under compression by the threshold loading force to attenuate the threshold loading force; and
wherein the outsole has a peripheral portion that extends around the forefoot region, the midfoot region, and the heel region at both a medial side and a lateral side of the outsole, the extension portions extend laterally inward from the peripheral portion, and the outsole is a unitary, one-piece outsole defining an opening extending completely through the outsole between the extension portions.

16. The article of footwear of claim 15, wherein:
the midsole layer has a flex groove extending generally lengthwise from the forefoot region to the heel region on a bottom surface of the midsole layer and positioned between at least some of the multiple protrusions; and
the midsole layer has laterally-extending grooves extending generally laterally on the bottom surface of the midsole layer, each of the laterally-extending grooves disposed between adjacent protrusions of the multiple protrusions.

17. The article of footwear of claim 16, wherein the flex groove increases in width under the threshold loading force.

18. The article of footwear of claim 15, wherein the midsole layer has laterally-extending grooves between at least some of the multiple protrusions.

19. An article of footwear having a heel region, a forefoot region, and a peripheral region; and the article of footwear comprising:
a midsole assembly having:
a fluid-filled bladder element having an arc-shaped heel portion, a lateral arm portion, a medial arm portion spaced from the lateral arm portion, each of the lateral and medial arm portions extending from the heel portion, and the bladder element configured to be positioned with the heel portion in the heel region and the lateral and medial arm portions extending from the heel region to the forefoot region along the peripheral region;
a midsole layer secured to and resting on the bladder element and having multiple protrusions descending into a cavity formed between the lateral and medial arm portions; wherein a lowest extent of each of said multiple protrusions terminates above a base surface of the bladder element; and an outsole secured to the base surface of the fluid-filled bladder element and having extension portions secured to the multiple protrusions such that the extension portions are excluded from the ground contact surface of the article of footwear in the absence of at least a threshold loading force on the midsole assembly; wherein:

a first portion of the midsole layer adjacent to an inward-facing surface of the bladder element is secured to the bladder element; and a second portion of the midsole layer adjacent to the inward-facing surface of the bladder element is spaced from the bladder element in the absence of at least the threshold loading force and is configured to move into contact with the inward-facing surface of the bladder element under compression by the threshold loading force to attenuate the threshold loading force.

20. The article of footwear of claim 19, wherein the second portion has a surface profile in the absence of at least the threshold loading force that is identical to a surface profile of the inward-facing surface of the bladder element.

\* \* \* \* \*